United States Patent
Borza et al.

(10) Patent No.: US 12,473,293 B2
(45) Date of Patent: Nov. 18, 2025

(54) PHARMACOLOGICALLY ACTIVE HETEROCYCLIC-SUBSTITUTED PYRAZOLO[1,5-A]PYRIMIDINE DERIVATIVES

(71) Applicant: Richter Gedeon Nyrt., Budapest (HU)

(72) Inventors: István Borza, Budapest (HU); János Éles, Budapest (HU); Viktor Román, Érd (HU); József Levente Petró, Százhalombatta (HU); Csaba Lehel Gegö, Budapest (HU); Gyula Attila Bényei, Budapest (HU)

(73) Assignee: RICHTER GEDEON NYRT., Budapest (HU)

( * ) Notice: Subject to any disclaimer, the term of this patent is extended or adjusted under 35 U.S.C. 154(b) by 457 days.

(21) Appl. No.: 18/040,456

(22) PCT Filed: Aug. 5, 2021

(86) PCT No.: PCT/IB2021/057180
§ 371 (c)(1),
(2) Date: Feb. 3, 2023

(87) PCT Pub. No.: WO2022/029666
PCT Pub. Date: Feb. 10, 2022

(65) Prior Publication Data
US 2023/0286988 A1     Sep. 14, 2023

(30) Foreign Application Priority Data
Aug. 5, 2020   (HU) .................................... P2000254

(51) Int. Cl.
C07D 487/04   (2006.01)
A61P 25/00    (2006.01)

(52) U.S. Cl.
CPC ............ C07D 487/04 (2013.01); A61P 25/00 (2018.01)

(58) Field of Classification Search
CPC ................................ C07D 487/04; A61P 25/00
See application file for complete search history.

(56) References Cited

U.S. PATENT DOCUMENTS

| | | |
|---|---|---|
| 2010/0093706 A1 | 4/2010 | Hauske |
| 2015/0111876 A1 | 4/2015 | Shiraishi et al. |
| 2016/0304527 A1 | 10/2016 | Faghih et al. |
| 2020/0061068 A1* | 2/2020 | Borza ...................... A61P 25/18 |

FOREIGN PATENT DOCUMENTS

| | | |
|---|---|---|
| WO | WO-2005094828 A1 | 10/2005 |
| WO | WO-2006136442 A1 | 12/2006 |
| WO | WO-2011026917 A1 | 3/2011 |
| WO | WO-2015056771 A1 | 4/2015 |
| WO | WO-2015164508 A1 | 10/2015 |
| WO | WO-2015181747 A1 | 12/2015 |
| WO | WO-2017069270 A1 | 4/2017 |
| WO | WO-2018167629 A1 | 9/2018 |
| WO | WO-2018167630 A1 | 9/2018 |
| WO | WO-2018167631 A1 | 9/2018 |

(Continued)

OTHER PUBLICATIONS

Alper, R. H., and Nelson, D. L., "Characterization of 5-HT$_{1A}$ receptor-mediated [$^{35}$S]GTPγS binding in rat hippocampal membranes," European Journal of Pharmacology 343(2-3):303-312, Elsevier, Netherlands (Feb. 1998).

Ballell, L., et al., "Fueling open-source drug discovery: 177 small-molecule leads against tuberculosis," ChemMedChem 8(2):313-321, with Supporting Information, Wiley-VCH, Germany (Feb. 2013).

Bambini-Junior, V., et al., "Animal model of autism induced by prenatal exposure to valproate: behavioral changes and liver parameters," Brain Research 1408:8-16, Elseiver, Netherlands (Aug. 2011).

Bettler, B., et al., "Molecular structure and physiological functions of GABA$_B$ receptors," Physiological reviews 84(3):835-867, American Physiological Society, United States (Jul. 2004).

Biermann, B., et al., "The Sushi Domains of GABA$_B$ Receptors Function as Axonal Targeting Signals," Journal of Neuroscience 30(4):1385-1394, Society for Neuroscience, United States (Jan. 2010).

(Continued)

*Primary Examiner* — Timothy R Rozof
(74) *Attorney, Agent, or Firm* — Sterne, Kessler, Goldstein & Fox P.L.L.C.

(57) ABSTRACT

The invention relates to new pyrazolo[1,5-a]pyrimidine derivatives of formula (I) or pharmaceutically acceptable salts, biologically active metabolites, pro-drugs, racemates, enantiomers, diastereomers, solvates and hydrates thereof that serve as GABAB receptor positive allosteric modulators. The invention also relates to the process for producing such compounds and key intermediates used in the process. The invention further relates to pharmaceutical compositions comprising such compounds optionally in combination with two or more different therapeutic agents and the use of such compounds in methods for treating diseases and conditions mediated and modulated by the GABAB receptor positive allosteric mechanism. The invention also provides a method for manufacture of medicaments useful in the treatment of such disorders.

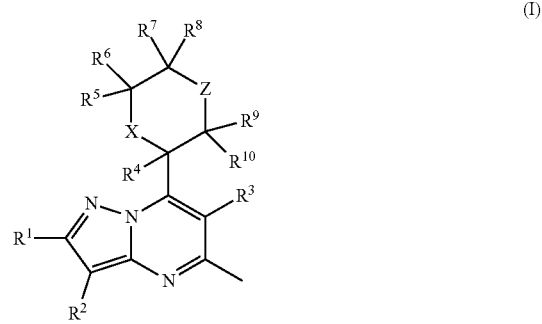

19 Claims, No Drawings

(56) References Cited

FOREIGN PATENT DOCUMENTS

WO     WO-2022029666 A1     2/2022

OTHER PUBLICATIONS

Binet, V., et al., "The Heptahelical Domain of GABA$_{B2}$ is Activated Directly by CGP7930, a Positive Allosteric Modulator of the GABA$_B$ Receptor," Journal of Biological Chemistry 279(28):29085-29091, American Society for Biochemistry and Molecular Biology, United States (Jul. 2004).
Bowery, N. G., et al., "GABA$_A$ and GABA$_B$ receptor site distribution in the rat central nervous system," Neuroscience 20(2):365-383, Elsevier, Netherlands (Feb. 1987).
Breslow, M. F., et al., "Role of γ-aminobutyric acid in antipanic drug efficacy," The American Journal of Psychiatry 146(3):353-356, American Psychiatric Association, United States (Mar. 1989).
Chalifoux, J. R., and Carter, A. G., "GABA$_B$ receptor modulation of synaptic function," Current Opinion in Neurobiology 21(2):339-344, Current Biology, United Kingdom (Apr. 2011).
Christensen, J., et al., "Prenatal Valproate Exposure and Risk of Autism Spectrum Disorders and Childhood Autism," JAMA 309(16):1696-1703, American Medical Association, United States (Apr. 2013).
Conn, P. J., et al., "Allosteric modulators of GPCRs: a novel approach for the treatment of CNS disorders," Nat Rev Drug Discov 8(1):41-54, Nature Publishing Group, United Kingdom (Jan. 2009).
Cryan, J. F., et al., "Behavioral characterization of the novel GABA$_B$ receptor-positive modulator GS39783 (N,N'-dicyclopentyl-2-methylsulfanyl-5-nitro-pyrimidine-4,6-diamine): anxiolytic-like activity without side effects associated with baclofen or benzodiazepines," J Pharmacol Exp Ther 310(3):952-963, American Society for Pharmacology and Experimental Therapeutics, United States (Sep. 2004).
De Vry, J., et al., "Shock-induced ultrasonic vocalization in young adult rats: a model for testing putative anti-anxiety drugs," European Journal of Pharmacology 249(3):331-339, Elsevier, Netherlands (Nov. 1993).
Drake, R. G., et al., "Baclofen treatment for chronic posttraumatic stress disorder," Annals of Pharmacotherapy 37(9):1177-1781, SAGE Publications, United States (Sep. 2003).
Dupuis, D. S., et al., "Point mutations in the transmembrane region of GABA$_{B2}$ facilitate activation by the positive modulator N,N'-dicyclopentyl-2-methylsulfanyl-5-nitro-pyrimidine-4,6-diamine (GS39783) in the absence of the GABA$_{B1}$ subunit," Mol Pharmacol 70(6):2027-2036, American Society for Pharmacology and Experimental Therapeutics, United States (Dec. 2006).
Gassmann, M., et al., "Redistribution of GABA$_{B(1)}$ protein and atypical GABA$_B$ responses in GABA$_{B(2)}$-deficient mice," Journal of Neuroscience 24(27):6086-6097, Society for Neuroscience, United States (Jul. 2004).
Gjoni, T., and Urwyler, S., "Receptor activation involving positive allosteric modulation, unlike full agonism, does not result in GABA$_B$ receptor desensitization," Neuropharmacology 55(8):1293-1299, Pergamon Press, United Kingdom (Dec. 2008).
Hill, D. R., and Bowery, N. G., "$^3$H-baclofen and $^3$H-GABA bind to bicuculline-insensitive GABA$_B$ sites in rat brain," Nature 290(5802):149-152, Nature Publishing Group, United Kingdom (Mar. 1981).
International Search Report and Written Opinion for International Application No. PCT/IB2021/057180, mailed Oct. 18, 2021, European Patent Office, Netherlands, 13 pages.

Keegan, B. M. T., et al., "Chronic baclofen desensitizes GABA$_B$-mediated G-protein activation and stimulates phosphorylation of kinases in mesocorticolimbic rat brain," Neuropharmacology 95:492-502, Pergamon Press, United Kingdom (Aug. 2015).
Leggio, L., et al., "Effectiveness and safety of baclofen in the treatment of alcohol dependent patients," CNS & Neurological Disorders Drug Targets 9(1):33-44, Bentham Science Publishers, United Arab Emirates (Mar. 2010).
Mombereau, C., et al., "Genetic and pharmacological evidence of a role for GABA$_B$ receptors in the modulation of anxiety- and antidepressant-like behavior," Neuropsychopharmacology 29(6):1050-1062, Nature Publishing Group, United Kingdom (Jun. 2004).
Mombereau, C., et al., "Altered response to benzodiazepine anxiolytics in mice lacking GABA$_{B(1)}$ receptors," European Journal of Pharmacology 497(1):119-120, Elsevier, Netherlands (Aug. 2004).
Mombereau, C., et al., "Altered anxiety and depression-related behaviour in mice lacking GABA$_{B(2)}$ receptor subunits," Neuroreport 16(3):307-310, Lippincott Williams & Wilkins, United Kingdom (Feb. 2005).
Nadler, J. J., et al., "Automated apparatus for quantitation of social approach behaviors in mice," Genes Brain Behav 3(5):303-314, Wiley-Blackwell on behalf of the International Behavioural and Neural Genetics Society, United States (Oct. 2004).
Perdona, E., et al., "In vitro and in vivo characterization of the novel GABA$_B$ receptor positive allosteric modulator, 2-{1-[2-(4-chlorophenyl)-5-methylpyrazolo[1,5-a]pyrimidin-7-yl]-2-piperidinyl}ethanol (CMPPE)," Neuropharmacology 61(5-6):957-966, Pergamon Press, United Kingdom (Oct. 2011).
Rinken, A., et al., "Pharmacological characterization of dopamine-stimulated [$^{35}$S]-guanosine 5'(γ-thiotriphosphate) ([$^{35}$S]GTPγS) binding in rat striatal membranes," Biochem Pharmacol 57(2):155-162, Elsevier, United Kingdom (Jan. 1999).
Ross, J. C., et al., "Acute intrathecal baclofen withdrawal: a brief review of treatment options," Neurocritical Care 14(1):103-108, Humana Press, United States (Feb. 2011).
Roullet, F. I., et al., "In utero exposure to valproic acid and autism—a current review of clinical and animal studies," Neurotoxicology and Teratology 36:47-56, Elsevier, Netherlands (Mar.-Apr. 2013).
Sanchez, C., "Stress-induced vocalisation in adult animals. A valid model of anxiety?," European Journal of Pharmacology 463(1-3):133-143, Elsevier, Netherlands (Feb. 2003).
Schuler, V., et al., "Epilepsy, hyperalgesia, impaired memory, and loss of pre- and postsynaptic GABA$_B$ responses in mice lacking GABA$_{B(1)}$," Neuron 31(1):47-58, Cell Press, United States (Jul. 2001).
Takasu, K., et al., "Convenient synthesis of substituted piperidinones from α,β-unsaturated amides: formal synthesis of deplancheine, tacamonine, and paroxetine," Journal of Organic Chemistry 70(10):3957-3962, American Chemical Society, United States (May 2005).
Ulrich, D., and Bettler, B., "GABA$_B$ receptors: synaptic functions and mechanisms of diversity," Current Opinion in Neurobiology 17(3):298-303, Elsevier, Netherlands (Jun. 2007).
Vacher, C.-M., and Bettler, B., "GABA$_B$ receptors as potential therapeutic targets," Curr Drug Targets CNS Neurol Disord 2(4):248-259, Bentham Science Publishers, Netherlands (Aug. 2003).
Vigot, R., et al., "Differential compartmentalization and distinct functions of GABA$_B$ receptor variants," Neuron 50(4):589-601, Cell Press, United States (May 2006).
Wang, L., et al., "Allosteric modulators of g protein-coupled receptors: future therapeutics for complex physiological disorders," J Pharmacol Exp Ther 331(2):340-348, American Society for Pharmacology and Experimental Therapeutics, United States (Nov. 2009).

\* cited by examiner

PHARMACOLOGICALLY ACTIVE HETEROCYCLIC-SUBSTITUTED PYRAZOLO[1,5-A]PYRIMIDINE DERIVATIVES

FIELD OF THE INVENTION

The present invention relates to new pyrazolo[1,5-a]pyrimidine derivatives of formula (I) or pharmaceutically acceptable salts, biologically active metabolites, pro-drugs, racemates, enantiomers, diastereomers, solvates and hydrates thereof that serve as $GABA_B$ receptor positive allosteric modulators. The invention also relates to the process for producing such compounds as well as key intermediates of the process. The invention further relates to pharmaceutical compositions comprising such compounds optionally in combination with two or more different therapeutic agents and the use of such compounds in methods for treating diseases and conditions mediated and modulated by the $GABA_B$ receptor positive allosteric mechanism. The invention also provides a method for manufacture of medicaments useful in the treatment of such disorders.

BACKGROUND OF THE INVENTION

Gamma-aminobutyric acid (GABA) is the main inhibitory neurotransmitter in the central nervous system and plays a key role in modulating neuronal activity. It exerts its action via three receptor systems, the related ionotropic $GABA_A$ and $GABA_C$ receptors, and the distinct metabotropic $GABA_B$ receptors (Hill and Bowery, Nature 1981, 290, 149-152). The latter $GABA_B$ receptors are widespreadly distributed within the mammalian central nervous system with various expression levels in different brain regions (Bovery et al, Neuroscience 1987, 20, 365-385). $GABA_B$ receptors can be found both pre- and postsynaptically and play an important role in the fine-tuning of neurotransmission. Most $GABA_B$ receptors cluster around excitatory synapses, either at the edge of the presynaptic terminal or on dendritic spines opposite to glutamatergic boutons (Ulrich and Bettler, Curr. Opin. Neurobiol. 2007, 17, 298-303).

$GABA_B$ receptors belong to the Family 3 (C) of G-protein coupled receptors (GPCRs) together with metabotropic glutamate receptors (mGluRs), calcium-sensing receptors, taste receptors and a number of orphan receptors, showing highest, approximately 30% homology to mGluRs (Bettler et al, Physiol. Rev. 2004, 84, 835-867). $GABA_B$ receptors are heterodimers consisting of two similar, yet different subunits, B1 and B2. The B1 subunit has multiple splice variants with only two (B1a and B1b) having clear physiological significance. These isoforms differ only in their extracellular domain containing two Sushi motifs that regulate the subcellular localization of the receptor (Vigot et al, Neuron 2006, 50, 589-601; Biermann et al, J. Neurosci. 2010, 30, 1385-1394). The B1 subunit binds the endogenous neurotransmitter ligand GABA as well as other orthosteric agonists (such as baclofen, SKF97541) and antagonists (such as phaclofen, saclofen). The B2 subunit is responsible for G-protein activation-mediated intracellular signal transduction and is believed to bind allosteric modulators (Binet et al, J Biol. Chem. 2004, 279, 29085-29091; Dupuis et al, Mol. Pharmacol. 2006, 70, 2027-2036). The site of action for the Novartis $GABA_B$ positive allosteric modulator compounds CGP7930 and GS39783 is the heptahelical transmembrane domain of the B2 subunit; the exact binding site for other, unrelated positive allosteric modulator chemotypes is not known.

The main synaptic effects of $GABA_B$ receptors are the presynaptic blockade of neurotransmitter release (GABA as well as glutamate) and postsynaptic hyperpolarization (Gassmann and Bettler, in Handbook of Contemporary Neuropharmacology 2007). These effects are the result of inhibition of presynaptic calcium influx and stimulation of postsynaptic inwardly rectifying potassium (GIRK) channels, respectively. Ion channel functions are mediated in a membrane-delimited manner through the activation of βγ subunits of $G_i/G_o$ proteins. In addition to these, $GABA_B$ receptors also signal via the a subunit of the same G-proteins that inhibits adenylate cyclase and retards the recruitment of synaptic vesicles (Chalifoux and Carter, Curr. Opin. Neurobiol. 2011, 21, 339-442). Beside these fast cellular events, $GABA_B$ receptors also regulate cytoplasmic kinases including mitogen-activated protein kinase and thereby influence synaptic plasticity on the longer-term.

In order to better understand the physiological significance of $GABA_B$ receptors at the behavioral level, knockout mice have been generated with mutations selectively in the B1, B1a, B1b and the B2 subunits. Mice without B1 subunits displayed increased anxiety in explorative-like situations (light-dark box, staircase assays), increased panic, spontaneous seizures, hyperalgesia, hyperlocomotion, and memory impairment (Schuler et al, Neuron 2001, 31, 47-58). Mice that do not express $GABA_{B2}$ subunits behave similarly to B1 subunit knockouts; these animals are overanxious, show spontaneous seizure activity, hyperalgesia, hyperlocomotion, and memory impairment (Mombereau et al, Eur. J Pharmacol. 2004, 497, 119-120; Mombereau et al, Neuroreport 2005, 16, 307-310; Gassmann et al, J Neurosci. 2004, 24, 6086-6097). Based on the above, the $GABA_B$ receptor system seems to play a general role in the regulation of neuronal excitability with consequences on various aspects of overt behavior.

The only approved and commercialized selective $GABA_B$ receptor ligand is the orthosteric agonist racemic baclofen. Baclofen was approved as a centrally acting muscle relaxant used to reduce spasticity associated with cerebral palsy, multiple sclerosis, and spinal cord injuries. Beside these applications, baclofen may have potential therapeutic benefits in treating conditions including asthma, pain, obesity, binge eating, drug and alcohol abuse, anxiety, posttraumatic stress disorder, cough, inflammation, gastroeasophageal reflux and urinary incontinence (eg., Breslow et al, Am. J Psychiatry 1989, 146, 353-356; Drake et al, Ann. Pharmacother. 2003, 37, 1177-1181; Leggio et al, CNS Neurol. Disord. Drug Targets 2010, 9, 33-44). Although baclofen has beneficial potential in a number of therapeutic indications, unfortunately it also has a range of unwanted properties including poor blood-brain-barrier penetration, narrow therapeutic window, receptor desensitization, development of tolerance against the main effects, and withdrawal upon termination of use (Vacher and Bettler, Curr. Drug Targets CNS Neurol. Disord. 2003, 2, 248-259; Ross et al, Neurocrit. Care 2011, 14, 103-108; Keegan et al, Neuropharmacology 2015, 95, 492-502).

Allosteric modulation is an alternative way to selectively stimulate GPCRs without the unwanted properties of orthosteric ligands (Conn et al, Nat Rev 2009, 8, 41-54; Wang et al, J. Pharmacol. Exp. Ther. 2009, 331, 340-348). Allosteric modulators bind to the receptors at sites that are different from the binding site of the endogenous (orthosteric) ligands and are effective predominantly if an agonist is also bound to the receptor. This has consequences on the temporal and spacial pattern of efficacy which in turn affects the behavioral and adaptive responses the organism gives to allosteric stimulation. In contrast to orthosteric agonism, allosteric modulation of targets is expected to show less side effects, desensitization and development of tolerance. Indeed, it has been shown for the GABA$_B$ receptor positive allosteric modulator GS39783 in preclinical models, that this compound can have a favourable side effect profile (Cryan et al, *J. Pharmacol. Exp. Ther.* 2004, 310, 952-963), desensitization of the receptor can be prevented (Gjoni and Urwyler, *Neuropharmacology* 2008, 55:1293-1299) and tolerance may not develop upon chronic administration (Mombereau et al, *Neuropsychopharmacology* 2004, 29, 1050-1062). These results suggest that positive allosteric modulators of the GABA$_B$ receptor may be useful novel chemical entities without the unwanted properties of the orthosteric ligands such as baclofen.

Several patents and patent applications describe positive allosteric GABA$_B$ modulators which have different chemical structures. Pyrimidine derivatives as positive allosteric modulators of the GABA$_B$ receptor have been disclosed in WO 2005/094828 and WO 2006/136442. Thieno[3,2-b]pyrimidine and [1,3]thiazolo[5,4-d]pyrimidine derivatives as positive allosteric modulators of the GABA$_B$ receptor have been disclosed in WO 2015/056771 (US 2015/0111876). Pyrazolo[1,5-a]pyrimidine derivatives have been disclosed in US 2016/0304527 A1.

In WO2017069270 Taisho Pharmaceutical Co., Ltd. described pyrazolo[1,5-a]pyrimidine and pyrazolo[1,5-a][1,3,5]triazine derivatives, as positive allosteric modulators at the GABA$_B$ receptors. In most of the examples the R$_1$ substituent connects through a carbon-nitrogen bond to the core.

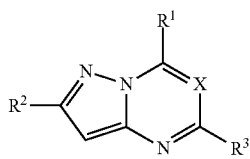

Two recent patent applications by Richter Gedeon Nyrt. (WO2018167629 and WO2018167630) describe pyrazolopyrimidines with positive allosteric activity at the GABA$_B$ receptors. These examples are carboxylic acids, and the heterocycle is connected to the pyrazolo[1,5-a]pyrimidine core through a nitrogen atom.

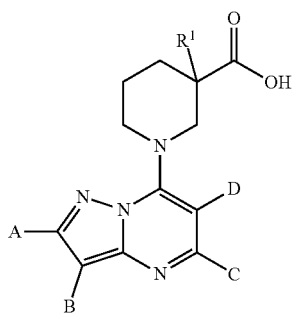

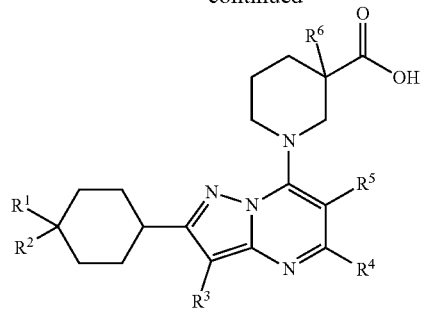

The purpose of the present invention is to provide further compounds with high affinity to GABA$_B$ receptors. Unexpectedly, we found in the present invention that compounds in which the central aromatic bicycle at position 7 is connected through a carbon atom to an optionally substituted six-membered saturated heterocyclic ring containing 1 or 2 heteroatom selected from N, O or S, show nanomolar potency. There is no suggestion in WO2018167629, WO2018167630 or WO2017069270 to undertake such structural modification to obtain the compounds of formula (I).

The structurally closest compounds disclosed in WO2017069270 by Taisho Pharmaceutical Co., Ltd. are examples A148, A225, B14, B23, B30, B31, B35. This patent suggests, that the sufficiently active compounds have a carbon-nitrogen bond between the core and the R$_1$ substituent, or in the case of a carbon-carbon bond, the core needs an additional N atom at position X. These compounds (examples A148, A225, B14, B23, B30, B31, B35) are the less active compounds.

The skilled person would not expect that the present substitution on the pyrazolo[1,5-a]pyrimidine core keeps the excellent pharmaceutical activity.

The above described in vitro advantages are further strengthened by the unexpected finding that certain examples of the present invention possessed great behavioural benefit in the prenatal valproate disease model that recapitulates the core symptoms of autism spectrum disorder. The inventors therefore showed that the compounds of the invention has therapeutic potential for the core symptoms of autism spectrum disorder in humans.

SUMMARY OF THE INVENTION

Our invention discloses heterocyclic derivatives with a carbocyclic-pyrazolo-pyrimidine scaffold. We found that these compounds show mostly nanomolar potency.

We have identified a class of pyrazolo[1,5-a]pyrimidine derivatives which have high affinity for GABA$_B$ receptors providing unique role in the treatment of psychiatric, neurodevelopmental, neurological and other central nervous system disorders as well as peripheral conditions where stimulation of the GABA$_B$ receptor may offer therapeutic benefit.

We identified new compounds that are brain penetrant. The present invention relates to compounds being GABA$_B$ receptor positive allosteric modulators and the synthesis thereof. Compounds of the present invention are useful for the treatment of psychiatric, neurodevelopmental, neurological and other central nervous system disorders as well as peripheral conditions where stimulation of the GABA$_B$ receptor may offer therapeutic benefit.

The present invention relates to the pyrazolo[1,5-a] pyrimidine derivatives of formula (I)

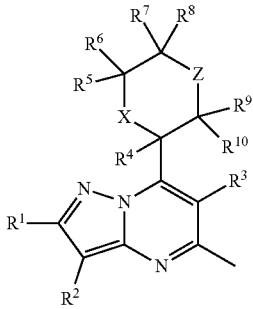

R¹ represents phenyl- or cyclohexyl group substituted by $C_1$-$C_6$alkyl or halo-$C_1$-$C_6$alkyl;
R² represents H or halogen;
R³ represents H or $C_1$-$C_6$alkyl;
R⁴ represents H; $C_1$-$C_6$alkyl or halo-$C_1$-$C_6$alkyl;
R⁵ and R⁶ may be each, independently H; $C_1$-$C_6$alkyl or halogen;
R⁷ and R⁸ may be each, independently H or $C_1$-$C_6$alkyl;
R9 and R10 may be each, independently H or $C_1$-$C_6$alkyl or R⁹ and R¹⁰ together may form oxo group;
X represents —CR$^x$R$^y$ or —O— or —S(O)$_n$— group, wherein R$^x$ and R$^y$ may be each, independently H or $C_1$-$C_6$alkyl group and wherein n is 0 or 1 or 2;
Z represents —NR—; or —O—; or —S(O)$_2$— group wherein
R may be H or —C(O)R¹¹ or —S(O)$_2$R¹² group; aminocarbonyl-$C_1$-$C_3$alkyl; carboxy-$C_1$-$C_3$alkyl; cyano-$C_1$-$C_3$alkyl; $C_1$-$C_5$(cyclo)alkyl; saturated 4-6 membered heterocyclic ring with one O, or —C(NH)(NH$_2$) group;
wherein R¹¹ may be H; $C_1$-$C_3$alkyl; $C_1$-$C_3$alkoxy; $C_1$-$C_3$alkoxy-$C_1$-$C_3$alkyl; $C_1$-$C_3$alkoxy-$C_1$-$C_3$alkoxy; methanesulphonyl-$C_1$-$C_3$alkyl; or R¹¹ may be a saturated 3-6 membered carbocyclic ring, or a 4-6 membered saturated or unsaturated heterocyclic ring with one to three hetero atoms selected from N, O or S; or amino, mono- or dialkylamino group; amino-$C_1$-$C_3$alkyl; hydroxy-$C_1$-$C_3$alkyl substituted by NH$_2$- group;
wherein R¹² may be $C_1$-$C_3$ alkyl; amino or dialkylamino group;
R⁴ and CR$^x$ may form a cycloalkyl ring; or pharmaceutically acceptable salts, biologically active metabolites, pro-drugs, racemates, enantiomers, diastereomers, solvates and hydrates thereof.

The invention also relates to the pharmaceutical compositions containing the compounds of formula (I) or pharmaceutically acceptable salts, biologically active metabolites, pro-drugs, racemates, enantiomers, diastereomers, solvates and hydrates thereof.

Furthermore, the present invention relates to the synthesis of the compounds of formula (I) and optical antipodes or racemates and/or salts thereof, the pharmaceutical compositions comprising thereof and the chemical and pharmaceutical manufacture of medicaments containing these compounds, as well as the methods of treatment with these compounds, which means administering to a mammal to be treated—including human—suffering from psychiatric, neurodevelopmental, neurological and other central nervous system disorders as well as peripheral conditions where stimulation of the GABA$_B$ receptor may offer therapeutic benefit, effective amount of compounds of formula (I) and optical antipodes or racemates and/or salts thereof of the present invention as such or as medicament.

DETAILED DESCRIPTION OF THE INVENTION

The present invention relates to the pyrazolo[1,5-a]pyrimidine derivatives of formula (I)

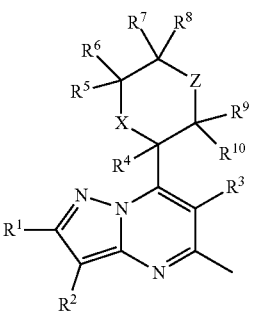

R¹ represents phenyl- or cyclohexyl group substituted by $C_1$-$C_6$alkyl or halo-$C_1$-$C_6$alkyl;
R² represents H or halogen;
R³ represents H or $C_1$-$C_6$alkyl;
R⁴ represents H; $C_1$-$C_6$alkyl or halo-$C_1$-$C_6$alkyl;
R⁵ and R⁶ may be each, independently H; $C_1$-$C_6$alkyl or halogen;
R⁷ and R⁸ may be each, independently H or $C_1$-$C_6$alkyl;
R⁹ and R¹⁰ may be each, independently H or $C_1$-$C_6$alkyl or R⁹ and R¹⁰ together may form oxo group;
X represents —CR$^x$R$^y$ or —O— or —S(O)$_n$— group, wherein R$^x$ and R$^y$ may be each, independently H or $C_1$-$C_6$alkyl group and wherein n is 0 or 1 or 2;
Z represents —NR—; or —O—; or —S(O)$_2$— group wherein
R may be H or —C(O)R¹¹ or —S(O)$_2$R² group; aminocarbonyl-$C_1$-$C_3$alkyl; carboxy-$C_1$-$C_3$alkyl; cyano-$C_1$-$C_3$alkyl; $C_1$-$C_5$(cyclo)alkyl; saturated 4-6 membered heterocyclic ring with one O, or —C(NH)(NH$_2$) group;
wherein R¹¹ may be H; $C_1$-$C_3$alkyl; $C_1$-$C_3$alkoxy; deutero-$C_1$-$C_3$alkoxy; $C_1$-$C_3$alkoxy-$C_1$-$C_3$alkyl; $C_1$-$C_3$alkoxy-$C_1$-$C_3$alkoxy; methanesulphonyl-$C_1$-$C_3$alkyl; or R¹¹ may be a saturated 3-6 membered carbocyclic ring, or a 4-6 membered saturated or unsaturated heterocyclic ring with one to three hetero atoms selected from N, O or S; or amino, mono- or dialkylamino group; amino-$C_1$-$C_3$alkyl; hydroxy-$C_1$-$C_3$alkyl substituted by NH$_2$-group;
wherein R¹² may be $C_1$-$C_3$alkyl; amino or dialkylamino group;
R⁴ and CR$^x$ may form a cycloalkyl ring;
or pharmaceutically acceptable salts, biologically active metabolites, pro-drugs, racemates, enantiomers, diastereomers, solvates and hydrates thereof.

The term "halogen" or "halo" as used herein alone or as a part of another group refers to chlorine, bromine, fluorine and iodine.

The term "$C_1$-$C_6$alkyl" as used herein refers to branched or straight chain alkyl groups comprising one to six carbon atoms, including but not limited to methyl, ethyl, propyl, normal- and isopropyl and different butyl groups.

The term "$C_1$-$C_6$alkoxy" as used herein refers to branched or straight chain alkyl groups comprising one to six carbon atoms bonded through an oxygen atom, including but not limited to, methoxy, ethoxy, n-propoxy, i-propoxy, and t-butoxy.

The term "mammal" as used herein refers to any members of the class "Mammalia" including, but not limited to human.

The term "salt" means nontoxic base addition salts of the compounds of the invention which are generally prepared by reacting the acid with a suitable organic or inorganic base.

Included within the scope of the present invention are all stereoisomers, geometric isomers and tautomeric forms of the compounds of formula (I), including compounds exhibiting more than one type of isomerism and mixtures of one or more thereof.

Conventional techniques for the preparation/isolation of individual enantiomers include chiral synthesis from the suitable optically pure precursor or resolution of the racemate (or racemate of a salt or derivative) using, for example chiral high pressure liquid chromatography (HPLC).

The term "pharmaceutically acceptable" describes an ingredient that is useful in preparing a pharmaceutical composition and is generally safe, non-toxic and neither biologically nor otherwise undesirable, and includes those acceptable for veterinary use as well as human pharmaceutical use.

The term "pharmaceutical composition" refers to a mixture of a compound of the invention with other chemical components, such as pharmaceutically acceptable auxiliary materials, e.g. diluents or carriers. The pharmaceutical composition facilitates administration of the compound to the subject.

The term "excipient" defines a chemical compound that facilitates the incorporation of a compound into cells or tissues.

As used herein, the term "treatment" means using an effective therapy to reduce, alleviate or eliminate the symptoms associated with diseases and conditions mediated and modulated by the $GABA_B$ receptor positive allosteric mechanism.

As a further aspect of the present invention there is provided the synthesis of compounds of formula (I).

Compounds according to the present invention were synthesized in line with the synthetic routes and schemes described below.

Accordingly, the compounds of formula (I) of the invention can be synthesized by one of the following routes:

If $R^9$=$R^{10}$=H; X=O and Z=NR then

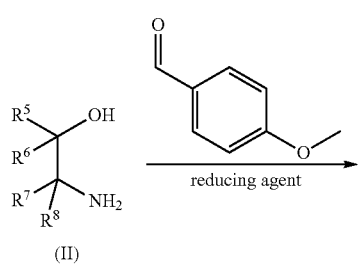

(II)

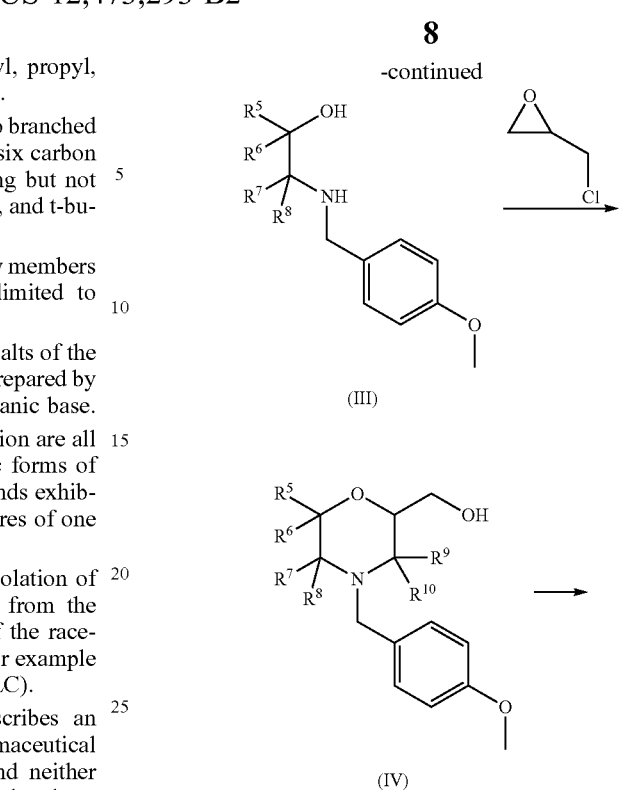

(III)

(IV)

(V)          (VI)

If $R^4$ is not H

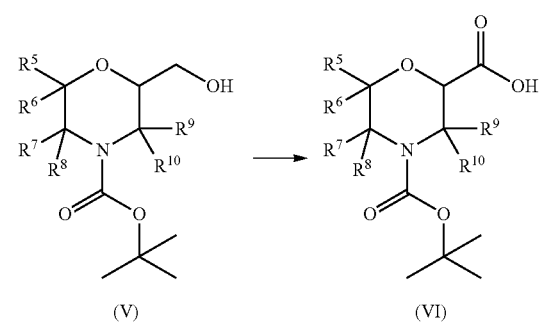

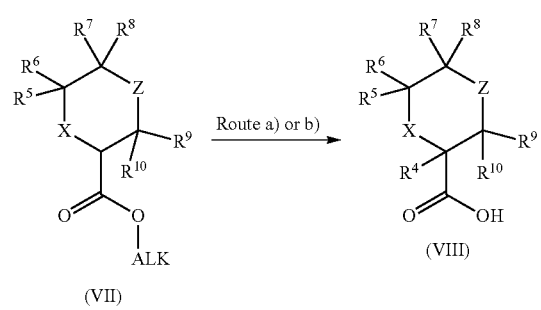

(VII)          (VIII)

Route a):
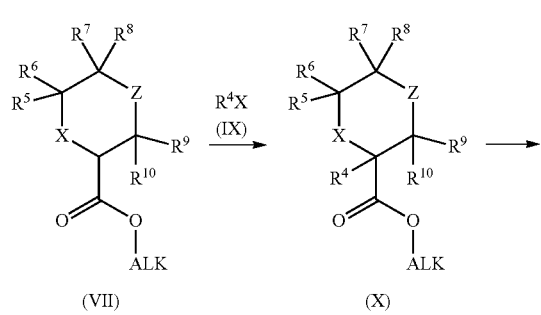
If R⁴=R⁶=R⁸=R¹⁰=H; X=CRˣRʸ; Rʸ=H and Z=NR then
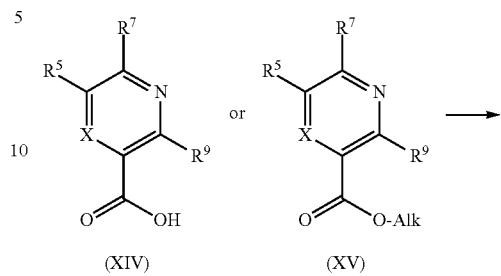
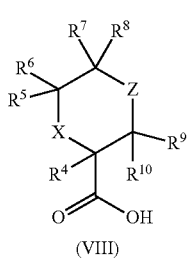
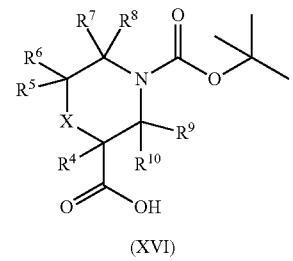
If R⁴=H; X=CRˣRʸ and Z=NR then
Route b):
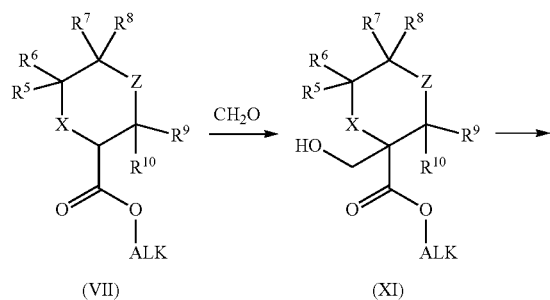
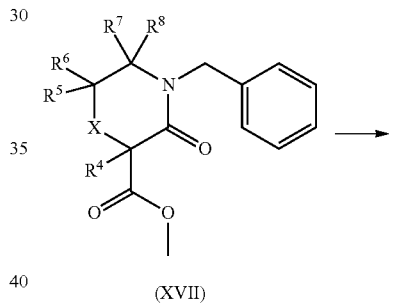
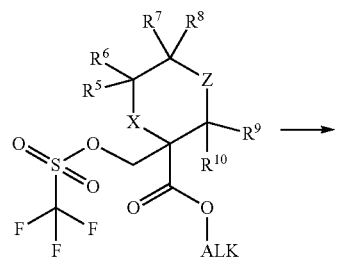
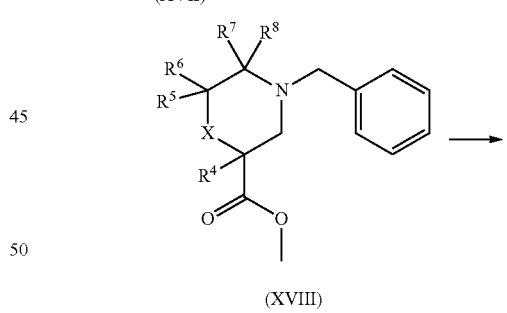
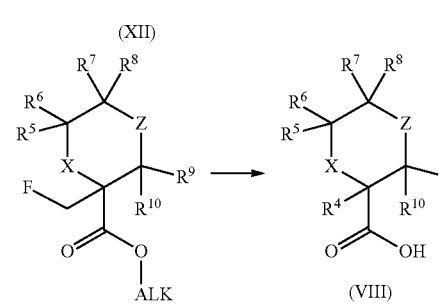
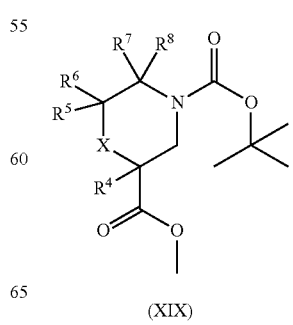
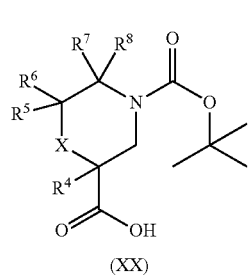

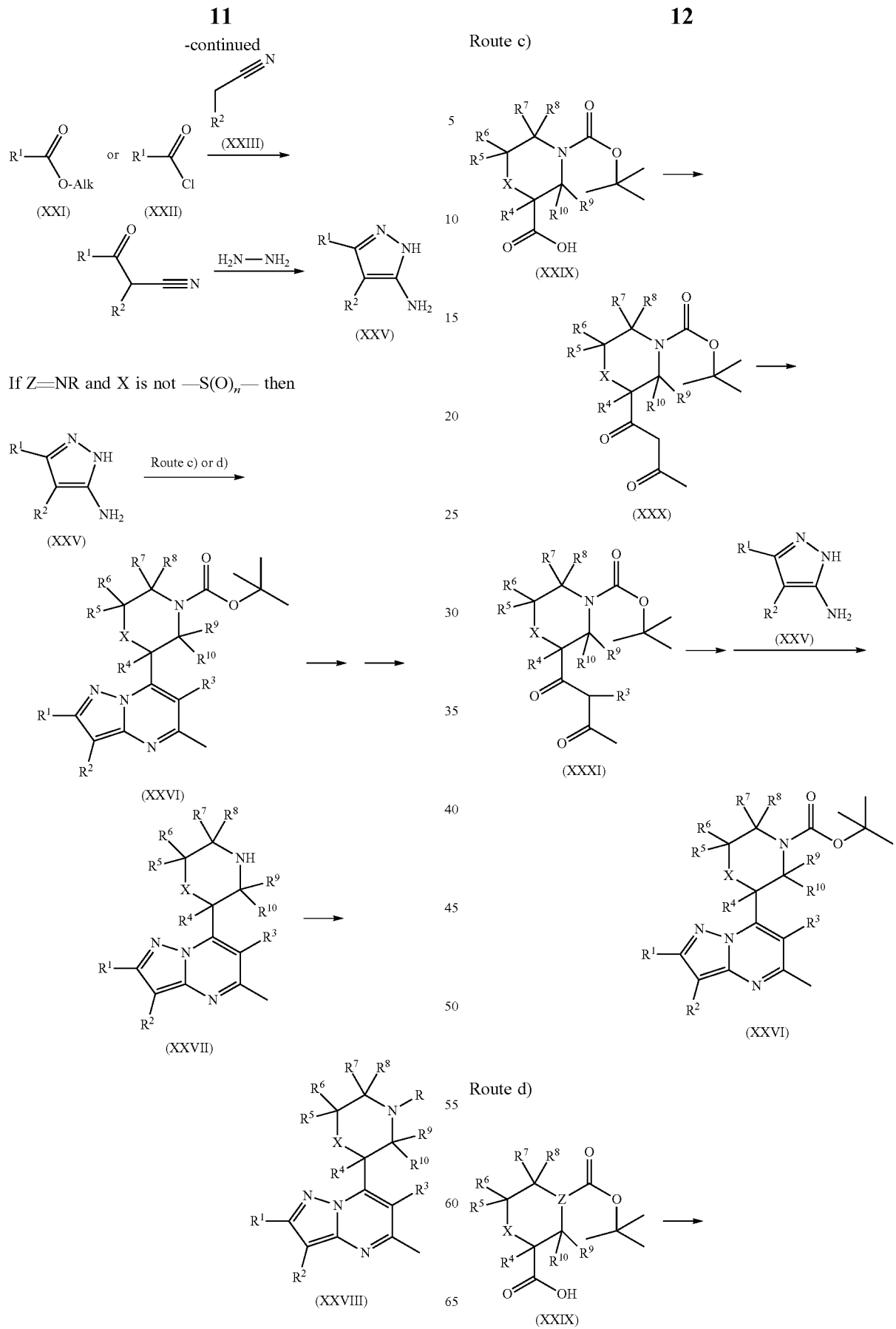

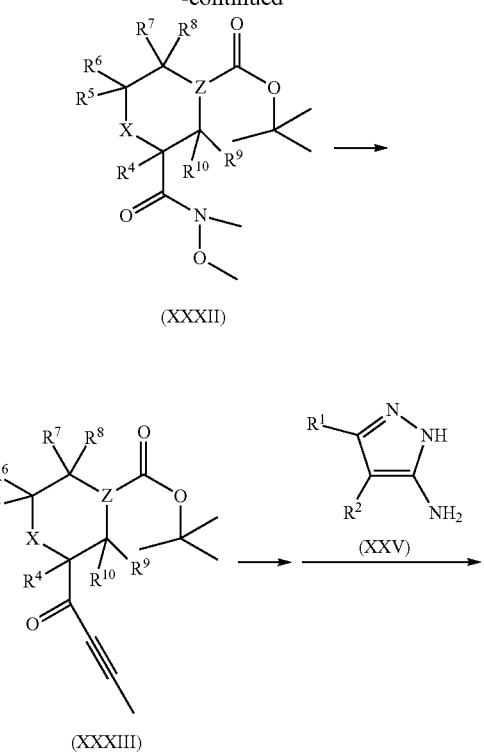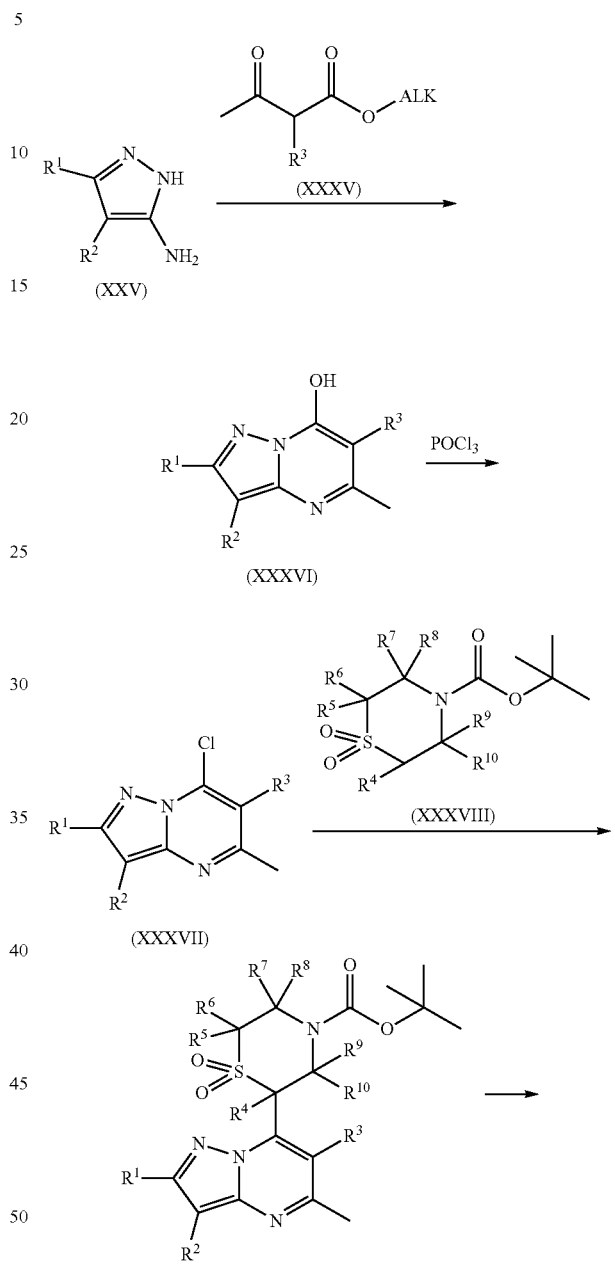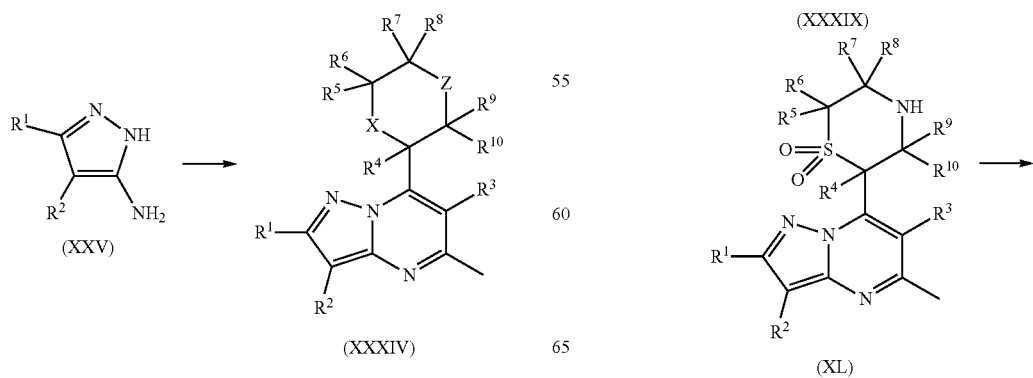

-continued

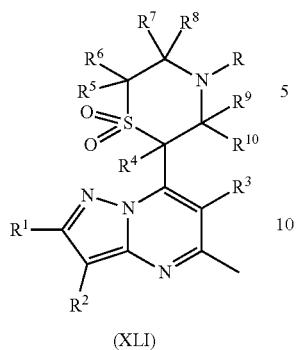

(XLI)

If R⁹ and R¹⁰ together form an oxo group:

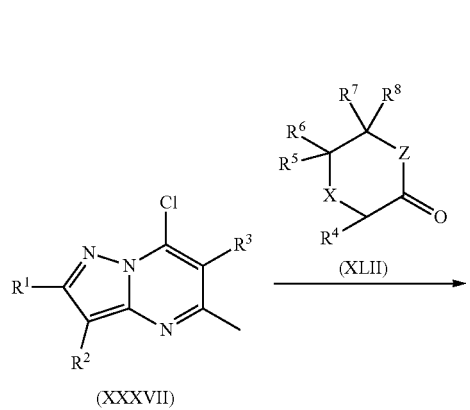

(XXXVII)             (XLII)

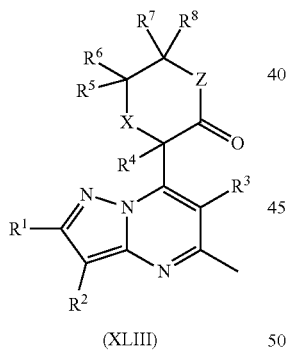

(XLIII)

If R⁹=R¹⁰=H; X=O and Z=NR then: reacting β-amino-alcohol derivative of formula (II)

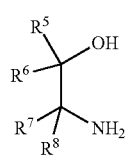

(II)

wherein the meaning of R⁵, R⁶, R⁷, R⁸, R is described above for compound of formula (I) with 4-Methoxybenzaldehyde, then with a reducing agent The so obtained β-amino-alcohol derivative of formula (III) is reacted with

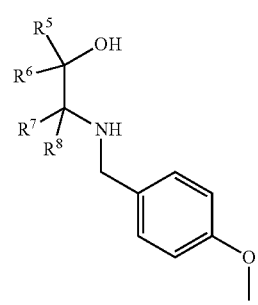

(III)

epichlorohydrin to provide a compound of formula (IV)

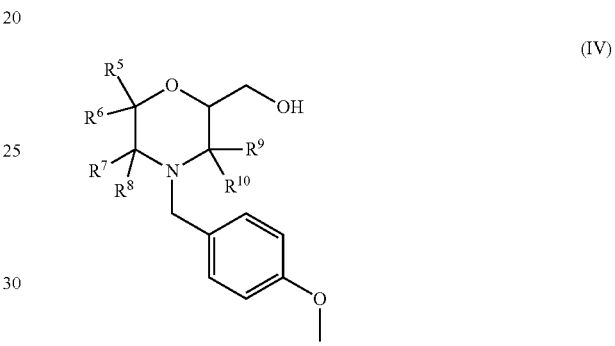

(IV)

The so obtained morpholine derivative of formula (IV) is reacted with hydrogen and then with di-tert-butyl dicarbonate to provide a compound of formula (V)

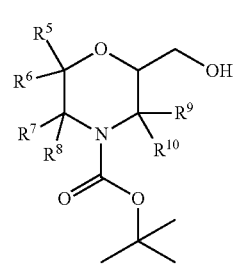

(V)

The so obtained morpholine derivative of formula (V) is oxidized to carboxylic acid derivative of formula (VI)

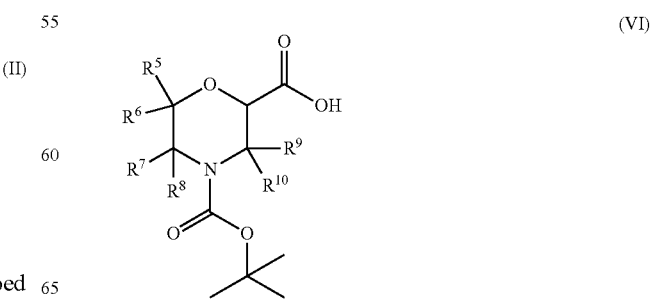

(VI)

If R⁴ is not H then:
Route a): reacting carboxylic acid ester derivative of formula (VII)

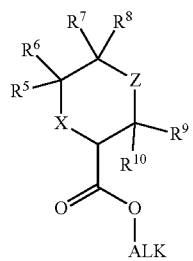
(VII)

wherein the meaning of R⁵, R⁶, R⁷, R⁸, R⁹, R¹⁰, X, Z is described above for compound of formula (I) with an alkyl halide of formula (IX)

R⁴X    (IX)

wherein the meaning of R⁴ is described above for compound of formula (I)
The so obtained heterocycle of formula (X) is hydrolyzed

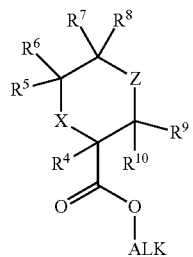
(X)

to provide the carboxylic acid derivative of formula (VII)

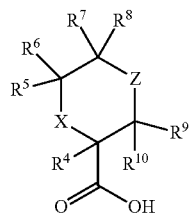
(VIII)

Route b): reacting carboxylic acid ester derivative of formula (VII)

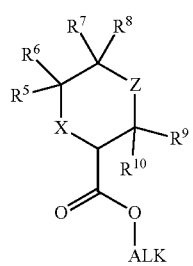
(VII)

wherein the meaning of R⁵, R⁶, R⁷, R⁸, R⁹, R¹⁰, X, Z is described above for compound of formula (I) with formaldehyde The so obtained hydroxymethyl derivative of formula (XI) is reacted with

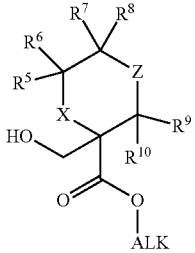
(XI)

trifluoromethanesulfonic anhydride to provide a compound of formula (XII)

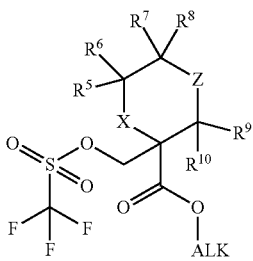
(XII)

The so obtained triflate derivative of formula (XII) is reacted with tetrabutylammonium fluoride to provide a compound of formula (XIII).

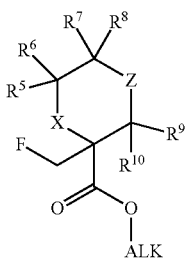
(XIII)

The so obtained fluoromethyl derivative of formula (XIII) is hydrolyzed to provide the carboxylic acid derivative of formula (VIII)
If R⁴=R⁶=R⁸=R¹⁰=H; X=CRˣRʸ; Rʸ=H and Z=NR then reacting nicotinic acid derivative of formula (XIV) or nicotinic acid ester derivative of formula (XV)

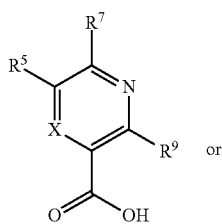
(XIV)

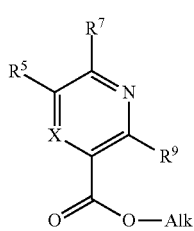
(XV)

wherein the meaning of $R^5$, $R^7$, $R^9$ is described above for compound of formula (I) with hydrogen, then with di-tert-butyl dicarbonate. If the product is a carboxylic acid ester, it is hydrolysed to furnish the piperidine derivative of formula (XVI)

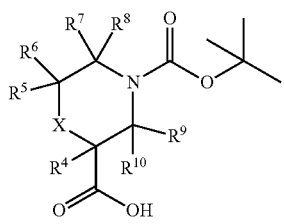
(XVI)

If $R^4$=H; X=$CR^xR^y$ and Z=NR then reacting lactame derivative of formula (XVII)

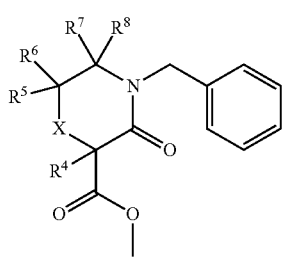
(XVII)

wherein the meaning of $R^4$, $R^5$, $R^6$, $R^7$, $R^8$ is described above for compound of formula (I) with a reducing agent to provide the piperidine derivative of formula (XVIII)

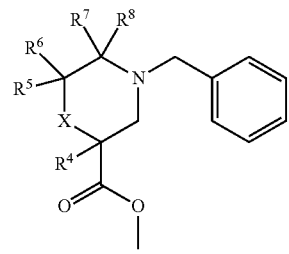
(XVIII)

The so obtained piperidine derivative of formula (XVIII) is reacted with hydrogen, then with di-tert-butyl dicarbonate to furnish piperidine derivative of formula (XIX)

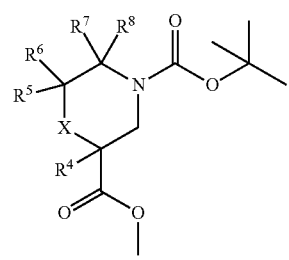
(XIX)

The carboxylic acid ester is hydrolysed to provide piperidine derivative (XX).

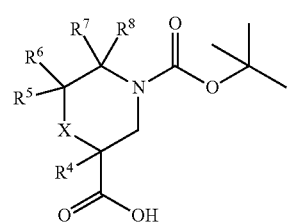
(XX)

Reacting a carboxylic acid ester derivative of formula (XXI) or carboxylic acid chloride derivative of formula (XXII)

$$R^1-\underset{O}{\overset{O}{\|}}-O-Alk \quad \text{or} \quad (XXI)$$

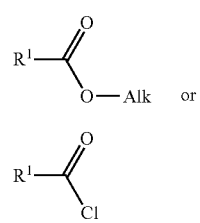
(XXII)

wherein the meaning of $R^1$ is described above for compound of formula (I)—with an acetonitrile derivative of formula (XXIII)

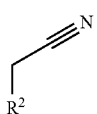
(XXIII)

wherein the meaning of $R^2$ is described above for compound of formula (I), then the so obtained acylacetonitrile derivative of formula (XXIV) is reacted with

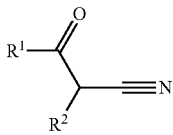
(XXIV)

hydrazine hydrate to provide a compound of formula (XXV)

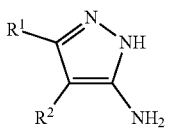
(XXV)

If Z=NR and X is not $S(O)_n$ then reacting aminopyrazole derivative of formula (XXV) with either
c) acetylacetone derivative of formula (XXXI)

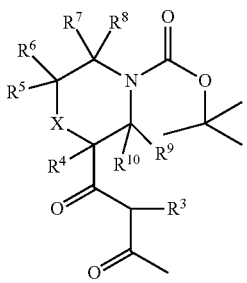

wherein the meaning of $R^3, R^4, R^5, R^6, R^7, R^8, R^9, R^{10}$ is described above for compound of formula (I), or
d) alkyne derivative of formula (XXXIII)

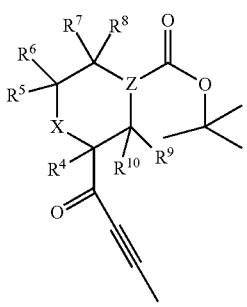
(XXXIII)

wherein the meaning of $R^4, R^5, R^6, R^7, R^8, R^9, R^{10}$ is described above for compound of formula (I) to furnish pyrazolo[1,5-a]pyrimidine derivative of formula (XXVI)

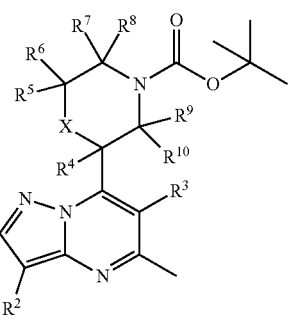
(XXVI)

The so obtained compound is treated with strong acid to furnish the amine derivative of formula (XXVII).

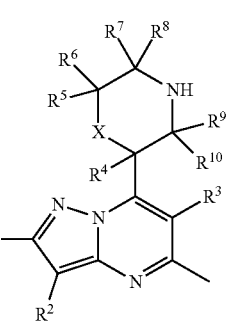
(XXVII)

The so obtained compound is treated with the appropriate reagents to furnish examples of formula (XXVIII)

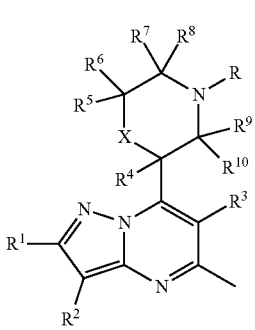
(XXVIII)

Route c): reacting carboxylic acid derivative of formula (XXIX)

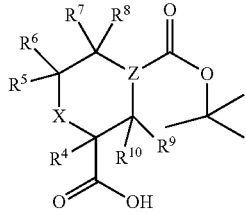

(XXIX)

wherein the meaning of $R^3, R^4, R^5, R^6, R^7, R^8, R^9, R^{10}$ is described above for compound of formula (I) with acetone The so obtained acetylacetone derivative of formula (XXX)

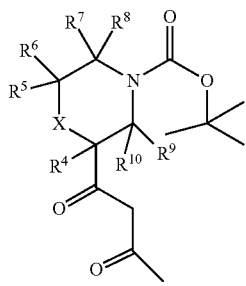

(XXX)

is reacted with the appropriate alkyl halide to furnish the acetylacetone derivative of formula (XXXI)

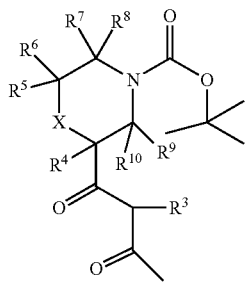

(XXXI)

Route d): reacting carboxylic acid derivative of formula (XXIX)

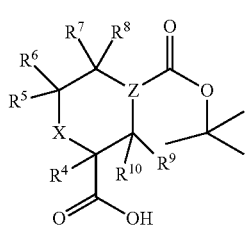

(XXIX)

wherein the meaning of $R^3, R^4, R^5, R^6, R^7, R^8, R^9, R^{10}$ is described above for compound of formula (I) with N,O-dimethylamine The so obtained Weinreb amide derivative of formula (XXXII)

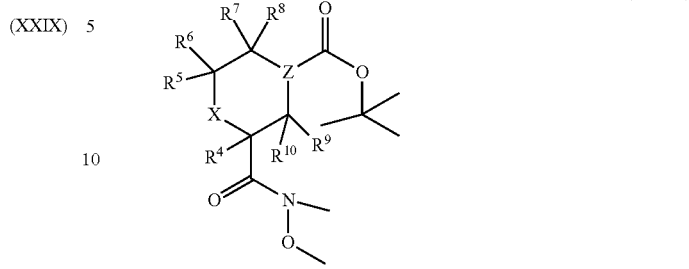

(XXXII)

is reacted with 1-Propynylmagnesium bromide to furnish alkyne derivative of formula (XXXIII).

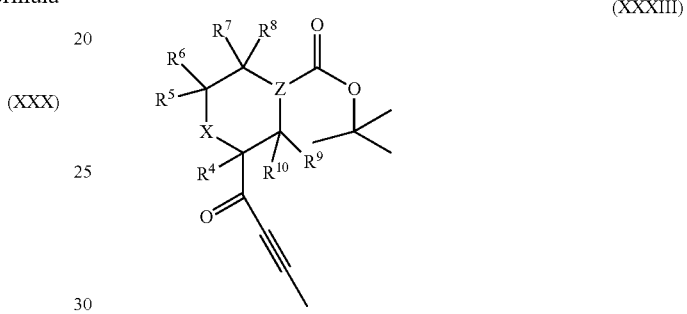

(XXXIII)

If Z=O os S(O)$_2$: reacting aminopyrazole derivative of formula (XXV) with the appropriate acetylacetone derivative or the appropriate alkyne derivative to furnish the pyrazolo[1,5-a]pyrimidine derivative of formula (XXXIV)

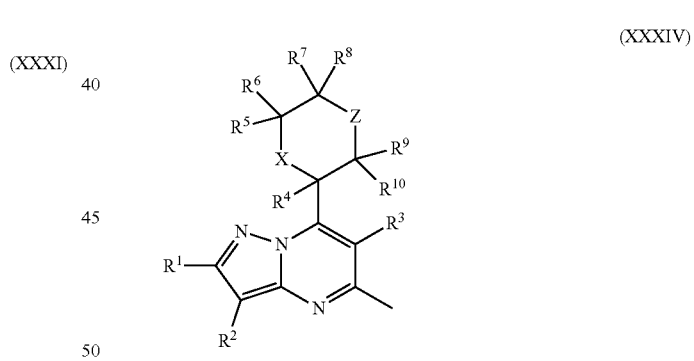

(XXXIV)

wherein the meaning of $R^3, R^4, R^5, R^6, R^7, R^8, R^9, R^{10}$, X, Z is described above for compound of formula (I)

If X=S(O)$_2$ and Z=NR then: reacting aminopyrazole derivative of formula (XXV) with acylacetic ester derivative of formula (XXXV)

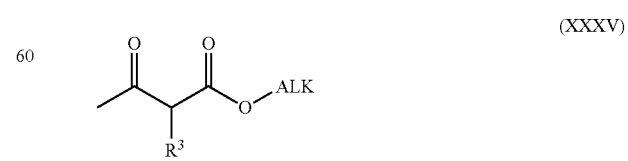

(XXXV)

wherein the meaning of $R^3$ is described above for compound of formula (I)

The so obtained compound of formula (XXXVI)

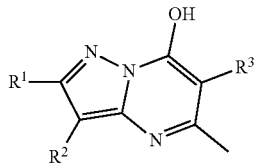
(XXXVI)

is chlorinated to furnish a chloro derivative of formula (XXXVII)

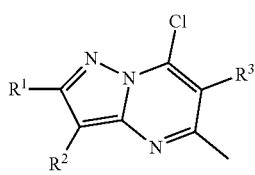
(XXXVII)

The so obtained compound is reacted with sulfone derivative of compound (XXXVII)

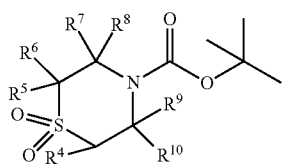
(XXXVIII)

wherein the meaning of $R^4$, $R^5$, $R^6$, $R^7$, $R^8$, $R^9$, $R^{10}$ is described above for compound of formula (I) to furnish the sulfone derivative of compound (XXXIX).

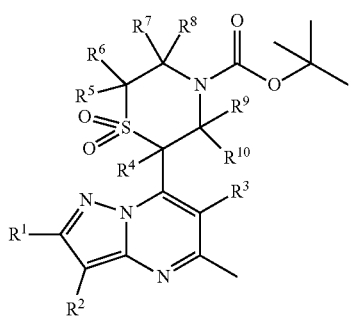
(XXXIX)

The so obtained compound is treated with strong acid to furnish the amine derivative of formula (XL).

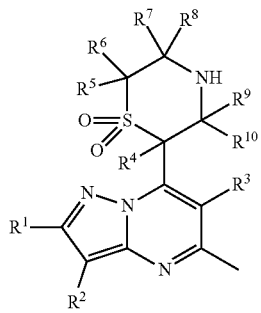
(XL)

The so obtained compound is treated with the appropriate reagents to furnish examples of formula (XLI)

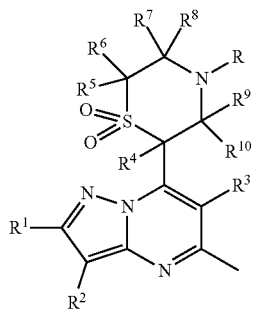
(XLI)

If $R^9$ and $R^{10}$ together form an oxo group: reacting chloro derivative of formula (XXXVII) with heterocycle of formula (XLII)

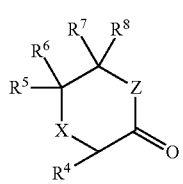
(XLII)

wherein the meaning of $R^4$, $R^5$, $R^6$, $R^7$, $R^8$ is described above for compound of formula (I) to furnish examples of formula (XLIII)

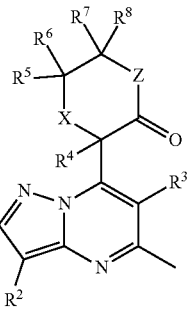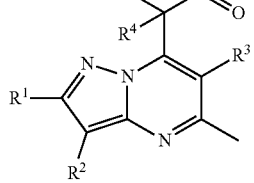
(XLIII)

The synthesis of carboxylic acid derivative of formula (VI) can be carried out in the following way:

The reaction of β-amino-alcohol derivative of formula (II) with 4-Methoxybenzaldehyde is preferably carried out in a proper solvent, e.g. methanol. The reducing agent is preferably NaBH$_4$. The reaction is carried out at a temperature in the range of 0° C. to room temperature. The necessary reaction time is 1-16 h. The reactions are followed by thin layer chromatography. The reaction is quenched by the addition of water. The product (III) is isolated by extraction with a proper organic solvent.

The ring closure of β-amino-alcohol derivative of formula (III) is preferably carried out in a suitable solvent, e.g. toluene with epichlorohydrin, suitable Lewis acid, e.g. LiClO$_4$, and a suitable base, e.g. NaOMe in MeOH. The reaction is carried out at a temperature in the range of 0° C. to room temperature. The necessary reaction time is 24-48 h. The reactions are followed by thin layer chromatography. The reaction is quenched by the addition of saturated NH$_4$Cl solution. The crude product is isolated by extraction with a proper organic solvent. The product (IV) is purified by column chromatography. The column chromatography is carried out on normal phase using Kieselgel 60 as adsorbent and different solvent systems, e.g. cyclohexane/ethyl acetate.

The hydrogenation of morpholine derivative of formula (IV) is preferably carried out in a suitable solvent, e.g. ethanol, in the presence of a suitable catalyst, e.g. palladium on carbon, in the presence of di-tert-butyl dicarbonate. The reaction is preferably carried out at room temperature, preferably at 5-10 bar. The necessary reaction time is 24-72 h. The reactions are followed by thin layer chromatography. The crude product is isolated after filtration over Celite pad. The product (V) is purified by column chromatography. The column chromatography is carried out on normal phase using Kieselgel 60 as adsorbent and different solvent systems, e.g. cyclohexane/ethyl acetate.

The oxidation of morpholine derivative of formula (V) is preferably carried out in a suitable solvent system, e.g. dichloromethane/water, preferably in the presence of TEMPO radical and (Diacetoxyiodo)benzene. The reaction is carried out at a temperature in the range of 0° C. to room temperature. The necessary reaction time is 1-16 h. The reactions are followed by thin layer chromatography. The crude product is isolated by extraction with a proper organic solvent. The product (VI) is crystallized from a suitable solvent, preferably hexane.

The synthesis of carboxylic acid derivative of formula (VIII) can be carried out by different routes:
Route a):
The reaction of a carboxylic acid ester derivative of formula (VII) with an alkyl halide derivative of formula (IX) is preferably carried out in a proper solvent e.g. tetrahydrofuran, preferably in the presence of a strong base, e.g. lithium bis(trimethylsilyl)amide. The reaction is carried out at a temperature in the range of −78° C. to room temperature. The necessary reaction time is 1-16 h. The reactions are followed by thin layer chromatography. The reaction is quenched by the addition of saturated NH$_4$Cl solution. The product (X) is isolated by extraction with a proper organic solvent.

The obtained carboxylic acid ester derivative of formula (X) is hydrolyzed in a suitable solvent mixture, e.g. ethanol/water, in the presence of an alkali, e.g. sodium hydroxide. The reaction is carried out at a temperature in the range of 0° C. to room temperature. The necessary reaction time is 1-16 h. The reactions are followed by thin layer chromatography. The reaction mixture is acidified to pH=3 with a suitable acid, e.g. citric acid. The product (VIII) is isolated by extraction with a proper organic solvent.

Route b):
The reaction of a carboxylic acid ester derivative of formula (VII) with formaldehyde is preferably carried out in a proper solvent e.g. tetrahydrofuran, preferably in the presence of a strong base, e.g. lithium bis(trimethylsilyl)amide. The reaction is carried out at a temperature in the range of −78° C. to room temperature. The necessary reaction time is 1-16 h. The reactions are followed by thin layer chromatography. The reaction is quenched by the addition of saturated NH$_4$Cl solution. The product (XI) is isolated by extraction with a proper organic solvent.

The triflation of hydroxymethyl derivative of formula (XI) with e.g. trifluoromethanesulfonic anhydride is preferably carried out in a proper solvent e.g. dichloromethane, preferably in the presence of a base, e.g. pyridine. The reaction is carried out at a temperature in the range of −78° C. to room temperature. The necessary reaction time is 1-16 h. The reactions are followed by thin layer chromatography. The reaction is quenched by the addition of 1M HCl solution. The product (XII) is isolated by extraction with a proper organic solvent.

The fluorination of triflate derivative of formula (XII) with tetrabutylammonium fluoride is preferably carried out in a proper solvent, e.g. tetrahydrofuran. The reaction is preferably carried out at room temperature. The necessary reaction time is 1-16 h. The reactions are followed by thin layer chromatography. The reaction is quenched by the addition of water. The crude product is isolated by extraction with a proper organic solvent. The product (XIII) is purified by column chromatography. The column chromatography is carried out on normal phase using Kieselgel 60 as adsorbent and different solvent systems, e.g. cyclohexane/ethyl acetate.

The obtained carboxylic acid ester derivative of formula (XIII) is hydrolyzed in a suitable solvent mixture, e.g. ethanol/water, in the presence of an alkali, e.g. sodium hydroxide. The reaction is carried out at a temperature in the range of 0° C. to room temperature. The necessary reaction time is 1-16 h. The reactions are followed by thin layer chromatography. The reaction mixture is acidified to pH=3 with a suitable acid, e.g. citric acid. The product (VIII) is isolated by extraction with a proper organic solvent.

The synthesis of carboxylic acid derivative of formula (XVI) can be carried out in the following way:

The reaction of nicotinic acid derivative of formula (XIV) or nicotinic acid ester derivative of formula with hydrogen is preferably carried out in a proper solvent, e.g. water or alcohol, in the presence of a proper catalyst, e.g. platinum (IV) oxide. The reaction is preferably carried out at room temperature, preferably at 5-10 bar. The necessary reaction time is 24-72 h. The reactions are followed by thin layer chromatography. The product is isolated after filtration over Celite pad. The reaction with di-tert-butyl dicarbonate is preferably carried out in a proper solvent or solvent system, e.g. tetrahydrofuran with water, optionally in the presence of a base, e.g. sodium bicarbonate. The product is isolated by extraction with a proper organic solvent. If the product is a carboxylic acid ester, it is hydrolyzed in a proper solvent system, e.g. ethanol/water, in the presence of an alkali, e.g. sodium hydroxide. The reaction is carried out at a temperature in the range of 0° C. to room temperature. The necessary reaction time is 1-16 h. The reactions are followed by thin layer chromatography. The reaction mixture is acidified to pH=3 with a suitable acid, e.g. citric acid. The product (XVI) is isolated by extraction with a proper organic solvent.

The synthesis of carboxylic acid derivative of formula (XX) can be carried out in the following way:

The reaction of lactam derivative of formula (XVII) with a proper reducing agent, e.g. NaBH$_4$ with boron trifluoride diethyl etherate is preferably carried out in a proper solvent e.g. tetrahydrofuran. The reaction is carried out at a temperature in the range of −15° C. to room temperature. The necessary reaction time is 1-16 h. The reactions are followed by thin layer chromatography. The reaction is quenched by the addition of water. The product (XVIII) is isolated by extraction with a proper organic solvent.

The hydrogenation of piperidine derivative of formula (XVIII) is preferably carried out in a suitable solvent, e.g. methanol, in the presence of a suitable catalyst, e.g. palladium on carbon, in the presence of di-tert-butyl dicarbonate. The reaction is preferably carried out at room temperature, preferably at 5-10 bar. The necessary reaction time is 24-72 h. The reactions are followed by thin layer chromatography. The crude product is isolated after filtration over Celite pad. The product (XIX) is purified by column chromatography. The column chromatography is carried out on normal phase using Kieselgel 60 as adsorbent and different solvent systems, e.g. cyclohexane/ethyl acetate.

The obtained carboxylic acid ester derivative of formula (XIX) is preferably hydrolyzed in a suitable solvent, e.g. tetrahydrofuran, in the presence of potassium trimethylsilanolate. The reaction is carried out at a reflux temperature. The necessary reaction time is 1-16 h. The reactions are followed by thin layer chromatography. The reaction mixture is acidified to pH=4 with a suitable acid, e.g. citric acid. The product (XX) is isolated by extraction with a proper organic solvent.

The synthesis of aminopyrazole derivative of formula (XXV) can be carried out in the following way:

The reaction of a carboxylic acid ester derivative of formula (XXI) or carboxylic acid chloride derivative of formula (XXII) with an acetonitrile derivative of formula (XXIII) is preferably carried out in a proper solvent, e.g. tetrahydrofuran, preferably in the presence of a strong base e.g. n-butyllithium, lithium bis(trimethylsilyl)amide. The reaction carried out at a temperature in the range of −78° C. to room temperature. The necessary reaction time is 1-16 h. The reactions are followed by thin layer chromatography. The reaction mixture is quenched by addition of water and hydrochloric acid (~pH 2-3) or saturated ammonium chloride solution. The product acylacetonitrile derivative of formula (XXIV) is isolated by extraction with a proper organic solvent.

The cyclocondensation reaction of the acylacetonitrile derivative of formula (XXIV) with hydrazine hydrate to aminopyrazole derivatives of formula (XXV) is preferably carried out in a suitable solvent, e.g. ethanol. The reaction is preferably carried out at boiling point of the solvent. The necessary reaction time is 1-6 h. The reactions are followed by thin layer chromatography. The reaction is quenched by the addition of water. The product (XXV) is isolated by extraction with a proper organic solvent.

The synthesis of pyrazolo[1,5-a]pyrimidine derivative of formula (XXVI) can be carried out in the following ways:
Route c):

The cyclocondensation reaction of the aminopyrazole derivative of formula (XXV) with acetylacetone derivatives of formula (XXXI) is preferably carried out in a suitable solvent, e.g. toluene, in the presence of a proper catalyst, e.g. p-Toluenesulfonic acid monohydrate. The reaction is preferably carried out at boiling point of the solvent. The necessary reaction time is 1-16 h. The reactions are followed by thin layer chromatography. The product (XXVI) is purified by column chromatography. The column chromatography is carried out on normal phase using Kieselgel 60 as adsorbent and different solvent systems, e.g. cyclohexane/ethyl acetate.

Route d):

The cyclocondensation reaction of the aminopyrazole derivative of formula (XXV) with alkyne derivatives of formula (XXXIII) is preferably carried out in a suitable solvent, e.g. ethanol, in the presence of a proper base, e.g. pyrrolidine, and a suitable acid, e.g. acetic acid. The reaction is preferably carried out at 60° C. The necessary reaction time is 4-16 h. The reactions are followed by thin layer chromatography. The product (XXVI) is purified by column chromatography. The column chromatography is carried out on normal phase using Kieselgel 60 as adsorbent and different solvent systems, e.g. cyclohexane/ethyl acetate.

The synthesis of pyrazolo[1,5-a]pyrimidine derivative of formula (XXVIII) can be carried out in the following way:

The reaction of pyrazolo[1,5-a]pyrimidine derivative of formula (XXVI) with a strong acid, e.g. trifluoroacetic acid is preferably carried out in a proper solvent, e.g. dichloromethane. The reaction carried out at a temperature in the range of 0° C. to room temperature. The necessary reaction time is 1-16 h. The reactions are followed by thin layer chromatography. The reaction mixture is quenched by addition of 2M sodium hydroxide solution (~pH 12-14). The product pyrazolo[1,5-a]pyrimidine derivative of formula (XXVII) is isolated by extraction with a proper organic solvent.

The compound pyrazolo[1,5-a]pyrimidine derivative of formula (XXVII) can be transformed to pyrazolo[1,5-a]pyrimidine derivative of formula (XXVIII) in the following ways:

In certain embodiments the reaction of pyrazolo[1,5-a]pyrimidine derivative of formula (XXVII) with methyl bromoacetate, in the presence of a base, e.g. N,N-Diisopropylethylamine, is preferably carried out in a proper solvent, e.g. toluene. The reaction is preferably carried out at room temperature. The necessary reaction time is 4-16 h. The reactions are followed by thin layer chromatography. The reaction is quenched by the addition of water. The crude product is isolated by extraction with a proper organic solvent. The crude product is purified by column chromatography. The column chromatography is carried out on normal phase using Kieselgel 60 as adsorbent and different solvent systems, e.g. acetone/dichloromethane. The product is hydrolyzed in the presence of hydrochloric acid, in a suitable solvent, e.g. water, to furnish pyrazolo[1,5-a]pyrimidine derivative of formula (XXVIII).

In certain embodiments the reaction of pyrazolo[1,5-a]pyrimidine derivative of formula (XXVII) with N-Boc protected amino acids, in the presence of a base, e.g. N,N-Diisopropylethylamine, is carried out in a proper solvent, e.g. dimethylformamide, using a proper coupling agent, e.g. HBTU. The reaction is preferably carried out at room temperature. The necessary reaction time is 1-16 h. The reactions are followed by thin layer chromatography. The reaction is quenched by the addition of water. The crude product is isolated by extraction with a proper organic solvent. The product is purified by column chromatography. The column chromatography is carried out on normal phase using Kieselgel 60 as adsorbent and different solvent systems, e.g. methanol/dichloromethane. The product is reacted with strong acid, e.g. Trifluoroacetic acid, in a proper solvent, e.g. dichloromethane. The reaction is preferably carried out at 0° C. to room temperature. The necessary reaction time is 1-16 h. The reactions are followed by thin layer chromatography. The product (XXVIII) is purified by column chromatography. The column chromatography is carried out on normal phase using Kieselgel 60 as adsorbent and different solvent systems, e.g. methanol/dichloromethane.

In certain embodiments the reaction of pyrazolo[1,5-a]pyrimidine derivative of formula (XXVII) with acyl chlorides, in the presence of a base, e.g. triethylamine, is preferably carried out in a proper solvent, e.g. dichloromethane. The reaction is preferably carried out at 0° C. to room temperature. The necessary reaction time is 1-16 h. The reactions are followed by thin layer chromatography. The reaction is quenched by the addition of water. The crude product is isolated by extraction with a proper organic solvent. The product (XXVIII) is purified by column chromatography. The column chromatography is carried out on normal phase using Kieselgel 60 as adsorbent and different solvent systems, e.g. methanol/dichloromethane.

In certain embodiments the reaction of pyrazolo[1,5-a]pyrimidine derivative of formula (XXVII) with formic acid, is preferably carried out in a proper solvent, e.g. toluene. The reaction is preferably carried out at boiling point of the solvent. The necessary reaction time is 4-16 h. The reactions are followed by thin layer chromatography. The reaction is quenched by the addition of water. The crude product is isolated by extraction with a proper organic solvent. The product (XXVIII) is purified by column chromatography. The column chromatography is carried out on normal phase using Kieselgel 60 as adsorbent and different solvent systems, e.g. methanol/dichloromethane.

In certain embodiments the reaction of pyrazolo[1,5-a]pyrimidine derivative of formula (XXVII) with carboxylic acids, in the presence of a base, e.g. N,N-Diisopropylethylamine, is carried out in a proper solvent, e.g. dimethylformamide, using a proper coupling agent, e.g. HBTU. The reaction is preferably carried out at room temperature. The necessary reaction time is 1-16 h. The reactions are followed by thin layer chromatography. The reaction is quenched by the addition of water. The crude product is isolated by extraction with a proper organic solvent. The product (XXVIII) is purified by column chromatography. The column chromatography is carried out on normal phase using Kieselgel 60 as adsorbent and different solvent systems, e.g. methanol/dichloromethane.

In certain embodiments the reaction of pyrazolo[1,5-a]pyrimidine derivative of formula (XXVII) with 1-Amidinopyrazole Hydrochloride, in the presence of a base, e.g. N,N-Diisopropylethylamine, is preferably carried out in a proper solvent, e.g. dimethylformamide. The reaction is preferably carried out at room temperature. The necessary reaction time is 1-16 h. The reactions are followed by thin layer chromatography. The product (XXVIII) is isolated by filtration.

In certain embodiments the reaction of pyrazolo[1,5-a]pyrimidine derivative of formula (XXVII) with the proper aldehyde or ketone, in the presence of a reducing agent, e.g. Sodium triacetoxyborohydride, in the presence of acetic acid, is preferably carried out in a proper solvent, e.g. 1,2-Dichloroethane. The reaction is preferably carried out at room temperature. The necessary reaction time is 1-16 h. The reactions are followed by thin layer chromatography. The reaction is quenched by the addition of water. The crude product is isolated by extraction with a proper organic solvent. The product (XXVIII) is purified by column chromatography. The column chromatography is carried out on normal phase using Kieselgel 60 as adsorbent and different solvent systems, e.g. methanol/dichloromethane.

In certain embodiments the reaction of pyrazolo[1,5-a]pyrimidine derivative of formula (XXVII) with (Trimethylsilyl)isocyanate, is preferably carried out in a proper solvent, e.g. dichloromethane. The reaction is preferably carried out at room temperature. The necessary reaction time is 1-16 h. The reactions are followed by thin layer chromatography. The reaction is quenched by the addition of water. The crude product is isolated by extraction with a proper organic solvent. The product (XXVIII) is purified by column chromatography. The column chromatography is carried out on normal phase using Kieselgel 60 as adsorbent and different solvent systems, e.g. methanol/dichloromethane.

In certain embodiments the reaction of pyrazolo[1,5-a]pyrimidine derivative of formula (XXVII) with sulfamide, is preferably carried out in a proper solvent, e.g. dioxane. The reaction is preferably carried out at boiling point of the solvent. The necessary reaction time is 1-16 h. The reactions are followed by thin layer chromatography. The reaction is quenched by the addition of water. The crude product is isolated by extraction with a proper organic solvent. The product (XXVIII) is purified by column chromatography. The column chromatography is carried out on normal phase using Kieselgel 60 as adsorbent and different solvent systems, e.g. methanol/dichloromethane.

The compounds of the present invention and optical antipodes or racemates and/or salts thereof can be used as such or suitably in the form of pharmaceutical compositions.

The invention also relates to the pharmaceutical compositions containing the compounds of formula (I) or optical antipodes or racemates and/or salts thereof as active ingredient for the treatment of certain disorders associated with $GABA_B$ receptor positive allosteric modulator activity.

The present compounds may be co-adminstered to a subject in combination with two or more different therapeutic agents (eg. most preferably antipsychotics and psychostimulants; and preferably antidepressants, anxiolytics, antihypertensives, anticonvulsants, sedatives, and narcotics).

Suitable routes of administration may, for example, include oral, rectal, transmucosal, transdermal or intestinal administration; parenteral delivery, including intramuscular, subcutaneous, intravenous, intramedullary injections, as well as intraarticular, intrathecal, direct intraventricular, intraperitoneal, intranasal, or intraocular injections and eye drops.

Alternatively, one may administer the compound in a local rather than systemic manner, for example, via injection of the compound directly in the renal or cardiac area, often in a depot or sustained release formulation. Furthermore, one may administer the drug in a targeted drug delivery system, for example, in a liposome coated with a tissue-specific antibody. The liposomes will be targeted to and taken up selectively by the organ.

The pharmaceutical compositions can be administered through via a variety of routes and dosages forms. The compound of the invention may be administered either alone or in combination with pharmaceutically acceptable carriers, in either single or multiple doses. The dosage required to exert the therapeutic effect can vary within wide limits and will be fitted to the individual requirements in each of the particular case, depending on the stage of the disease, the condition and the bodyweight of the patient to be treated, as well as the sensitivity of the patient against the active ingredient, route of administration and number of daily treatments.

For the sake of a simple administration it is suitable if the pharmaceutical compositions comprise dosage units containing the amount of the active ingredient to be administered once, or a few multiples or a half, third or fourth part thereof. Such dosage units are e.g. tablets, which can be powdered with grooves promoting the halving or quartering of the tablet in order to exactly administer the required amount of the active ingredient.

The pharmaceutical compositions containing the active ingredient according to the present invention usually contain 0.01 to 500 mg of active ingredient in a single dosage unit. It is, of course possible that the amount of the active ingredient in some compositions exceeds the upper or lower limits defined above.

As a further aspect of the invention there is provided the pharmaceutical manufacture of medicaments containing the compounds of formula (I) or optical antipodes or racemates and/or salts thereof.

The pharmaceutical compositions of the present invention may be formulated as different pharmaceutical dosage forms, such as but not limited to, solid oral dosage forms like tablets (e.g. buccal, sublingual, effervescents, chewable, orodispersible, freeze dried), capsules, lozenges, pastilles, pills, orodispersible films, granules, powders; liquid oral dosage forms like solutions, emulsions, suspensions, syrups, elixirs, oral drops; parenteral dosage forms like intravenous injections, intramuscular injections, subcutaneous injections; other dosage forms like eye drops, semi-solid eye preparations, transdermal dosage forms, suppositories, rectal capsules, rectal solutions, emulsions and suspensions, etc.

In one embodiment the invention relates to pharmaceutical dosage forms specifically intended for pediatric use, such as but not limited to, solutions, syrups, elixirs, suspensions, powders for reconstitution as suspension, dispersible or effervescent tablets, chewable tablets, orally disintegrating tablets, tablets or coated tablets, sprinkle oral powder or granules, capsules.

The pharmaceutical compositions of the present invention may be manufactured in a manner that is itself known, e.g., by means of conventional mixing, dissolving, emulsifying, suspending, entrapping, freeze-drying, extrusion, laminating, film-casting, granulating, grinding, encapsulating, dragee-making or tableting processes.

Pharmaceutical compositions for use in accordance with the present invention thus may be formulated in conventional manner using one or more physiologically acceptable carriers comprising excipients and auxiliaries which facilitate processing of the active compounds into preparations which can be used pharmaceutically. Proper formulation is dependent upon the route of administration chosen. Any of the well-known techniques, carriers, and excipients may be used as suitable and as understood in the art.

Suitable excipients for the preparation of the dosage forms may be selected from the following categories, such as but not limited to, tablet and capsule fillers, tablet and capsule binders, modified-release agents, disintegrants, glidants, lubricants, sweetening agents, taste-masking agents, flavoring agents, coating agents, surfactants, antioxidants, buffering agents, complexing agents, emulsifying agents, lyophilization aids, microencapsulating agents, ointment bases, penetration enhancers, solubilizing agents, solvents, suppository bases, suspending agents.

In one embodiment the invention relates to the using of specific excipients which are able to improve the solubility, dissolution, penetration, adsorption or bioavailability of the active ingredient(s), such as but not limited to, hydrophilic polymers, hot melt extrusion excipients, surfactants, buffering agents, complexing agents, emulsifying agents, lyophilization aids, superdisintegrants, microencapsulating agents, penetration enhancers, solubilizing agents, co-solvents, suspending agents.

The above described ingredients and different routes of manufacture are merely representative. Other materials as well as processing techniques and the like well known in the art can also be used.

The compounds are effective in the treatment of psychiatric, neurodevelopmental, neurological and other central nervous system disorders as well as peripheral conditions where stimulation of the $GABA_B$ receptor may offer therapeutic benefit Biological Evaluation In Vitro [$^{35}$S]GTPγS Binding Assay in Rat Cortical Membranes Cortices of freshly harvested rat brains were dissected on an ice-cold surface and homogenized by a glass Dounce homogeniser immediately in ice-cold buffer containing 50 mM Tris, 5 mM $MgCl_2$ and 1 mM EDTA (pH=7.6). Tissue homogenates were centrifuged at 40000 g for 15 min at 4° C. Membrane pellets were resuspended in the same buffer and membranes were incubated for 10 min at 30° C. in a shaking water bath to eliminate endogenous GABA. Homogenates were centrifuged again under the same conditions. The final pellets were resuspended in ice-cold buffer (pH=7.6) containing 50 mM Tris, 100 mM NaCl, 7 mM $MgCl_2$, 1 mM EDTA and 1 mM dithiotreithol (DTT) to yield a concentration of 20 mg tissue weight/ml and frozen at −70° C. until use. The assay was done in a buffer containing 50 mM Tris (pH=7.4), 100 mM NaCl, 7 mM $MgCl_2$, 1 mM EDTA and 1 mM DTT. Each assay tube contained 150 μL GDP (in a final concentration of 50 μM), 100 μL ligand and 125 μL of the membrane suspension (250 μg tissue/tube). The assay tubes were preincubated for 10 min at 30° C. to assure equilibrium. Nonspecific binding was determined in the presence of 10 μM GTPγS; basal binding was determined in the presence of buffer only. After addition of 50 μM [$^{35}$S]GTPγS in a volume of 25 μL to the tubes, membranes were incubated for an additional 60 min at 30° C. The assay was terminated by rapid filtration through Packard UniFilter GF/B using a Packard harvester and washed four times with 1 ml ice-cold buffer. After drying the filters at 40° C. for 1 h, 40 μL Microscint (Packard) was added to the filters and radioactivity of the filters was determined by a TopCount NXT (PerkinElmer, Waltham, MA; Alper and Nelson, *Eur. J. Pharmacol.* 1998, 343, 303-312; Rinken et al, *Biochem. Pharmacol.* 1999, 57, 155-162). Data thus gathered were used to determine PAM $EC_{50}$ values for each compound as primary in vitro activity end point.

In Table 1 compounds of this invention measured in the [$^{35}$S]GTPγS binding assay are listed.

TABLE 1

| Example | In vitro PAM potency |
|---------|----------------------|
| 1 | ++ |
| 2 | ++ |
| 3 | +++ |
| 4 | ++ |
| 5 | + |
| 6 | ++ |
| 7 | ++ |

TABLE 1-continued

| Example | In vitro PAM potency |
|---|---|
| 8 | +++ |
| 9 | + |
| 10 | +++ |
| 11 | ++ |
| 12 | +++ |
| 17 | +++ |
| 18 | ++ |
| 19 | ++ |
| 21 | +++ |
| 22 | ++ |
| 23 | ++ |
| 24 | +++ |
| 25 | + |
| 26 | ++ |
| 27 | ++ |
| 28 | + |
| 29 | ++ |
| 30 | +++ |
| 32 | ++ |
| 33 | ++ |
| 34 | + |
| 35 | + |
| 36 | +++ |
| 37 | ++ |
| 38 | ++ |
| 39 | ++ |
| 40 | + |
| 41 | + |
| 42 | + |
| 43 | ++ |
| 44 | + |
| 45 | ++ |
| 46 | ++ |
| 47 | ++ |
| 48 | ++ |
| 49 | +++ |
| 50 | ++ |
| 51 | ++ |
| 52 | +++ |
| 53 | +++ |
| 54 | ++ |
| 55 | ++ |
| 56 | +++ |
| 57 | ++ |
| 58 | + |
| 59 | ++ |
| 60 | ++ |
| 61 | ++ |
| 62 | ++ |
| 63 | ++ |
| 64 | +++ |
| 65 | +++ |
| 66 | + |
| 67 | ++ |
| 68 | + |
| 69 | ++ |
| 70 | ++ |
| 71 | +++ |
| 72 | ++ |
| 73 | +++ |
| 74 | ++ |
| 75 | + |
| 76 | ++ |
| 77 | + |
| 78 | ++ |
| 79 | ++ |
| 80 | ++ |
| 81 | ++ |
| 82 | + |
| 83 | ++ |
| 84 | ++ |
| 85 | ++ |
| 86 | ++ |
| 87 | ++++ |
| 88 | ++ |
| 89 | ++ |
| 90 | ++++ |
| 91 | + |
| 92 | + |
| 93 | +++ |
| 94 | +++ |
| 95 | +++ |
| 96 | +++ |
| 97 | ++ |
| 98 | +++ |
| 99 | ++ |
| 100 | ++ |
| 101 | − |
| 102 | + |
| 103 | ++ |
| 104 | ++ |
| 105 | +++ |
| 106 | ++ |
| 107 | +++ |
| 108 | ++ |
| 109 | ++ |
| 110 | +++ |
| 111 | ++ |
| 112 | ++ |
| 113 | ++ |
| 114 | ++ |
| 116 | ++ |
| 117 | + |
| 118 | ++ |
| 119 | ++ |
| 120 | ++ |
| 121 | ++ |
| 122 | ++ |
| 123 | ++ |
| 124 | ++++ |
| 125 | ++ |
| 126 | ++ |
| 127 | ++ |
| 128 | +++ |
| 129 | ++ |
| 130 | ++ |
| 132 | + |
| 158 | ++ |
| 159 | ++ |
| 160 | ++ |
| 161 | ++ |

+ PAM $EC_{50}$ < 100 nM
++ 100 nM ≤ PAM $EC_{50}$ < 1000 nM
+++ 1000 M ≤ PAM $EC_{50}$ < 10000 nM
++++ 10000 nM ≤ PAM $EC_{50}$

Foot Shock-Induced Ultrasonic Vocalization (USV) in Adult Rats

Under stressful conditions, adult rats emit 22 kHz ultrasounds that can be reduced by various pharmacological treatments (De Vry et al, *Eur. J. Pharmacol.* 1993, 249, 331-339; Sanchez, *Eur. J. Pharmacol.* 2003, 463, 133-143). Previous unpublished experiments indicated that $GABA_B$ receptor ligands can also inhibit vocalizations that are induced by electric footshocks as stressor. Therefore, a foot shock-induced vocalization paradigm in adult rats was used to assess in vivo efficacy of centrally acting $GABA_B$ receptor ligands. Behavioral measurements were carried out on male Wistar rats (200-250 g, Toxicoop, Hungary or Janvier, France). Rats were housed in groups of four in plastic cages with a wire grid top in a temperature and light-controlled laboratory animal care unit (22±2° C., 12-h light/dark cycle, lights on at 6:00 AM) with ad libitum access to commercial pellet rat food and tap water. Investigations were approved by the Local Ethical Committee of Gedeon Richter Plc. and were carried out in strict compliance with the European Directive 2010/63/EU regarding the care and use of laboratory animals for experimental procedures and all efforts were made to minimize the number of animals as well as their suffering. In order to evoke emission of ultrasounds, animals were footshocked after a habituation period of 30 s (6 shocks, 1 s, 0.8 mA each, inter-shock interval 10 s) in a sound attenuated shocking chamber (Experimetria, 40×40× 80 cm). Investigational compounds were administered at the dose of 10 mg/kg in a solid dispersion formulation or Tween80 suspension in distilled water 1 h before shocking per os. Vocalizations were measured right after the last footshock for 10 min with a Metris Sonotrack system and the total time of vocalizations was registered. Vocalization of parallel vehicle treated animals was considered as control value and inhibition percent was calculated for each compound.

In Table 2 compounds of this invention measured in the USV assay are listed.

TABLE 2

| Example | USV inhibition % | Investigated dose (mg/kg, p.o.) |
|---|---|---|
| 5 | 88% | 1 |
| 9 | 71% | 1 |
| 32 | 68% | 3 |
| 39 | 33% | 3 |
| 42 | 91% | 10 |
| 43 | 41% | 10 |
| 47 | 63% | 10 |
| 58 | 44% | 1 |
| 66 | 49% | 1 |
| 68 | 39% | 1 |
| 75 | 19% | 1 |
| 82 | 86% | 1 |
| 91 | 89% | 1 |
| 111 | 44% | 1 |
| 112 | 72% | 1 |
| 113 | 66% | 1 |
| 116 | 0% | 1 |
| 117 | 73% | 1 |
| 132 | 65% | 1 |
| 158 | 35% | 3 |

Prenatal Valproate Model of Autism Spectrum Disorder (ASD)

The prenatal valproate model has excellent construct and face validity, therefore it is a widely accepted disease model of ASD (Christensen et al, *JAMA* 2013, 309, 1696-1703; Roullet et al, *Neurotox. Teratol.* 2013, 36, 45-56). In this method, time-mated female Wistar rats (Harlan UK) were administered a single dose of valproic acid (VPA, 600 mg/kg, i.p.) on gestational day 12.5. Male offspring were housed according to standard laboratory conditions until time of testing at postnatal day 59. Animals were housed in groups of 4 in conventional cages and maintained at 22-24° C. on a standard 12 hour light/dark cycle (07.30-19.30), with food and water available ad libitum. After investigational drug treatment, offspring were examined behaviorally in the social preference assay at postnatal day 59. The social preference test is a highly accepted assay to assess autistic behavior in rodents (Nadler et al, *Genes Brain Behav.* 2007, 3, 303-314; Bambini-Junior et al, *Brain Res.* 2011, 1408, 8-16). Briefly, in this assay a test animal is allowed to investigate a conspecific separated by a dividing perforated wall or a similar area however, without a target conspecific. An autistic animal (such as a prenatally valproate-exposed rat) spends little time with social investigation during a test session.

The inventors unexpectedly found that examples of the present invention were of great behavioral benefit in the present preclinical disease model that recapitulates the core symptoms of ASD. The inventors therefore showed that these compounds may be of therapeutic potential for the core symptoms of ASD in humans.

EXAMPLES

The invention is further defined in the following Examples. It should be understood that the Examples are given by way of illustration only. From the above discussion and the Examples, one skilled in the art can ascertain the essential characteristics of the invention, and without departing from the spirit and scope thereof, can make various changes and modifications to adapt the invention to various uses and conditions. As a result, the invention is not limited by the illustrative examples set forth herein below, but rather defined by the claims appended hereto.

In general, the compounds of formula (I) can be prepared according to the general knowledge of one skilled in the art and/or using methods set forth in the Example and/or Intermediate sections that follow. Solvents, temperatures, pressures, and other reaction conditions can readily be selected by one of ordinary skill in the art. Starting materials are commercially available and/or readily prepared by one skilled in the art.

The present invention will be now illustrated by the following not limiting examples.

Intermediate 1

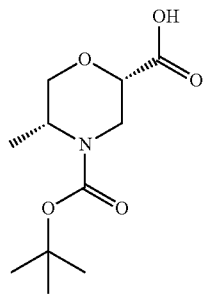 [SMILES: C[C@@H]1CO[C@H](C(=O)O)CN1C(=O)OC(C)(C)C]

(2S,5R)-4-[(tert-butoxy)carbonyl]-5-methylmorpholine-2-carboxylic acid a) (2R)-2-{[(4-methoxyphenyl)methyl]amino}propan-1-ol Under nitrogen to a solution of 6.00 g (80 mmol) (R)-2-Amino-1-propanol in 60 ml methanol was added 10.3 g (75.9 mmol) 4-Methoxybenzaldehyde. After addition the mixture was stirred at RT for 3 hours, then 3.02 g (80 mmol) NaBH$_4$ was added in portions at 0° C. The obtained mixture was allowed to warm to RT and stirred at this temperature for 18 hours.

The reaction mixture was quenched by slow addition of 70 ml distilled water at 0° C. Methanol was evaporated, and the resulting mixture was extracted with dichloromethane. The combined organic layer was washed with distilled water, dried over anhydrous sodium sulfate, filtered and concentrated in vacuo to yield 13.77 g (88%) of the title compound. GC-MS (EI) m/z 196.2 [MH$^+$]

b) [(2S,5R)-4-[(4-methoxyphenyl)methyl]-5-methyl-morpholin-2-yl]methanol

The above obtained (2R)-2-{[(4-methoxyphenyl)methyl]amino}propan-1-ol was suspended in 100 ml toluene and 3.98 g (43 mmol) (R)-Epichlorohydrin was added, followed by the addition of 4.58 g (43 mmol) LiClO$_4$. The reaction mixture was stirred at RT for 18 hours, then 30 ml sodium methoxide solution was added (25 wt % in CH$_3$OH). The reaction mixture was stirred at RT for 18 hours. 100 ml saturated aqeuous NH$_4$Cl was added, followed by the addition of 30 ml distilled water. The mixture was extracted with ethyl acetate. The combined organic layer was washed with distilled water, brine, dried over anhydrous sodium sulfate, filtered and concentrated in vacuo. The crude product was purified by silica gel chromatography eluting with 0-100% ethyl acetate in cyclohexane to yield 4.01 g (52%) of the title compound. GC-MS (EI) m/z 252.2 [MH$^+$]

c) tert-butyl (2S,5R)-2-(hydroxymethyl)-5-methyl-morpholine-4-carboxylate

The above obtained [(2S,5R)-4-[(4-methoxyphenyl)methyl]-5-methylmorpholin-2-yl]methanol was dissolved in 100 ml ethanol, and hydrogenated at 10 bar in the presence of 500 mg 10% Pd/C and 5.22 g (23.9 mmol) BOC$_2$O for 2 days at RT. The reaction mixture was filtered through Celite, concentrated in vacuo, and purified by silica gel chromatography eluting with 0-100% ethyl acetate in cyclohexane to yield 1.55 g (42%) of the title compound. GC-MS (EI) m/z 232.2 [MH$^+$]

d) (2S,5R)-4-[(tert-butoxy)carbonyl]-5-methylmorpholine-2-carboxylic acid

The above obtained tert-butyl (2S,5R)-2-(hydroxymethyl)-5-methylmorpholine-4-carboxylate was dissolved in 50 ml dichloromethane and 25 ml distilled water. To the reaction mixture was added 210 mg (1.34 mmol) TEMPO and 4.97 g (15.4 mmol) (Diacetoxyiodo)benzene at 0° C. The obtained mixture was allowed to warm to RT and stirred at this temperature for 18 hours. The reaction was quenched by the addition of 10 ml methanol. The mixture was extracted with dichloromethane. The combined organic layer was washed with distilled water, brine, dried over anhydrous sodium sulfate, filtered and concentrated in vacuo. The residue was triturated with hexane and filtered to yield 1.02 g (62%) of the title compound. GC-MS (EI) m/z 246.1 [MH$^+$]

Intermediate 2

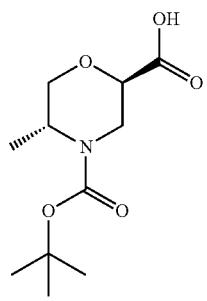 [SMILES: C[C@@H]1CO[C@@H](C(=O)O)CN1C(=O)OC(C)(C)C]

(2R,5R)-4-[(tert-butoxy)carbonyl]-5-methylmorpholine-2-carboxylic acid a) [(2R,5R)-4-[(4-methoxyphenyl)methyl]-5-methyl-morpholin-2-yl]methanol

The title compound is prepared from (2R)-2-{[(4-methoxyphenyl)methyl]amino}propan-1-ol and (S)-Epichlorohydrin according to the method described in Intermediate 1b.

b) tert-butyl (2R,5R)-2-(hydroxymethyl)-5-methyl-morpholine-4-carboxylate

The title compound is prepared from [(2R,5R)-4-[(4-methoxyphenyl)methyl]-5-methylmorpholin-2-yl]methanol according to the method described in Intermediate 1c.

c) (2R,5R)-4-[(tert-butoxy)carbonyl]-5-methylmorpholine-2-carboxylic acid

The title compound is prepared from tert-butyl (2R,5R)-2-(hydroxymethyl)-5-methylmorpholine-4-carboxylate according to the method described in Intermediate 1d.

Intermediate 3

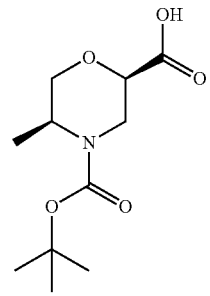 [SMILES: C[C@H]1CO[C@@H](C(=O)O)CN1C(=O)OC(C)(C)C]

(2R,5S)-4-[(tert-butoxy)carbonyl]-5-methylmorpholine-2-carboxylic acid a) (2S)-2-{[(4-methoxyphenyl)methyl]amino}propan-1-ol

The title compound is prepared from (S)-2-Amino-1-propanol according to the method described in Intermediate 1a.

b) [(2R,5S)-4-[(4-methoxyphenyl)methyl]-5-methyl-morpholin-2-yl]methanol

The title compound is prepared from (2S)-2-{[(4-methoxyphenyl)methyl]amino}propan-1-ol and (S)-Epichlorohydrin according to the method described in Intermediate 1b.

c) tert-butyl (2R,5S)-2-(hydroxymethyl)-5-methyl-morpholine-4-carboxylate

The title compound is prepared from tert-butyl [(2R,5S)-4-[(4-methoxyphenyl)methyl]-5-methylmorpholin-2-yl]methanol according to the method described in Intermediate 1c.

d) (2R,5S)-4-[(tert-butoxy)carbonyl]-5-methylmorpholine-2-carboxylic acid

The title compound is prepared from tert-butyl (2R,5S)-2-(hydroxymethyl)-5-methylmorpholine-4-carboxylate according to the method described in Intermediate 1d.

Intermediate 4

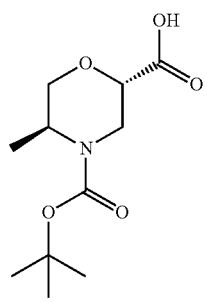 [SMILES: C[C@H]1CO[C@H](C(=O)O)CN1C(=O)OC(C)(C)C]

(2S,5S)-4-[(tert-butoxy)carbonyl]-5-methylmorpholine-2-carboxylic acid a) [(2S,5S)-4-[(4-methoxyphenyl)methyl]-5-methylmorpholin-2-yl]methanol The title compound is prepared from (2S)-2-{[(4-methoxyphenyl)methyl]amino}propan-1-ol and (R)-Epichlorohydrin according to the method described in Intermediate 1b.

b) tert-butyl (2S,5S)-2-(hydroxymethyl)-5-methylmorpholine-4-carboxylate

The title compound is prepared from [(2S,5S)-4-[(4-methoxyphenyl)methyl]-5-methylmorpholin-2-yl]methanol according to the method described in Intermediate 1c.

c) (2R,5R)-4-[(tert-butoxy)carbonyl]-5-methylmorpholine-2-carboxylic acid

The title compound is prepared from tert-butyl (2S,5S)-2-(hydroxymethyl)-5-methylmorpholine-4-carboxylate according to the method described in Intermediate 1d.

Intermediate 5

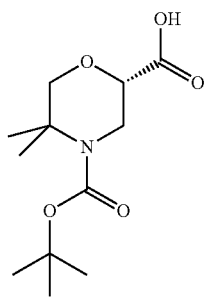 [SMILES: CC(C)(C)OC(=O)N1C[C@@H](C(=O)O)OCC1(C)C]

(2S)-4-[(tert-butoxy)carbonyl]-5,5-dimethylmorpholine-2-carboxylic acid a) 2-(benzylamino)-2-methylpropan-1-ol The title compound is prepared from 2-amino-2-methylpropan-1-ol according to the method described in Intermediate 1a.

b) [(2S)-4-benzyl-5,5-dimethylmorpholin-2-yl]methanol

The title compound is prepared from 2-(benzylamino)-2-methylpropan-1-ol and (R)-Epichlorohydrin according to the method described in Intermediate 1b.

c) tert-butyl (2S)-2-(hydroxymethyl)-5,5-dimethylmorpholine-4-carboxylate

The title compound is prepared from tert-butyl [(2S)-4-benzyl-5,5-dimethylmorpholin-2-yl]methanol according to the method described in Intermediate 1c.

e) (2S)-4-[(tert-butoxy)carbonyl]-5,5-dimethylmorpholine-2-carboxylic acid

The title compound is prepared from tert-butyl (2S)-2-(hydroxymethyl)-5,5-dimethylmorpholine-4-carboxylate according to the method described in Intermediate 1d.

Intermediate 6

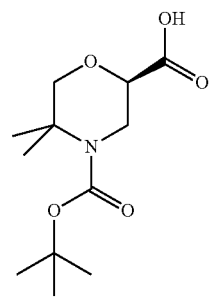 [SMILES: CC(C)(C)OC(=O)N1C[C@H](C(=O)O)OCC1(C)C]

(2R)-4-[(tert-butoxy)carbonyl]-5,5-dimethylmorpholine-2-carboxylic acid a) [(2R)-4-benzyl-5,5-dimethylmorpholin-2-yl]methanol The title compound is prepared from 2-(benzylamino)-2-methylpropan-1-ol and (S)-Epichlorohydrin according to the method described in Intermediate 1b.

b) tert-butyl (2R)-2-(hydroxymethyl)-5,5-dimethylmorpholine-4-carboxylate

The title compound is prepared from tert-butyl [(2R)-4-benzyl-5,5-dimethylmorpholin-2-yl]methanol according to the method described in Intermediate 1c.

c) (2R)-4-[(tert-butoxy)carbonyl]-5,5-dimethylmorpholine-2-carboxylic acid

The title compound is prepared from tert-butyl (2R)-2-(hydroxymethyl)-5,5-dimethylmorpholine-4-carboxylate according to the method described in Intermediate 1d.

Intermediate 7

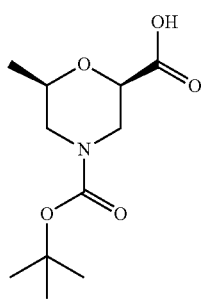 [SMILES: C[C@@H]1CN(C(=O)OC(C)(C)C)C[C@H](C(=O)O)O1]

(2R,6R)-4-[(tert-butoxy)carbonyl]-6-methylmorpholine-2-carboxylic acid a) (2R)-1-{[(4-methoxyphenyl)methyl]amino}propan-2-ol The title compound is prepared from (R)-1-Amino-2-propanol according to the method described in Intermediate 1a.

b) [(2R,6R)-4-[(4-methoxyphenyl)methyl]-6-methylmorpholin-2-yl]methanol

The title compound is prepared from (2R)-1-{[(4-methoxyphenyl)methyl]amino}propan-2-ol and (S)-Epichlorohydrin according to the method described in Intermediate 1b.

c) tert-butyl (2R,6R)-2-(hydroxymethyl)-6-methylmorpholine-4-carboxylate

The title compound is prepared from tert-butyl [(2R,6R)-4-[(4-methoxyphenyl)methyl]-6-methylmorpholin-2-yl]methanol methanol according to the method described in Intermediate 1c.

d) (2R,6R)-4-[(tert-butoxy)carbonyl]-6-methylmorpholine-2-carboxylic acid

The title compound is prepared from tert-butyl (2R,6R)-2-(hydroxymethyl)-6-methylmorpholine-4-carboxylate according to the method described in Intermediate 1d.

Intermediate 8

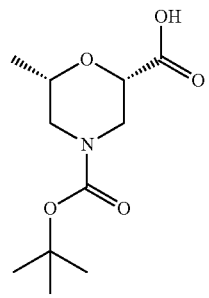 [SMILES: C[C@H]1CN(C(=O)OC(C)(C)C)C[C@@H](C(=O)O)O1]

(2S,6S)-4-[(tert-butoxy)carbonyl]-6-methylmorpholine-2-carboxylic acid a) (2S)-1-{[(4-methoxyphenyl)methyl]amino}propan-2-ol The title compound is prepared from (S)-1-Amino-2-propanol according to the method described in Intermediate 1a.

b) [(2S,6S)-4-[(4-methoxyphenyl)methyl]-6-methylmorpholin-2-yl]methanol

The title compound is prepared from (2S)-1-{[(4-methoxyphenyl)methyl]amino}propan-2-ol and (R)-Epichlorohydrin according to the method described in Intermediate 1b.

c) tert-butyl (2S,6S)-2-(hydroxymethyl)-6-methylmorpholine-4-carboxylate

The title compound is prepared from tert-butyl [(2S,6S)-4-[(4-methoxyphenyl)methyl]-6-methylmorpholin-2-yl] methanol methanol according to the method described in Intermediate 1c.

d) (2S,6S)-4-[(tert-butoxy)carbonyl]-6-methylmorpholine-2-carboxylic acid

The title compound is prepared from tert-butyl (2S,6S)-2-(hydroxymethyl)-6-methylmorpholine-4-carboxylate according to the method described in Intermediate 1d.

Intermediate 9

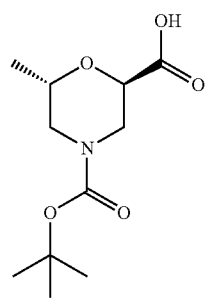 [SMILES: C[C@H]1CN(C(=O)OC(C)(C)C)C[C@H](C(=O)O)O1]

(2R,6S)-4-[(tert-butoxy)carbonyl]-6-methylmorpholine-2-carboxylic acid a) [(2R,6S)-4-[(4-methoxyphenyl)methyl]-6-methylmorpholin-2-yl]methanol The title compound is prepared from (2S)-1-{[(4-methoxyphenyl)methyl]amino}propan-2-ol and (S)-Epichlorohydrin according to the method described in Intermediate 1b.

b) tert-butyl (2R,6S)-2-(hydroxymethyl)-6-methylmorpholine-4-carboxylate

The title compound is prepared from [(2R,5S)-4-[(4-methoxyphenyl)methyl]-6-methylmorpholin-2-yl]methanol according to the method described in Intermediate 1c.

c) (2R,6S)-4-[(tert-butoxy)carbonyl]-6-methylmorpholine-2-carboxylic acid

The title compound is prepared from tert-butyl (2R,6S)-2-(hydroxymethyl)-6-methylmorpholine-4-carboxylate according to the method described in Intermediate 1d.

Intermediate 10

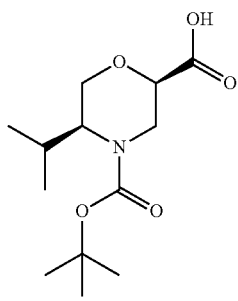 [SMILES: CC(C)[C@H]1CO[C@@H](C(=O)O)CN1C(=O)OC(C)(C)C]

(2R,5S)-4-[(tert-butoxy)carbonyl]-5-(propan-2-yl)morpholine-2-carboxylic acid a) (2S)-2-{[(4-methoxyphenyl)methyl]amino}-3-methylbutan-1-ol The title compound is prepared from (S)-2-Amino-3-methyl-1-butanol according to the method described in Intermediate 1a.

b) [(2R,5S)-4-[(4-methoxyphenyl)methyl]-5-(propan-2-yl)morpholin-2-yl]methanol

The title compound is prepared from (2S)-2-{[(4-methoxyphenyl)methyl]amino}-3-methylbutan-1-ol and (S)-Epichlorohydrin according to the method described in Intermediate 1b.

c) tert-butyl (2R,5S)-2-(hydroxymethyl)-5-(propan-2-yl)morpholine-4-carboxylate

The title compound is prepared from [(2R,5S)-4-[(4-methoxyphenyl)methyl]-5-(propan-2-yl)morpholin-2-yl]methanol according to the method described in Intermediate 1c.

d) (2R,5S)-4-[(tert-butoxy)carbonyl]-5-(propan-2-yl)morpholine-2-carboxylic acid The title compound is prepared from tert-butyl (2R,5S)-2-(hydroxymethyl)-5-(propan-2-yl)morpholine-4-carboxylate according to the method described in Intermediate 1d.

Intermediate 11

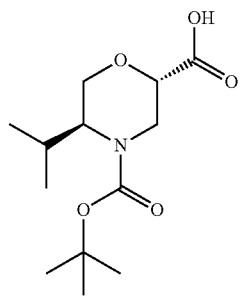 [SMILES: CC(C)[C@H]1CO[C@H](C(=O)O)CN1C(=O)OC(C)(C)C]

(2S,5S)-4-[(tert-butoxy)carbonyl]-5-(propan-2-yl)morpholine-2-carboxylic acid a) [(2S,5S)-4-[(4-methoxyphenyl)methyl]-5-(propan-2-yl)morpholin-2-yl]methanol The title compound is prepared from (2S)-2-{[(4-methoxyphenyl)methyl]amino}propan-1-ol and (R)-Epichlorohydrin according to the method described in Intermediate 1b.

b) tert-butyl (2S,5S)-2-(hydroxymethyl)-5-(propan-2-yl)morpholine-4-carboxylate

The title compound is prepared from [(2S,5S)-4-[(4-methoxyphenyl)methyl]-5-methylmorpholin-2-yl]methanol according to the method described in Intermediate 1c.

c) (2S,5S)-4-[(tert-butoxy)carbonyl]-5-(propan-2-yl)morpholine-2-carboxylic acid The title compound is prepared from tert-butyl (2S,5S)-2-(hydroxymethyl)-5-(propan-2-yl)morpholine-4-carboxylate according to the method described in Intermediate 1d.

Intermediate 12

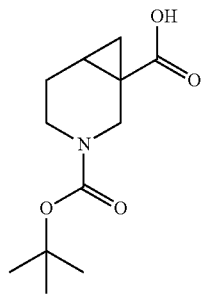 [SMILES: CC(C)(C)OC(=O)N1CCC2CC2(C(=O)O)C1]

3-[(tert-butoxy)carbonyl]-3-azabicyclo[4.1.0]heptane-1-carboxylic acid

The title compound is prepared as described in Tetrahedron, 2010, 66, 5492-5497.

Intermediate 13

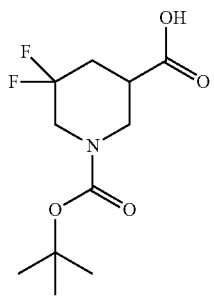

1-[(tert-butoxy)carbonyl]-5,5-difluoropiperidine-3-carboxylic acid

The title compound is prepared as described in WO2015/164508.

Intermediate 14

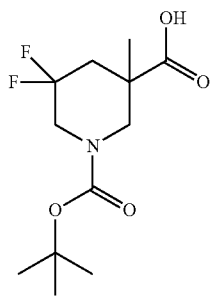 [SMILES: CC(C)(C)OC(=O)N1CC(F)(F)CC(C)(C(=O)O)C1]

1-[(tert-butoxy)carbonyl]-5,5-difluoro-3-methylpiperidine-3-carboxylic acid a) 1-tert-butyl 3-methyl 5,5-difluoro-3-methylpiperidine-1,3-dicarboxylate Under nitrogen to a solution of 2.18 g (7.8 mmol) 1-tert-butyl 3-methyl 5,5-difluoropiperidine-1,3-dicarboxylate (prepared as described in WO2015/164508) in 50 ml dry tetrahydrofuran 8.6 mL 1 M lithium bis(trimethylsilyl)amide in tetrahydrofuran solution (8.6 mmol) was added dropwise at (−78) ° C.-(−65) ° C. After addition the mixture was stirred at −78° C. for 1 hour, 0.73 mL (11.7 mmol) of Iodomethane was added dropwise. The so obtained mixture was allowed to warm to RT and stirred at this temperature for 18 h. The reaction mixture was quenched by addition of 25 ml saturated ammonium chloride solution and 10 ml distilled water. The reaction mixture was extracted with ethyl acetate, the combined organic layer was washed with distilled water, brine, dried over anhydrous sodium sulfate, filtered and concentrated in vacuo to yield 2.22 g (97%) of the title compound. GC-MS (EI) m/z 294.1 [MH$^+$]

b) 1-[(tert-butoxy)carbonyl]-5,5-difluoro-3-methylpiperidine-3-carboxylic acid

The above obtained tert-butyl 1-tert-butyl 3-methyl 5,5-difluoro-3-methylpiperidine-1,3-dicarboxylate was dissolved in 30 ml methanol. 30.3 ml 2 M aqeuous sodium hydroxide (15.1 mmol) was added dropwise at 0° C. The obtained mixture was allowed to warm to RT and stirred at this temperature for 18 hours. The reaction mixture was acidified to pH=3 with citric acid, and methanol was evaporated. The mixture was extracted with ethyl acetate. The combined organic layer was washed with distilled water, brine, dried over anhydrous sodium sulfate, filtered and concentrated in vacuo to yield 2.20 g (100%) of the title compound. GC-MS (EI) m/z 280.1 [MH$^+$]

Intermediate 15

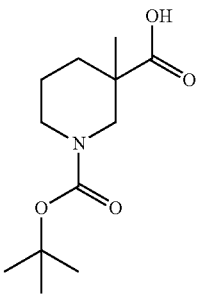 [SMILES: CC(C)(C)OC(=O)N1CCCC(C)(C(=O)O)C1]

4-[(tert-butoxy)carbonyl]-2-methylmorpholine-2-carboxylic acid

The title compound is prepared as described in WO2011/26917.

Intermediate 16

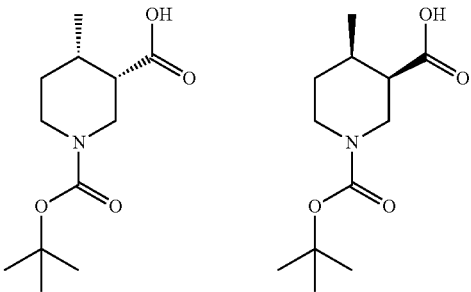 [SMILES: C[C@H]1CCN(C(=O)OC(C)(C)C)C[C@H]1C(=O)O ; C[C@@H]1CCN(C(=O)OC(C)(C)C)C[C@@H]1C(=O)O]

cis-1-[(tert-butoxy)carbonyl]-4-methylpiperidine-3-carboxylic acid a) cis-4-methylpiperidine-3-carboxylic acid hydrochloride A solution of 15 g (86.6 mmol) 4-methylpyridine-3-carboxylic acid hydrochloride in 100 ml distilled water was hydrogenated at 10 bar in the presence of 1.5 g PtO$_2$×H$_2$O for 12 hours at RT. The mixture was filtered through Celite and concentrated in vacuo to yield 16.6 g (100%) of the title compound.

b) cis-1-[(tert-butoxy)carbonyl]-4-methylpiperidine-3-carboxylic acid 33.29 g (185.3 mmol) of cis-4-methylpiperidine-3-carboxylic acid was dissolved 300 ml distilled water and 200 ml tetrahydrofuran. 39.3 g (371 mmol) Na$_2$CO$_3$ was added, followed by the addition of 40.4 g (185 mmol) BOC$_2$O dissolved in 100 ml tetrahydrofuran, at 0° C. The obtained mixture was allowed to warm to RT and stirred at this temperature for 18 hours. The reaction mixture was acidified to pH=3 with citric acid. The mixture was extracted with ethyl acetate. The combined organic layer was washed with distilled water, brine, dried over anhydrous sodium sulfate, filtered and concentrated in vacuo to yield 29.40 g (65%) of the title compound. GC-MS (EI) m/z 243.2 [MH$^+$]

Intermediate 17

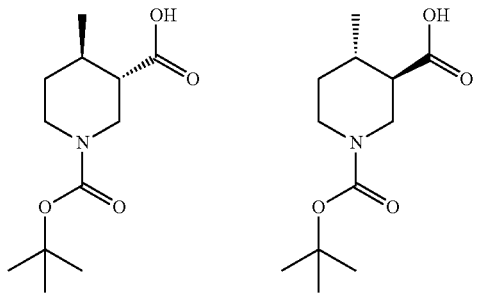 [SMILES: C[C@@H]1CCN(C(=O)OC(C)(C)C)C[C@H]1C(=O)O ; C[C@H]1CCN(C(=O)OC(C)(C)C)C[C@@H]1C(=O)O]

trans-1-[(tert-butoxy)carbonyl]-4-methylpiperidine-3-carboxylic acid a) 1-tert-butyl 3-methyl cis-4-methylpiperidine-1,3-dicarboxylate To a solution of 1.22 g (5 mmol) cis-1-[(tert-butoxy)carbonyl]-4-methylpiperidine-3-carboxylic acid (Intermediate 15) in 6 ml dimethylformamide was added 6.52 g (20 mmol) Cs$_2$CO$_3$ and 2.5 ml (40 mmol) iodomethane. The obtained mixture was stirred at RT for 18 hours. 50 ml distilled water was added. The mixture was extracted with ethyl acetate. The combined organic layer was washed with distilled water, brine, dried over anhydrous sodium sulfate, filtered and concentrated in vacuo to yield 1.29 g (100%) of the title compound. GC-MS (EI) m/z 258.2 [MH$^+$]

b) trans-1-[(tert-butoxy)carbonyl]-4-methylpiperidine-3-carboxylic acid

Under nitrogen to a solution of 0.76 g (3 mmol) 1-tert-butyl 3-methyl cis-4-methylpiperidine-1,3-dicarboxylate in 25 ml dry tetrahydrofuran 10 mL 1 M potassium tert-butoxy in tetrahydrofuran solution (10 mmol) was added dropwise at (−78) ° C.-(−65) ° C. After addition the mixture was stirred at −78° C. for 2 hours, 8 mL distilled water, 8 ml methanol, 5 ml 10 M aqeuous sodium hydroxide (50 mmol) was added dropwise. The reaction mixture was allowed to warm to RT, and stirred for 2 hours. The reaction mixture was acidified to pH=3 with citric acid, and methanol was evaporated. The obtained mixture was extracted with ethyl acetate. The combined organic layer was washed with distilled water, brine, dried over anhydrous sodium sulfate, filtered and concentrated in vacuo. The residue was dissolved in ethyl acetate and ethanolic ammonia was added. The precipitated crystals were filtered, partitioned between 10% citric acid solution and ethyl acetate. The mixture was extracted with ethyl acetate. The combined organic layer was washed with distilled water, brine, dried over anhydrous sodium sulfate, filtered and concentrated in vacuo to yield 0.59 g (82%) of the title compound. GC-MS (EI) m/z 244.1 [MH$^+$]

Intermediate 18

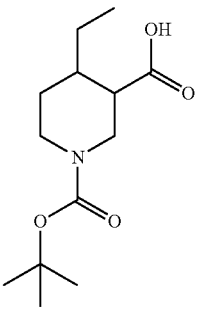 [SMILES: CCC1CCN(C(=O)OC(C)(C)C)CC1C(=O)O]

1-[(tert-butoxy)carbonyl]-4-ethylpiperidine-3-carboxylic acid a) 4-ethylpiperidine-3-carboxylic acid hydrochloride The title compound is prepared from 4-ethylpyridine-3-carboxylic acid according to the method described in Intermediate 16a.

b) 1-[(tert-butoxy)carbonyl]-4-ethylpiperidine-3-carboxylic acid

The title compound is prepared from 4-ethylpiperidine-3-carboxylic acid hydrochloride according to the method described in Intermediate 16b.

Intermediate 19

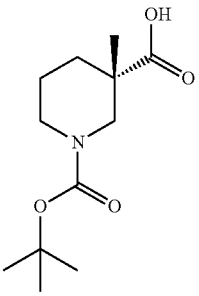 [SMILES: CC(C)(C)OC(=O)N1CCC[C@](C)(C(=O)O)C1]

(3S)-1-[(tert-butoxy)carbonyl]-3-methylpiperidine-3-carboxylic acid a) 1-tert-butyl 3-ethyl (3S)-3-methylpiperidine-1,3-dicarboxylate To a suspension of 7.1 g (34.2 mmol) ethyl (3S)-3-methylpiperidine-3-carboxylate hydrochloride (prepared as described in WO 2018/167631) in 100 ml dichloromethane was added 10.5 ml (75.2 mmol) triethylamine, and 8.21 g (37.6 mmol) BOC$_2$O at 0° C. The resulting mixture was allowed to warm to RT and stirred for 3 hours. The reaction mixture was washed with distilled water, 10% citric acid solution, brine, and concentrated in vacuo to yield 9.68 g (104%) of the title compound. GC-MS (EI) m/z 272.2 [MH$^+$]

b) (3S)-1-[(tert-butoxy)carbonyl]-3-methylpiperidine-3-carboxylic acid

The above obtained 1-tert-butyl 3-ethyl (3S)-3-methylpiperidine-1,3-dicarboxylate was dissolved in 200 ml ethanol and 65 ml 4 M aqueous sodium hydroxide (300 mmol) was added dropwise at 0° C. The reaction mixture was allowed to warm to RT, and stirred for 18 hours. The reaction mixture was acidified to pH=3 with citric acid, and ethanol was evaporated. The obtained mixture was extracted with ethyl acetate. The combined organic layer was washed with distilled water, brine, dried over anhydrous sodium sulfate, filtered and concentrated in vacuo to yield 8.0 g (96%) of the title compound. GC-MS (EI) m/z 244.1 [MH$^+$]

Intermediate 20

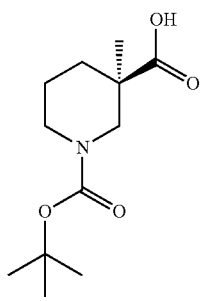 [SMILES: CC(C)(C)OC(=O)N1CCC[C@@](C)(C(=O)O)C1]

(3R)-1-[(tert-butoxy)carbonyl]-3-methylpiperidine-3-carboxylic acid a) 1-tert-butyl 3-ethyl (3R)-3-methylpiperidine-1,3-dicarboxylate The title compound is prepared from (3R)-3-methylpiperidine-3-carboxylate hydrochloride (prepared as described in WO 2018/167631) according to the method described in Intermediate 19a.

b) (3R)-1-[(tert-butoxy)carbonyl]-3-methylpiperidine-3-carboxylic acid

The title compound is prepared from 1-tert-butyl 3-ethyl (3R)-3-methylpiperidine-1,3-dicarboxylate according to the method described in Intermediate 19a.

Intermediate 21

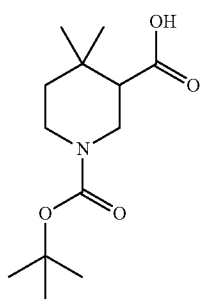 [SMILES: CC(C)(C)OC(=O)N1CCC(C)(C)C(C(=O)O)C1]

1-[(tert-butoxy)carbonyl]-4,4-dimethylpiperidine-3-carboxylic acid a) methyl 1-benzyl-4,4-dimethylpiperidine-3-carboxylate Under nitrogen to a solution of 2.20 g (8 mmol) methyl 1-benzyl-4,4-dimethyl-6-oxopiperidine-3-carboxylate (prepared as described in *J. Org. Chem.* 2005, 70, 3957-3962.) in 22 ml dry tetrahydrofuran was added 0.92 g (24.4 mmol) NaBH$_4$ and 3.96 ml boron trifluoride diethyl etherate dropwise at −15° C. The reaction mixture was allowed to warm to RT, and stirred for 3 hours. 15 ml distilled water was added and the reaction mixture was extracted with ethyl acetate, the combined organic layer was washed with distilled water, brine, dried over anhydrous sodium sulfate, filtered and concentrated in vacuo to yield 1.87 g (89%) of the title compound. GC-MS (EI) m/z 262.2 [MH$^+$]

b) 1-tert-butyl 3-methyl 4,4-dimethylpiperidine-1,3-dicarboxylate

The above obtained methyl 1-benzyl-4,4-dimethylpiperidine-3-carboxylate was dissolved in 20 ml methanol and hydrogenated at 10 bar in the presence of 0.4 g 10% Pd/C and 1.60 g (7.1 mmol) BOC$_2$O at RT for 18 hours. The reaction mixture was filtered through Celite, concentrated in vacuo, and purified by silica gel chromatography eluting with 20% ethyl acetate in cyclohexane to yield 0.89 g (47%) of the title compound. GC-MS (EI) m/z 271.2 [MH$^+$]

c) 1-[(tert-butoxy)carbonyl]-4,4-dimethylpiperidine-3-carboxylic acid

To a solution of 0.48 g (1.9 mmol) 1-tert-butyl 3-methyl 4,4-dimethylpiperidine-1,3-dicarboxylate in 15 ml dry tetrahydrofuran 0.49 g (3.7 mmol) Potassium trimethylsilanolate was added, and the reaction mixture was refluxed for 1 hour. Distilled water was added, and the reaction mixture was acidified to pH=4 with acetic acid. The obtained mixture was extracted with ethyl acetate. The combined organic layer was washed with distilled water, brine, dried over anhydrous sodium sulfate, filtered and concentrated in vacuo to yield 0.39 g (85%) of the title compound. GC-MS (EI) m/z 258.2 [MH$^+$]

Intermediate 22

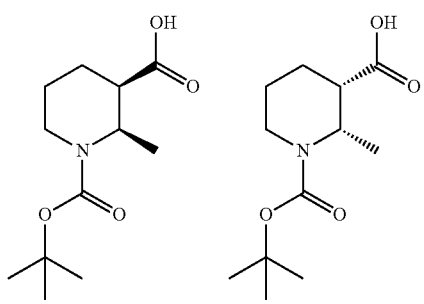 [SMILES: C[C@@H]1[C@H](C(=O)O)CCCN1C(=O)OC(C)(C)C ; C[C@H]1[C@@H](C(=O)O)CCCN1C(=O)OC(C)(C)C]

cis-1-[(tert-butoxy)carbonyl]-2-methylpiperidine-3-carboxylic acid a) ethyl cis-2-methylpiperidine-3-carboxylate A solution of 4.27 g (25.8 mmol) ethyl 2-methylpyridine-3-carboxylate in 40 ml distilled water was hydrogenated at 10 bar in the presence of 0.3 g PtO$_2$×H$_2$O for 12 hours at RT. The mixture was filtered through Celite and concentrated in vacuo to yield 3.94 g (89%) of the title compound. GC-MS (EI) m/z 172.1 [MH$^+$]

b) 1-tert-butyl 3-ethyl cis-2-methylpiperidine-1,3-dicarboxylate

The above obtained ethyl cis-2-methylpiperidine-3-carboxylate was dissolved in 20 ml distilled water and 40 ml tetrahydrofuran. 2.00 g (23.8 mmol) NaHCO$_3$ and 5.00 g (22.9 mmol) BOC$_2$O was added at 0° C. The reaction mixture was allowed to warm to RT, and stirred for 3 hours. 30 ml distilled water was added. The mixture was extracted with ethyl acetate. The combined organic layer was washed with distilled water, brine, dried over anhydrous sodium sulfate, filtered and concentrated in vacuo to yield 3.57 g (57%) of the title compound. GC-MS (EI) m/z 272.2 [MH$^+$]

c) cis-1-[(tert-butoxy)carbonyl]-2-methylpiperidine-3-carboxylic acid

The above obtained 1-tert-butyl 3-ethyl cis-2-methylpiperidine-1,3-dicarboxylate was dissolved in 50 ml ethanol. 10 ml 6 M aqueous sodium hydroxide (60 mmol) was added dropwise at 0° C. The obtained mixture was allowed to warm to RT and stirred at this temperature for 18 hours. The reaction mixture was acidified to pH=3 with 1M HCl solution, and ethanol was evaporated. The mixture was extracted with ethyl acetate. The combined organic layer was washed with distilled water, brine, dried over anhydrous sodium sulfate, filtered and concentrated in vacuo to yield 2.81 g (88%) of the title compound. GC-MS (EI) m/z 244.1 [MH$^+$]

Intermediate 23

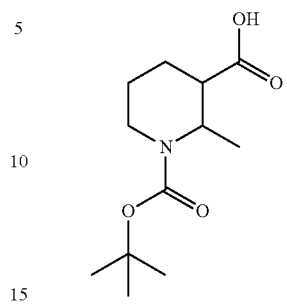

1-[(tert-butoxy)carbonyl]-2-methylpiperidine-3-carboxylic acid a) ethyl 2-methylpiperidine-3-carboxylate Under nitrogen to a solution of 23.00 g (160.63 mmol) ethyl cis-2-methylpiperidine-3-carboxylate (Intermediate 22a) in 50 ml ethanol was added 2.00 g (87 mmol) sodium dissolved in 50 ml ethanol. The reaction mixture was refluxed for 16 hours. The mixture is concentrated in vacuo to obtain the title compound as an oil. The crude product is used in the next step.

b) 1-tert-butyl 3-ethyl 2-methylpiperidine-1,3-dicarboxylate

The above obtained ethyl 2-methylpiperidine-3-carboxylate was dissolved in 200 ml tetrahydrofuran and 200 ml distilled water and 13.00 g (60 mmol) BOC$_2$O was added. The reaction mixture was stirred for 16 hours at RT. The reaction mixture was acidified to pH=3 with 1M HCl solution and extracted with ethyl acetate. The combined organic layer was washed with distilled water, brine, dried over anhydrous sodium sulfate, filtered and concentrated in vacuo. The residue was chromatographed on silica gel eluting with 33% ethyl acetate in cyclohexane, then again with dichloromethane to yield 2.3 g (16%) of the title compound.

c) 1-[(tert-butoxy)carbonyl]-2-methylpiperidine-3-carboxylic acid

The title compound is prepared from 1-tert-butyl 3-ethyl 2-methylpiperidine-1,3-dicarboxylate according to the method described in Intermediate 22c.

Intermediate 24

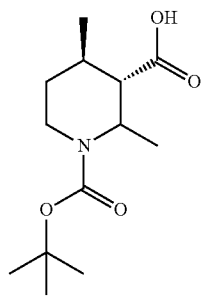 [SMILES: CC1[C@@H](C(=O)O)[C@H](C)CCN1C(=O)OC(C)(C)C]

(3S,4R)-1-[(tert-butoxy)carbonyl]-4-methylpiperidine-3-carboxylic acid a) 1-tert-butyl 3-methyl (3S,4R)-4-methylpiperidine-1,3-dicarboxylate The title compound is prepared from methyl (3S,4R)-4-methylpiperidine-3-carboxylate (prepared as described in US2010/0093706) according to the method described in Intermediate 22b.

b) (3S,4R)-1-[(tert-butoxy)carbonyl]-4-methylpiperidine-3-carboxylic acid

The title compound is prepared from methyl 1-tert-butyl 3-methyl (3S,4R)-4-methylpiperidine-1,3-dicarboxylate according to the method described in Intermediate 22c.

Intermediate 25

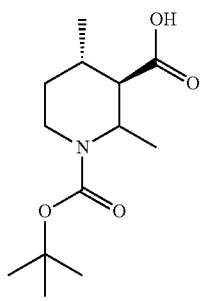 [SMILES: CC1[C@H](C(=O)O)[C@@H](C)CCN1C(=O)OC(C)(C)C]

(3R,4S)-1-[(tert-butoxy)carbonyl]-4-methylpiperidine-3-carboxylic acid a) 1-tert-butyl 3-methyl (3R,4S)-4-methylpiperidine-1,3-dicarboxylate The title compound is prepared from methyl (3R,4S)-4-methylpiperidine-3-carboxylate (prepared as described in US2010/0093706) according to the method described in Intermediate 22b.

b) (3R,4S)-1-[(tert-butoxy)carbonyl]-4-methylpiperidine-3-carboxylic acid

The title compound is prepared from methyl 1-tert-butyl 3-methyl (3R,4S)-4-methylpiperidine-1,3-dicarboxylate according to the method described in Intermediate 22c.

Intermediate 26

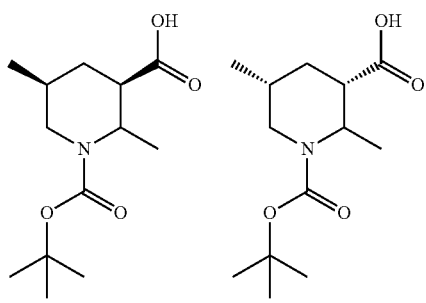

cis-1-[(tert-butoxy)carbonyl]-5-methylpiperidine-3-carboxylic acid a) cis-5-methylpiperidine-3-carboxylic acid A solution of 1.00 g (7.3 mmol) 5-methylpyridine-3-carboxylic acid in 20 ml acetic acid was hydrogenated at 10 bar in the presence of 0.2 g $PtO_2 \times H_2O$ for 12 hours at RT. The mixture was filtered through Celite and concentrated in vacuo to yield 1.00 g (96%) of the title compound.

GC-MS (EI) m/z 144.1 [MH$^+$]

b) cis-1-[(tert-butoxy)carbonyl]-5-methylpiperidine-3-carboxylic acid

The above obtained cis-5-methylpiperidine-3-carboxylic acid was dissolved in 10 ml distilled water and 10 ml tetrahydrofuran. 1.52 g (7 mmol) $BOC_2O$ was added at 0° C. The reaction mixture was allowed to warm to RT, and stirred for 3 hours. 30 ml distilled water was added. The mixture was extracted with ethyl acetate. The combined organic layer was washed with distilled water, brine, dried over anhydrous sodium sulfate, filtered and concentrated in vacuo to yield 0.45 g (25%) of the title compound. GC-MS (EI) m/z 244.1 [MH$^+$]

Intermediate 27

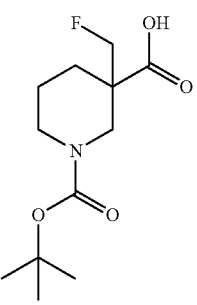 [SMILES: CC(C)(C)OC(=O)N1CCCC(CF)(C(=O)O)C1]

1-[(tert-butoxy)carbonyl]-3-(fluoromethyl)piperidine-3-carboxylic acid a) 1-tert-Butyl 3-ethyl 3-(hydroxymethyl)piperidine-1,3-dicarboxylate The title compound is prepared from 1-tert-butyl 3-ethyl piperidine-1,3-dicarboxylate and paraformaldehyde according to the method described in Intermediate 14a.

b) 1-tert-Butyl 3-ethyl 3-{[(1,1,2-trifluoroethane-sulfonyl)oxy]methyl}piperidine-1,3-dicarboxylate Under nitrogen, to a stirred solution of 0.296 g (1.03 mmol) ethyl 3-(hydroxymethyl) piperidine-3-carboxylate and 0.120 ml (1.48 mmol) pyridine in 5 ml of dichloromethane 0.230 ml (1.48 mmol) trifluoromethanesulfonic anhydride was added dropwise at (−78) ° C.—(−65) ° C. After addition the mixture was stirred at −78° C. for 5 min and allowed to warm to room temperature and stirred at this temperature for 18 h. The reaction mixture was quenched by addition of 1M hydrochloric acid solution. The reaction mixture was extracted with dichloromethane, the combined organic layer was washed with distilled water, dried over anhydrous sodium sulfate, filtered and concentrated in vacuo to obtain the title compound as oil. The crude product is used in the next step.

c) 1-tert-Butyl 3-ethyl 3-(fluoromethyl)piperidine-1,3-dicarboxylate

The above obtained 1-tert-butyl 3-ethyl 3-{[(1,1,2-trifluoroethanesulfonyl)oxy]methyl}piperidine-1,3-dicarboxylate was solved in 4 ml tetrahydrofuran and 1.25 ml (1.25 mmol) 1M tetrabutylammonium fluoride in tetrahydrofuran was added. The reaction mixture was stirred for 1 h at room temperature, diluted with water and extracted with ethyl acetate. The combined organic layer was washed with distilled water, dried over anhydrous sodium sulfate, filtered and concentrated in vacuo. The residue was chromatographed on silica gel eluting with 33% ethyl acetate in cyclohexane to yield 0.121 g (40%) of the title compound.

d) 1-[(tert-butoxy)carbonyl]-3-(fluoromethyl)piperidine-3-carboxylic acid

The title compound is prepared from 1-tert-Butyl 3-ethyl 3-(fluoromethyl)piperidine-1,3-dicarboxylate according to the method described in Intermediate 22c.

Intermediate 28

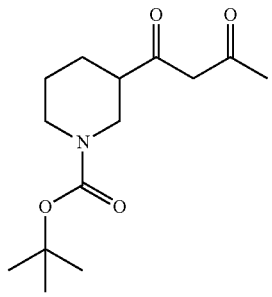 [SMILES: CC(=O)CC(=O)C1CCCN(C(=O)OC(C)(C)C)C1]

tert-butyl 3-(3-oxobutanoyl)piperidine-1-carboxylate

To a solution of 5.00 g (21.8 mmol) 1-[(tert-butoxy) carbonyl]piperidine-3-carboxylic acid in 30 ml dry tetrahydrofuran 3.89 g (24 mmol) CDI was added at 0° C., and the reaction mixture was allowed to warm to RT and stirred for 2 hours. In a separate flask, under nitrogen, to a solution of 24 ml 2 M lithium diisopropylamide in tetrahydrofuran/heptane/ethylbenzene (48 mmol) in 30 ml dry tetrahydrofuran, 3.2 ml (43.6 mmol) acetone was added dropwise at (−78) ° C.-(−65)° C. After addition the mixture was stirred at −78° C. for 1 hour, and the solution of the activated acid was added dropwise at (−78) ° C.-(−65) ° C. After addition, the mixture was stirred at −78° C. for 10 minutes, and quenched by the addition of 10% citric acid. The mixture was extracted with ethyl acetate. The combined organic layer was washed with distilled water, brine, dried over anhydrous sodium sulfate, filtered and concentrated in vacuo. The crude product was purified by silica gel chromatography eluting with dichloromethane to yield 2.28 g (39%) of the title compound. GC-MS (EI) m/z 270.2 [MH⁺]

Compounds of Table 3 were prepared from the appropriate carboxylic acid and acetone according to the method described in Intermediate 28.

TABLE 3

| Intermediate | Structure | Intermediate (starting material) | GC-MS (EI) m/z [MH⁺] |
| --- | --- | --- | --- |
| 29 | 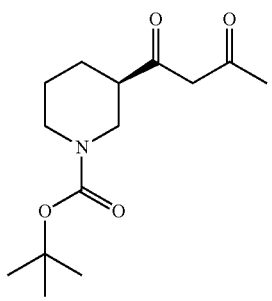 | (3R)-1-[(tert-butoxy)carbonyl]piperidine-3-carboxylic acid | 270.2 |

TABLE 3-continued

| Intermediate | Structure | Intermediate (starting material) | GC-MS (EI) m/z [MH+] |
|---|---|---|---|
| 30 | | 16 | 284.2 |
|  | | | |
| 31 | | 20 | 284.2 |
| 32 | | 19 | 284.2 |
| 33 | | (3S)-1-[(tert-butoxy)carbonyl]piperidine-3-carboxylic acid | 270.2 |

TABLE 3-continued
| Intermediate | Structure | Intermediate (starting material) | GC-MS (EI) m/z [MH+] |
|---|---|---|---|
| 34 | 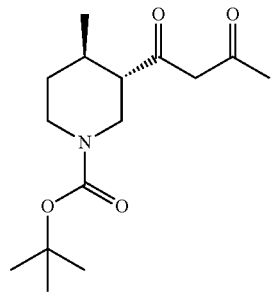 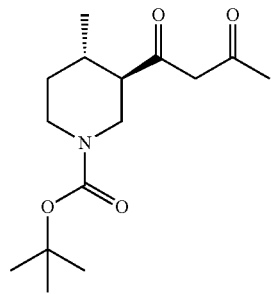 [SMILES: CC(=O)CC(=O)[C@@H]1CCCN(C(=O)OC(C)(C)C)C1] | 17 | 284.2 |
| 35 | 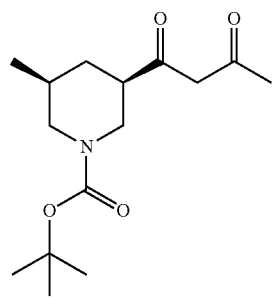 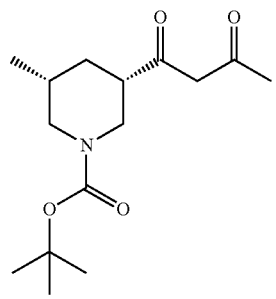 | 26 | 284.2 |

TABLE 3-continued

| Intermediate | Structure | Intermediate (starting material) | GC-MS (EI) m/z [MH+] |
|---|---|---|---|
| 36 | | 22 | 284.2 |
| | | 23 | 284.2 |
| 37 | | 23 | 284.2 |
| 38 | | 21 | 298.2 |
| 39 | | 27 | 302.2 |

TABLE 3-continued

| Intermediate | Structure | Intermediate (starting material) | GC-MS (EI) m/z [MH+] |
|---|---|---|---|
| 40 | | 18 | 298.2 |
| 41 | | 4-[(tert-butoxy)carbonyl]morpholine-2-carboxylic acid | 272.1 |
| 42 | | 15 | 286.2 |
| 43 | | 13 | 306.1 |
| 44 | | 14 | 320.1 |

TABLE 3-continued

| Intermediate | Structure | Intermediate (starting material) | GC-MS (EI) m/z [MH+] |
|---|---|---|---|
| 45 | | oxane-3-carboxylic acid | 171.1 |
| 46 | | (2R)-4-[(tert-butoxy)carbonyl]morpholine-2-carboxylic acid | 272.1 |

Intermediate 47

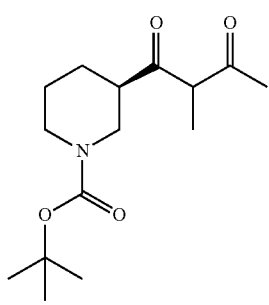 [SMILES: CC(=O)C(C)C(=O)[C@@H]1CCCN(C(=O)OC(C)(C)C)C1]

tert-butyl (3R)-3-(2-methyl-3-oxobutanoyl)piperidine-1-carboxylate

To a solution of 0.80 g (2.97 mmol) tert-butyl (3R)-3-(3-oxobutanoyl)piperidine-1-carboxylate (Intermediate 29) in 20 ml acetone was added 0.56 ml (8.91 mmol) iodomethane and 1.23 g (8.91 mmol) K$_2$CO$_3$. The reaction mixture was refluxed for 3 hours. The reaction mixture was allowed to cool to RT, acetone was evaporated, and the residue was partitioned between distilled water and ethyl acetate. The mixture was extracted with ethyl acetate. The combined organic layer was washed with distilled water, brine, dried over anhydrous sodium sulfate, filtered and concentrated in vacuo to yield 0.70 g (83%) of the title compound. GC-MS (EI) m/z 284.2 [MH+]

Compounds of Table 4 were prepared from the appropriate diketone and iodoalkane according to the method described in Intermediate 47.

TABLE 4

| Intermediate | Structure | Intermediate (starting material) | GC-MS (EI) m/z [MH+] |
|---|---|---|---|
| 48 | | 31 | 312.2 |
| 49 | | 32 | 312.2 |
| 50 | | 32 | 298.2 |

TABLE 4-continued

| Intermediate | Structure | Intermediate (starting material) | GC-MS (EI) m/z [MH+] |
|---|---|---|---|
| 51 | | 29 | 298.2 |
| 52 | | 28 | 312.2 |
| 53 | | 33 | 298.2 |
| 54 | | 33 | 284.2 |
| 55 | | 20 | 298.2 |
| 56 | | 29 | 298.2 |
| 57 | | 30 | 298.2 |
| 58 | | 30 | 312.2 |

TABLE 4-continued

| Intermediate | Structure | Intermediate (starting material) | GC-MS (EI) m/z [MH+] |
|---|---|---|---|
| 59 | | 41 | 286.1 |
| 60 | | 43 | 320.1 |
| 61 | | 41 | 300.1 |
| 62 | | 46 | 286.1 |

Intermediate 63 tert-butyl (2R)-2-(but-2-ynoyl)morpholine-4-carboxylate a) tert-butyl (2R)-2-[methoxy(methyl)carbamoyl] morpholine-4-carboxylate Under nitrogen to a solution of 1.00 g (4.32 mmol) (2R)-4-[(tert-butoxy)carbonyl]morpholine-2-carboxylic acid in 10 ml dimethylformamide was added 1.27 g (13 mmol) N,O-Dimethylhydroxylamine hydrochloride, 3.77 ml (21.6 mmol) N,N-Diisopropylethyl amine, 1.8 g (4.76 mmol) HBTU, 0.73 g (4.76 mmol) HOBt*H$_2$O at 0° C. The reaction mixture was allowed to warm to RT and stirred for 16 hours. Distilled water was added, and the mixture was extracted with ethyl acetate. The combined organic layer was washed with 1M HCl solution, 1M NaOH solution, distilled water, brine, dried over anhydrous sodium sulfate, filtered and concentrated in vacuo to yield 1.00 g (84%) of the title compound. GC-MS (EI) m/z 275.2 [MH+]

b) tert-butyl (2R)-2-(but-2-ynoyl)morpholine-4-carboxylate

Under nitrogen the above obtained tert-butyl (2R)-2-[methoxy(methyl)carbamoyl]morpholine-4-carboxylate was dissolved in 20 ml dry tetrahydrofuran, and 11 ml 0.5 M 1-Propynyl magnesium bromide in tetrahydrofuran (5.5 mmol) was added dropwise at 0° C. The reaction mixture was stirred for 20 minutes at 0° C., and quenched by the addition of 10 ml saturated NH$_4$Cl solution and 5 ml distilled water. The mixture was extracted with ethyl acetate. The combined organic layer was washed with distilled water, brine, dried over anhydrous sodium sulfate, filtered and concentrated in vacuo to yield 0.83 g (90%) of the title compound. GC-MS (EI) m/z 254.1 [MH+]

Compounds of Table 5 were prepared from the appropriate Weinreb amide and 1-Propynyl magnesium bromide according to the method described in Intermediate 63.

TABLE 5

| Intermediate | Structure | Intermediate (starting material) | GC-MS (EI) m/z [MH+] |
|---|---|---|---|
| 64 | | (2S)-4-[(tert-butoxy)carbonyl]morpholine-2-carboxylic acid | 254.1 |
| 65 | | 4-[(tert-butoxy)carbonyl]morpholine-2-carboxylic acid | 254.1 |
| 66 | | 4 | 268.1 |
| 67 | | 3 | 268.1 |

TABLE 5-continued

| Intermediate | Structure | Intermediate (starting material) | GC-MS (EI) m/z [MH+] |
|---|---|---|---|
| 68 | | 2 | 268.1 |
| 69 | | 1 | 268.1 |
| 70 | | 5 | 282.1 |
| 71 | | 6 | 282.1 |
| 72 | | 7 | 268.1 |

TABLE 5-continued

| Intermediate | Structure | Intermediate (starting material) | GC-MS (EI) m/z [MH+] |
|---|---|---|---|
| 73 | | 1,1-dioxo-1λ⁶-thiane-3-carboxylic acid | 201.1 |
| 74 | | 11 | 296.2 |
| 75 | | 8 | 268.1 |
| 76 | | 9 | 268.1 |
| 77 | | 4-[(tert-butoxy)carbonyl]thiomorpholine-2-carboxylic acid | 248.1 |

TABLE 5-continued

| Intermediate | Structure | Intermediate (starting material) | GC-MS (EI) m/z [MH+] |
|---|---|---|---|
| 78 | 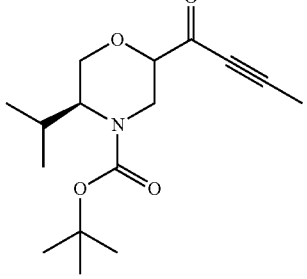 | 10 | 296.2 |
| 79 | 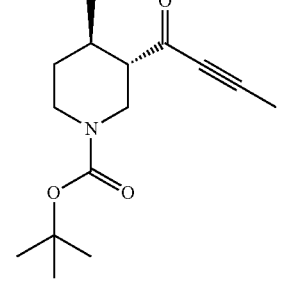 | 24 | 266.2 |
| 80 | 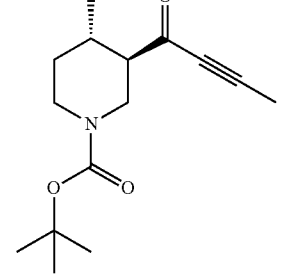 | 25 | 266.2 |
| 81 | 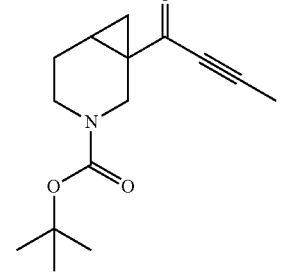 | 12 | 264.3 |

Intermediate 82

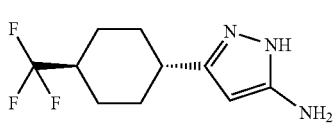

3-[trans-4-(Trifluoromethyl)cyclohexyl]-1H-pyrazol-5-amine a) Methyl rans-4-(trifluoromethyl)cyclohexane-1-carboxylate To a solution of 10 g (51 mmol) trans 4-(trifluoromethyl)cyclohexane-1-carboxylic acid in 150 ml methanol 10 ml (137 mmol) thionyl chloride was added dropwise at −10° C. After addition the mixture was allowed to warm to room temperature and stirred at this temperature for 16 h, then concentrated in vacuo. The residue was partitioned between ethyl acetate and water. The combined organic layer was washed with NaHCO₃ solution and water, dried over anhydrous sodium sulfate, filtered and concentrated in vacuo to yield 8.96 g (84%) of the title compound. GC-MS (EI) m/z 211.2 [MH⁺]

b) 3-Oxo-3-[trans-4-(trifluoromethyl)cyclohexyl]propanenitrile

Under nitrogen to a mixture of 9.1 ml (174 mmol) acetonitrile in 260 ml dry tetrahydrofuran 51 ml 2.5 M n-butyllithium in n-hexane solution (127 mmol) was added dropwise at (−78) ° C.-(−65) ° C. After addition the mixture was stirred at −78° C. for 1 h, 8.96 g (42.6 mmol) methyl trans-4-(trifluoromethyl)cyclohexane-1-carboxylate was added dropwise. The so obtained mixture was allowed to warm to room temperature and stirred at this temperature for 1 h. The reaction mixture was quenched by addition of 150 mL of saturated ammonium chloride solution. The tetrahydrofuran was evaporated and the mixture was extracted with ethyl acetate. The combined organic layer was washed with water, dried over anhydrous sodium sulfate, filtered and concentrated in vacuo. The crude product is used in the next step.

c) 3-[trans-4-(Trifluoromethyl)cyclohexyl]-1H-pyrazol-5-amine

The above obtained 3-oxo-3-[trans-4-(trifluoromethyl)cyclohexyl]propanenitrile was solved in 187 ml of ethanol and 4.4 ml (167 mmol) of hydrazine monohydrate was added. Under inert gas atmosphere, the reaction mixture was refluxed for 16 h. The solvent was removed in vacuo and dry toluene was evaporated from the residue several times to yield 11.15 g of the title compound. LC-MS (ESI) m/z 234.2 [MH⁺]

Intermediate 83

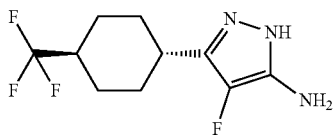 [SMILES: Nc1[nH]nc([C@H]2CC[C@H](C(F)(F)F)CC2)c1F]

4-fluoro-3-[trans-4-(trifluoromethyl)cyclohexyl]-1H-pyrazol-5-amine a) trans-4-(Trifluoromethyl)cyclohexane-1-carbonyl chloride A mixture of 5 g (25.5 mmol) trans 4-(trifluoromethyl)cyclohexane-1-carboxylic acid, 100 ml dichloromethane, 5 ml (68.5 mmol) thionyl chloride and 0.1 ml dimethylformamide was refluxed for 6 h. The reaction mixture was concentrated in vacuo and dry tetrahydrofuran was evaporated from the residue several times. The crude product is used in the next step.

b) 2-Fluoro-3-oxo-3-[trans-4-(trifluoromethyl)cyclohexyl]propanenitrile

Under inert gas atmosphere, to a solution of the above obtained trans-4-(trifluoromethyl) cyclohexane-1-carbonyl chloride and 1.5 ml (26.96 mmol) fluoroacetonitrile in 50 ml dry tetrahydrofuran 50 ml (50 mmol) 1M lithium bis(trimethylsilyl)amide was added dropwise at −78° C. After addition the mixture was stirred at −78° C. for 1 h, then the mixture was allowed to warm to room temperature and poured into 200 ml of water. The pH of the mixture was adjusted to 2 by the addition of 1M hydrochloric acid. The mixture was extracted with ethyl acetate, the combined organic layer was washed with water, dried over anhydrous sodium sulfate, filtered and concentrated in vacuo. The crude product is used in the next step.

c) 4-Fluoro-3-[trans-4-(trifluoromethyl)cyclohexyl]-1H-pyrazol-5-amine

The above obtained 2-fluoro-3-oxo-3-[trans-4-(trifluoromethyl)cyclohexyl]propanenitrile was dissolved in 65 ml of ethanol and 4.4 ml (77 mmol) of hydrazine monohydrate was added. Under inert gas atmosphere, the reaction mixture was refluxed for 16 h. The solvent was removed in vacuo to obtain the title compound as oil. LC-MS (ESI) m/z 252.2 [MH⁺]

Intermediate 84

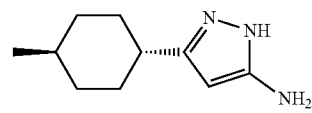

3-(trans-4-methylcyclohexyl)-1H-pyrazol-5-amine a) Methyl trans-4-methylcyclohexane-1-carboxylate The title compound is prepared from trans-4-methylcyclohexane-1-carboxylic acid according to the method described in Intermediate 82a.

b) 3-Oxo-3-(trans-4-methylcyclohexyl)propanenitrile

The title compound is prepared from Methyl trans-4-methylcyclohexane-1-carboxylate according to the method described in Intermediate 82b.

c) 3-(trans-4-methylcyclohexyl)-1H-pyrazol-5-amine

The title compound is prepared from 3-Oxo-3-(trans-4-methylcyclohexyl)propanenitrile according to the method described in Intermediate 82c.

Intermediate 85

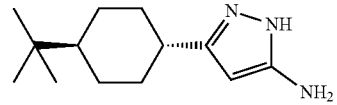

3-[(trans-4-tert-butylcyclohexyl]-1H-pyrazol-5-amine a) Methyl trans-4-tert-butylcyclohexane-1-carboxylate The title compound is prepared from trans-4-tert-butylcyclohexane-1-carboxylic acid according to the method described in Intermediate 82a.

b) 3-Oxo-3-(trans-4-tert-butylcyclohexyl)propanenitrile

The title compound is prepared from Methyl trans-4-tert-butylcyclohexane-1-carboxylate according to the method described in Intermediate 82b.

c) 3-(trans-4-tert-butylcyclohexyl)-1H-pyrazol-5-amine

The title compound is prepared from 3-Oxo-3-(trans-4-tert-butylcyclohexyl)propanenitrile according to the method described in Intermediate 82c.

Intermediate 86

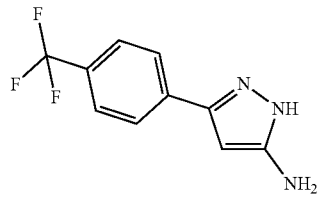 [SMILES: Nc1cc(-c2ccc(C(F)(F)F)cc2)n[nH]1]

3-[4-(trifluoromethyl)phenyl]-1H-pyrazol-5-amine

The title compound is prepared as described in WO2018/167629.

Intermediate 87

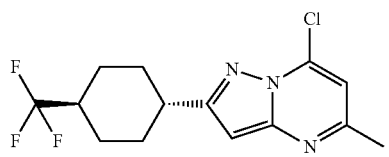 [SMILES: Cc1cc(Cl)n2nc([C@H]3CC[C@H](C(F)(F)F)CC3)cc2n1]

7-chloro-5-methyl-2-[trans-4-(trifluoromethyl)cyclohexyl]pyrazolo[1,5-a]pyrimidine a) 5-methyl-2-[trans-4-(trifluoromethyl)cyclohexyl]pyrazolo[1,5-a]pyrimidin-7-ol To a solution 0.50 g (2.14 mmol) 3-[trans-4-(Trifluoromethyl)cyclohexyl]-1H-pyrazol-5-amine (Intermediate 82) in 30 ml toluene was added 0.30 ml (2.37 mmol) ethyl acetoacetate and a catalytic amount of p-Toluenesulfonic acid monohydrate. The reaction mixture was refluxed for 16 hours, and allowed to warm to RT. The precipitated crystals were filtered to yield 0.51 g (79%) of the title compound. LC-MS (ESI) m/z 300.1 [MH$^+$]

b) 7-chloro-5-methyl-2-[trans-4-(trifluoromethyl)cyclohexyl]pyrazolo[1,5-a]pyrimidine The above obtained 5-methyl-2-[trans-4-(trifluoromethyl)cyclohexyl]pyrazolo[1,5-a]pyrimidin-7-ol was suspended in 10 ml toluene, 0.59 ml (3.40 mmol) N,N-Diisopropylethylamine and 0.80 ml (8.50 mmol) phosphoryl chloride was added. The reaction mixture was refluxed for 2 hours and then quenched the by the addition of ice. The reaction mixture was neutralized by the addition of saturated NaHCO$_3$ solution. The resulting mixture was extracted with ethyl acetate. The combined organic layer was washed with distilled water, dried over anhydrous sodium sulfate, filtered and concentrated in vacuo to yield 0.53 g (99%) of the title compound. LC-MS (ESI) m/z 318.1 [MH$^+$]

Route c)

Intermediate 88

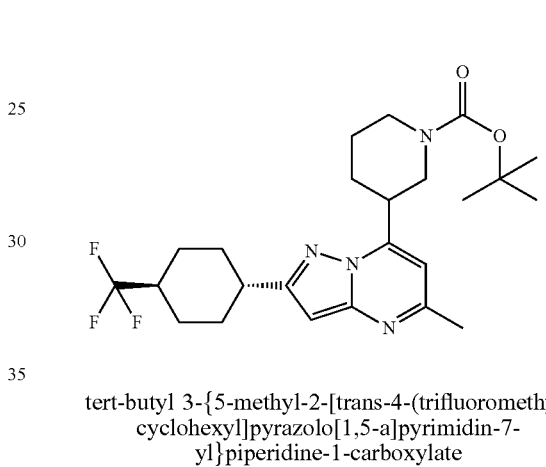

tert-butyl 3-{5-methyl-2-[trans-4-(trifluoromethyl)cyclohexyl]pyrazolo[1,5-a]pyrimidin-7-yl}piperidine-1-carboxylate To a solution of 0.81 g (3 mmol) tert-butyl 3-(3-oxobutanoyl)piperidine-1-carboxylate (Intermediate 28) in 25 ml toluene was added 0.50 g (2.14 mmol) 3-[trans-4-(Trifluoromethyl)cyclohexyl]-1H-pyrazol-5-amine (Intermediate 82) and 0.02 g (0.1 mmol) p-Toluenesulfonic acid monohydrate. The reaction mixture was refluxed for 16 hours and the solvent was evaporated. The residue was purified by silica gel chromatography eluting with 0-30% ethyl acetate in cyclohexane to yield 0.26 g (26%) of the title compound. LC-MS (ESI) m/z 467.2 [MH$^+$]

Route d)

Intermediate 89

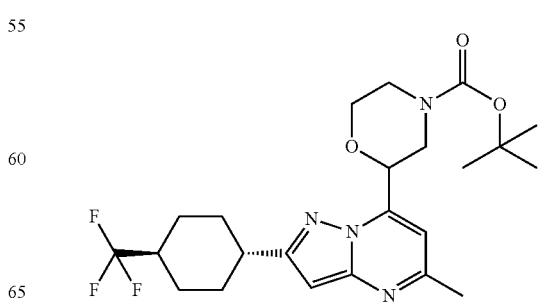

tert-butyl (2R)-2-{5-methyl-2-[trans-4-(trifluoromethyl)cyclohexyl]pyrazolo[1,5-a]pyrimidin-7-yl}morpholine-4-carboxylate To a solution of 0.83 g (3.28 mmol) tert-butyl (2R)-2-(but-2-ynoyl)morpholine-4-carboxylate (Intermediate 63) in 10 ml ethanol was added 0.27 ml (3.28 mmol) pyrrolidine. The reaction mixture was stirred at RT for 30 minutes and 0.77 g (3.28 mmol) 3-[trans-4-(Trifluoromethyl)cyclohexyl]-1H-pyrazol-5-amine (Intermediate 82) and 1.5 ml acetic acid was added. The reaction mixture was stirred at 60° C. for 4 hours, and the solvent was evaporated. The residue was purified by silica gel chromatography eluting with 0-50% ethyl acetate in cyclohexane to yield 1.45 g (95%) of the title compound. LC-MS (ESI) m/z 469.2 [MH+]

Intermediate 90

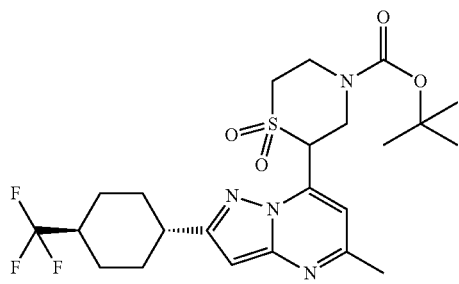 [SMILES: Cc1cc(C2CN(C(=O)OC(C)(C)C)CCS2(=O)=O)n2nc([C@H]3CC[C@H](C(F)(F)F)CC3)cc2n1]

tert-butyl 2-{5-methyl-2-[trans-4-(trifluoromethyl)cyclohexyl]pyrazolo[1,5-a]pyrimidin-7-yl}-1,1-dioxo-1λ⁶-thiomorpholine-4-carboxylate To a solution of 1.12 g (4.75 mmol) tert-butyl 1,1-dioxo-1λ⁶-thiomorpholine-4-carboxylate (prepared as described in EP1140904) in 30 ml dry tetrahydrofuran 4.8 mL 1 M lithium bis(trimethylsilyl)amide in tetrahydrofuran solution (4.8 mmol) was added dropwise at (−78) ° C.-(−65) ° C. After addition the mixture was stirred at −78° C. for 1 hour, 1.26 g (3.96 mmol) 7-chloro-5-methyl-2-[trans-4-(trifluoromethyl)cyclohexyl]pyrazolo[1,5-a]pyrimidine (Intermediate 87) was added. The so obtained mixture was allowed to warm to RT and stirred at this temperature for 18 h. The reaction mixture was quenched by addition of 20 ml saturated ammonium chloride solution and 10 ml distilled water. The reaction mixture was extracted with ethyl acetate, the combined organic layer was washed with distilled water, brine, dried over anhydrous sodium sulfate, filtered and concentrated in vacuo. The residue was purified by silica gel chromatography eluting with 0-35% ethyl acetate in cyclohexane to yield 0.63 g (31%) of the title compound. LC-MS (ESI) m/z 517.2 [MH+]

Intermediates 91-155 were prepared using analogues methods to those Intermediates described above and are exemplified below in Table 6.

TABLE 6

| Intermediate | Structure | LC-MS (ESI) m/z [MH+] | Intermediates (starting materials) | Route |
|---|---|---|---|---|
| 91 | 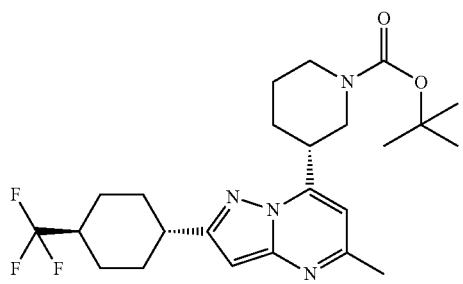 [SMILES: Cc1cc([C@@H]2CCCN(C(=O)OC(C)(C)C)C2)n2nc([C@H]3CC[C@H](C(F)(F)F)CC3)cc2n1] | 467.2 | 82 + 29 | c |
| 92 | 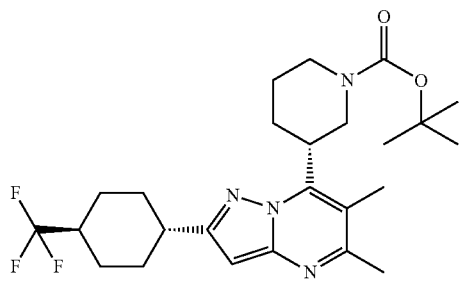 [SMILES: Cc1nc2cc([C@H]3CC[C@H](C(F)(F)F)CC3)nn2c([C@@H]2CCCN(C(=O)OC(C)(C)C)C2)c1C] | 481.2 | 82 + 47 | c |

TABLE 6-continued

| Intermediate | Structure | LC-MS (ESI) m/z [MH+] | Intermediates (starting materials) | Route |
|---|---|---|---|---|
| 93 | | 499.3 | 83 + 30 | c |
| 94 | | 509.3 | 82 + 48 | c |
| 95 | | 509.3 | 82 + 49 | c |
| 96 | | 481.3 | 82 + 32 | c |

TABLE 6-continued

| Intermediate | Structure | LC-MS (ESI) m/z [MH+] | Intermediates (starting materials) | Route |
|---|---|---|---|---|
| 97 | | 495.3 | 82 + 50 | c |
| 98 | | 467.2 | 82 + 33 | c |
| 99 | | 495.2 | 82 + 29 | c |
| 100 | | 509.3 | 82 + 52 | c |
| 101 | | 481.3 | 82 + 31 | c |

TABLE 6-continued

| Intermediate | Structure | LC-MS (ESI) m/z [MH+] | Intermediates (starting materials) | Route |
| --- | --- | --- | --- | --- |
| 102 | | 495.2 | 82 + 53 | c |
| 103 | | 481.2 | 82 + 54 | c |
| 104 | | 495.3 | 82 + 55 | c |
| 105 | | 481.3 | 82 + 34 | c |

TABLE 6-continued
| Intermediate | Structure | LC-MS (ESI) m/z [MH+] | Intermediates (starting materials) | Route |
|---|---|---|---|---|
| 106 | 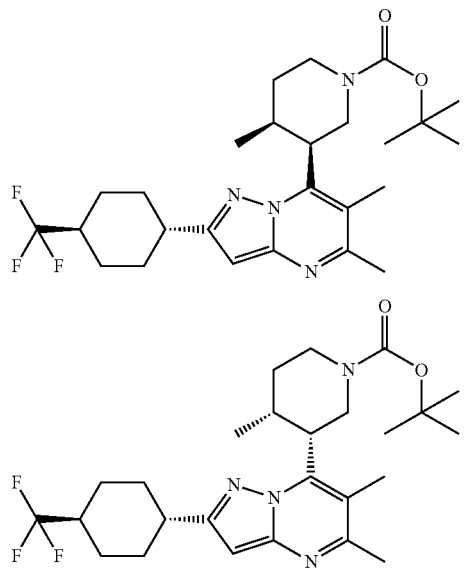 | 495.3 | 82 + 57 | c |
| 107 | | 495.3 | 82 + 38 | c |
| 108 | 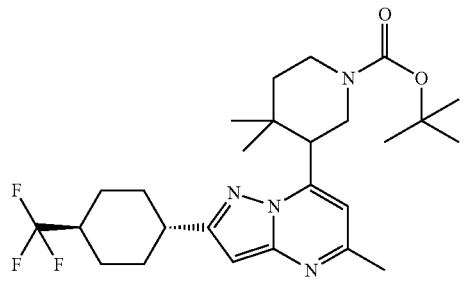 [SMILES: Cc1cc(C2CN(C(=O)OC(C)(C)C)CCC2(C)C)n2nc([C@H]3CC[C@H](C(F)(F)F)CC3)cc2n1] | 499.3 | 82 + 39 | c |
|  | 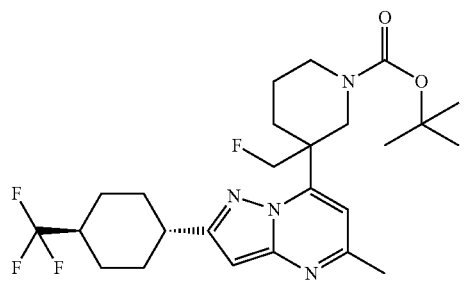 [SMILES: Cc1cc(C2(CF)CCCN(C(=O)OC(C)(C)C)C2)n2nc([C@H]3CC[C@H](C(F)(F)F)CC3)cc2n1] | | | |

TABLE 6-continued

| Intermediate | Structure | LC-MS (ESI) m/z [MH+] | Intermediates (starting materials) | Route |
|---|---|---|---|---|
| 109 | | 509.3 | 82 + 58 | c |
| 110 | | 495.3 | 82 + 40 | c |
| 111 | | 483.3 | 82 + 59 | c |
| 112 | | 483.3 | 82 + 42 | c |

TABLE 6-continued
| Intermediate | Structure | LC-MS (ESI) m/z [MH+] | Intermediates (starting materials) | Route |
|---|---|---|---|---|
| 113 | 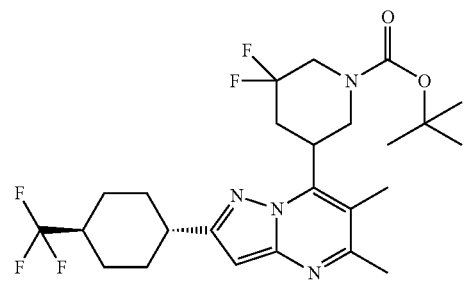 [SMILES: Cc1nc2cc([C@H]3CC[C@H](C(F)(F)F)CC3)nn2c(C2CN(C(=O)OC(C)(C)C)CC(F)(F)C2)c1C] | 517.3 | 82 + 60 | c |
| 114 | 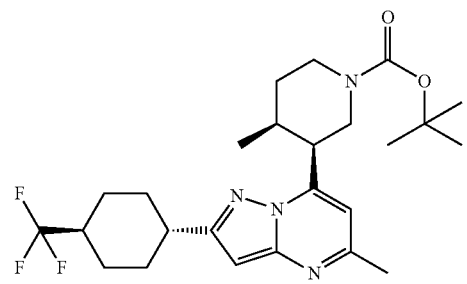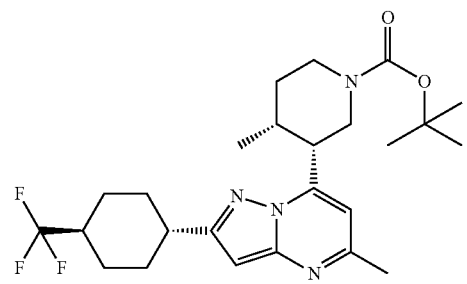 | 481.2 | 82 + 30 | c |
| 115 | 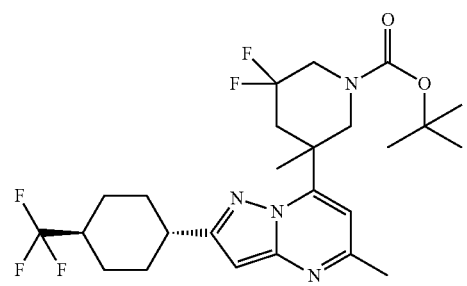 [SMILES: Cc1cc(C2(C)CN(C(=O)OC(C)(C)C)CC(F)(F)C2)n2nc([C@H]3CC[C@H](C(F)(F)F)CC3)cc2n1] | 517.3 | 82 + 44 | c |

TABLE 6-continued

| Intermediate | Structure | LC-MS (ESI) m/z [MH+] | Intermediates (starting materials) | Route |
|---|---|---|---|---|
| 116 | | 481.3 | 82 + 36 | c |
| 117 | | 497.3 | 82 + 61 | c |
| 118 | | 469.3 | 82 + 41 | c |
| 119 | | 483.3 | 82 + 62 | c |

TABLE 6-continued

| Intermediate | Structure | LC-MS (ESI) m/z [MH+] | Intermediates (starting materials) | Route |
|---|---|---|---|---|
| 120 | | 481.3 | 82 + 37 | c |
| 121 | | 469.3 | 82 + 64 | d |
| 122 | | 474.3 | 82 + 66 | d |
| 123 | | 474.3 | 82 + 67 | d |

TABLE 6-continued

| Intermediate | Structure | LC-MS (ESI) m/z [MH+] | Intermediates (starting materials) | Route |
|---|---|---|---|---|
| 124 | | 481.2 | 82 + 35 | c |
| | | | | |
| 125 | | 474.3 | 82 + 68 | d |
| 126 | | 474.3 | 82 + 69 | d |
| 127 | | 474.3 | 82 + 72 | d |

TABLE 6-continued

| Intermediate | Structure | LC-MS (ESI) m/z [MH+] | Intermediates (starting materials) | Route |
|---|---|---|---|---|
| 128 | | 487.2 | 83 + 63 | d |
| 129 | | 511.3 | 82 + 74 | d |
| 130 | | 474.3 | 82 + 75 | d |
| 131 | | 474.3 | 82 + 76 | d |
| 132 | | 485.2 | 82 + 77 | d |

TABLE 6-continued

| Intermediate | Structure | LC-MS (ESI) m/z [MH+] | Intermediates (starting materials) | Route |
|---|---|---|---|---|
| 133 | | 511.3 | 82 + 78 | d |
| 134 | | 497.3 | 82 + 70 | d |
| 135 | | 497.3 | 82 + 71 | d |
| 136 | | 499.2 | 83 + 79 | d |
| 137 | | 499.2 | 83 + 80 | d |

TABLE 6-continued

| Intermediate | Structure | LC-MS (ESI) m/z [MH+] | Intermediates (starting materials) | Route |
|---|---|---|---|---|
| 138 | | 487.2 | 83 + 64 | d |
| 139 | | 487.2 | 83 + 63 | d |
| 140 | | 479.3 | 82 + 81 | d |
| 141 | | 497.3 | 83 + 81 | d |
| 142 | | 457.2 | 85 + 64 | d |

TABLE 6-continued

| Intermediate | Structure | LC-MS (ESI) m/z [MH+] | Intermediates (starting materials) | Route |
|---|---|---|---|---|
| 143 | | 457.2 | 85 + 63 | d |
| 144 | | 499.5 | 85 + 78 | d |
| 145 | | 415.4 | 84 + 65 | d |
| 146 | | 463.4 | 86 + 65 | d |
| 147 | | 481.2 | 82 + 79 | d |

TABLE 6-continued

| Intermediate | Structure | LC-MS (ESI) m/z [MH$^+$] | Intermediates (starting materials) | Route |
|---|---|---|---|---|
| 148 | | 481.2 | 82 + 80 | d |
| 149 | | 463.4 | 86 + 63 | d |
| 150 | | 463.4 | 86 + 64 | d |
| 151 | | 415.4 | 84 + 63 | d |
| 152 | | 415.4 | 84 + 64 | d |

TABLE 6-continued

| Intermediate | Structure | LC-MS (ESI) m/z [MH+] | Intermediates (starting materials) | Route |
|---|---|---|---|---|
| 153 | | 457.4 | 84 + 78 | d |
| 154 | | 485.4 | 83 + 33 | c |
| 155 | | 485.4 | 83 + 29 | c |

Intermediate 156

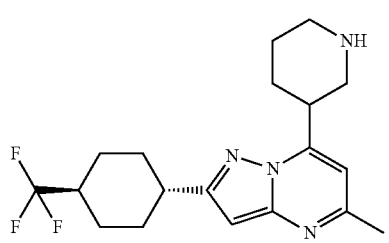 [SMILES: Cc1cc(C2CCCNC2)n2nc([C@H]3CC[C@H](C(F)(F)F)CC3)cc2n1]

3-{5-methyl-2-[trans-4-(trifluoromethyl)cyclohexyl]pyrazolo[1,5-a]pyrimidin-7-yl}piperidine To a solution of 1.00 g (2.14 mmol) tert-butyl 3-{5-methyl-2-[trans-4-(trifluoromethyl)cyclohexyl]pyrazolo[1,5-a]pyrimidin-7-yl}piperidine-1-carboxylate (Intermediate 88) in 20 ml dichloromethane was added 3.3 ml (42.8 mmol) trifluoroacetic acid dropwise at 0° C. The reaction mixture was allowed to warm to RT and stirred for 16 hours. 10 ml distilled water was added, and the pH was adjusted to 10 by the addition of 2 M aqueous sodium hydroxide. The mixture was extracted with dichloromethane. The combined organic layer was washed with distilled water, brine, dried over anhydrous sodium sulfate, filtered and concentrated in vacuo to yield 0.70 g (89%) of the title compound. LC-MS (ESI) m/z 367.2 [MH+]

Intermediates 157-221 were prepared using analogues methods to those Intermediates described above and are exemplified below in Table 7.

TABLE 7

| Intermediate | Structure | LC-MS (ESI) m/z [MH+] | Intermediate (starting material) |
|---|---|---|---|
| 157 | | 367.2 | 91 |
| 158 | | 381.2 | 92 |
| 159 | | 399.3 | 93 |
| | | | |
| 160 | | 409.3 | 94 |
| 161 | | 409.3 | 95 |

TABLE 7-continued

| Intermediate | Structure | LC-MS (ESI) m/z [MH+] | Intermediate (starting material) |
|---|---|---|---|
| 162 | | 381.3 | 96 |
| 163 | | 395.3 | 97 |
| 164 | | 367.2 | 98 |
| 165 | | 395.2 | 99 |
| 166 | | 409.3 | 100 |
| 167 | | 381.3 | 101 |

TABLE 7-continued

| Intermediate | Structure | LC-MS (ESI) m/z [MH+] | Intermediate (starting material) |
|---|---|---|---|
| 168 | | 395.2 | 102 |
| 169 | | 381.2 | 103 |
| 170 | | 395.3 | 104 |
| 171 | | 381.3 | 105 |

TABLE 7-continued

| Intermediate | Structure | LC-MS (ESI) m/z [MH+] | Intermediate (starting material) |
|---|---|---|---|
| 172 | | 395.3 | 106 |
| 173 | | 395.3 | 107 |
| 174 | | 399.3 | 108 |
| 175 | | 409.3 | 109 |

TABLE 7-continued

| Intermediate | Structure | LC-MS (ESI) m/z [MH+] | Intermediate (starting material) |
|---|---|---|---|
| 176 | | 395.3 | 110 |
| 177 | | 383.3 | 111 |
| 178 | | 383.3 | 112 |
| 179 | | 417.3 | 113 |
| 180 | | 381.2 | 114 |

TABLE 7-continued
| Intermediate | Structure | LC-MS (ESI) m/z [MH+] | Intermediate (starting material) |
|---|---|---|---|
| 181 | 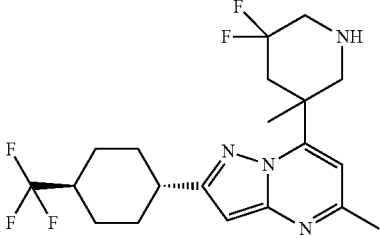 [SMILES: Cc1cc(C2(C)CNCC(F)(F)C2)n2nc([C@H]3CC[C@H](C(F)(F)F)CC3)cc2n1] | 417.3 | 115 |
| 182 | 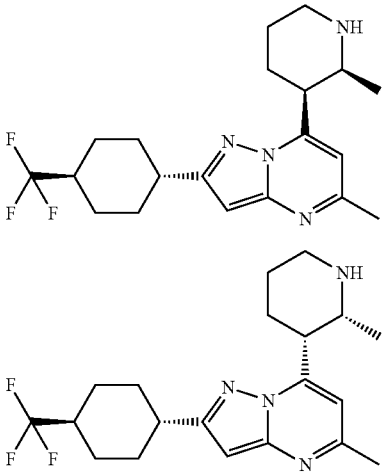 | 381.3 | 116 |
| | 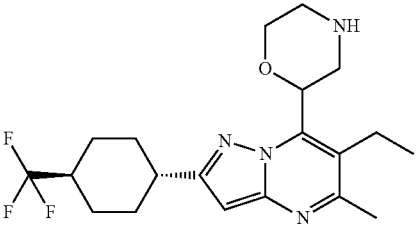 [SMILES: CCc1c(C)nc2cc([C@H]3CC[C@H](C(F)(F)F)CC3)nn2c1C1CNCCO1] | | |
| 183 | 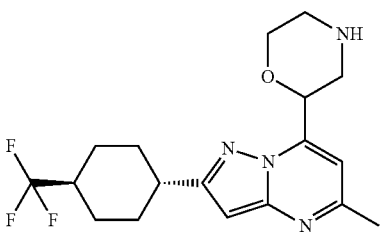 [SMILES: Cc1cc(C2CNCCO2)n2nc([C@H]3CC[C@H](C(F)(F)F)CC3)cc2n1] | 397.3 | 117 |
| 184 | 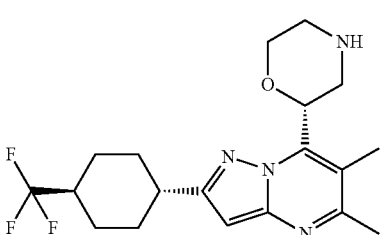 | 369.3 | 118 |
| 185 | | 383.3 | 119 |

TABLE 7-continued

| Intermediate | Structure | LC-MS (ESI) m/z [MH+] | Intermediate (starting material) |
|---|---|---|---|
| 186 | | 381.3 | 120 |
| 187 | | 369.3 | 121 |
| 188 | | 374.3 | 122 |
| 189 | | 374.3 | 123 |

TABLE 7-continued
| Intermediate | Structure | LC-MS (ESI) m/z [MH+] | Intermediate (starting material) |
|---|---|---|---|
| 190 | 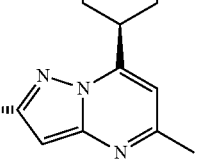 | 381.2 | 124 |
| 191 | 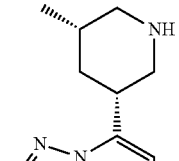 | 374.3 | 125 |
| 192 | 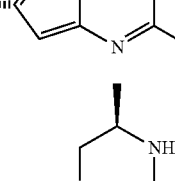 | 374.3 | 126 |
| 193 | 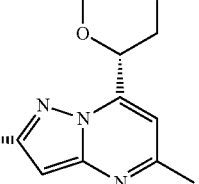 | 374.3 | 127 |
| 194 | 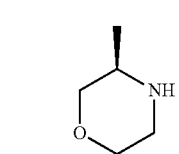 | 387.2 | 128 |

TABLE 7-continued

| Intermediate | Structure | LC-MS (ESI) m/z [MH+] | Intermediate (starting material) |
|---|---|---|---|
| 195 | | 411.3 | 129 |
| 196 | | 374.3 | 130 |
| 197 | | 374.3 | 131 |
| 198 | | 385.2 | 132 |
| 199 | | 411.3 | 133 |

TABLE 7-continued

| Intermediate | Structure | LC-MS (ESI) m/z [MH+] | Intermediate (starting material) |
|---|---|---|---|
| 200 | | 397.3 | 134 |
| 201 | | 397.3 | 135 |
| 202 | | 399.2 | 136 |
| 203 | | 399.2 | 137 |
| 204 | | 387.2 | 138 |

TABLE 7-continued

| Intermediate | Structure | LC-MS (ESI) m/z [MH+] | Intermediate (starting material) |
|---|---|---|---|
| 205 | | 387.2 | 139 |
| 206 | | 379.4 | 140 |
| 207 | | 397.4 | 141 |
| 208 | | 357.2 | 142 |
| 209 | | 357.2 | 143 |
| 210 | | 399.5 | 144 |

TABLE 7-continued

| Intermediate | Structure | LC-MS (ESI) m/z [MH+] | Intermediate (starting material) |
|---|---|---|---|
| 211 | | 315.2 | 145 |
| 212 | | 363.5 | 146 |
| 213 | | 381.2 | 147 |
| 214 | | 381.2 | 148 |
| 215 | | 363.5 | 149 |
| 216 | | 363.5 | 150 |

TABLE 7-continued

| Intermediate | Structure | LC-MS (ESI) m/z [MH+] | Intermediate (starting material) |
|---|---|---|---|
| 217 | | 315.2 | 151 |
| 218 | | 315.2 | 152 |
| 219 | | 357.6 | 153 |
| 220 | | 385.2 | 154 |
| 221 | | 385.2 | 155 |

TABLE 7-continued

| Intermediate | Structure | LC-MS (ESI) m/z [MH+] | Intermediate (starting material) |
|---|---|---|---|
| 222 | | 369.3 | 89 |
| 223 | | 417.2 | 89 |

Intermediate 224

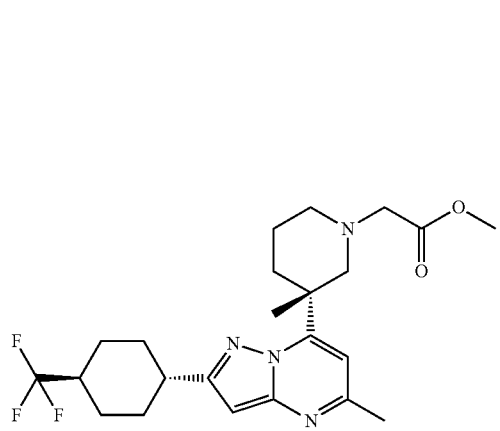 [SMILES: COC(=O)CN1CCC[C@@](C)(c2cc(C)nc3cc([C@H]4CC[C@H](C(F)(F)F)CC4)nn23)C1]

methyl 2-[(3R)-3-methyl-3-{5-methyl-2-[trans-4-(trifluoromethyl)cyclohexyl]pyrazolo[1,5-a]pyrimidin-7-yl}piperidin-1-yl]acetate To a solution of 0.07 g (0.18 mmol) (3R)-3-methyl-3-{5-methyl-2-[trans-4-(trifluoromethyl)cyclohexyl]pyrazolo[1,5-a]pyrimidin-7-yl}piperidine (Intermediate 167) in 2 ml toluene was added 0.03 ml (0.28 mmol) methyl bromoacetate and 0.1 ml (0.57 mmol) N,N-Diisopropylethylamine. The reaction mixture was stirred for 16 hours at RT and diluted with toluene. The mixture was washed with distilled water, brine, dried over anhydrous sodium sulfate, filtered and concentrated in vacuo. The crude product was purified by silica gel chromatography eluting with 5% acetone in dichloromethane to yield 0.06 g (80%) of the title compound. LC-MS (ESI) m/z 453.2 [MH+]

Intermediate 225

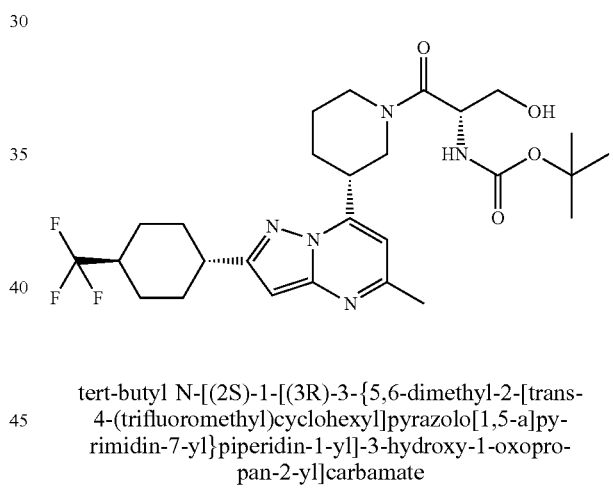

tert-butyl N-[(2S)-1-[(3R)-3-{5,6-dimethyl-2-[trans-4-(trifluoromethyl)cyclohexyl]pyrazolo[1,5-a]pyrimidin-7-yl}piperidin-1-yl]-3-hydroxy-1-oxopropan-2-yl]carbamate Under nitrogen to a solution of 0.17 g (0.45 mmol) (3R)-3-{5,6-dimethyl-2-[trans-4-(trifluoromethyl)cyclohexyl]pyrazolo[1,5-a]pyrimidin-7-yl}piperidine (Intermediate 158) in 10 ml dimethylformamide was added 0.09 g (0.46 mmol) Boc-Ser-OH, 0.08 g (0.54 mmol) 1-Hydroxybenzotriazole hydrate, 0.2 ml (1.12 mmol) N,N-Diisopropylethylamine and 0.1 g (0.54 mmol) EDC at 0° C. The reaction mixture was allowed to warm to RT, and stirred for 16 hours. The reaction mixture was diluted with distilled water. The resulting mixture was extracted with ethyl acetate. The combined organic layer was washed with distilled water, dried over anhydrous sodium sulfate, filtered and concentrated in vacuo. The residue was purified by silica gel chromatography eluting with 4% methanol in dichloromethane to yield 0.12 g (46%) of the title compound. LC-MS (ESI) m/z 568.3 [MH+]

Intermediates 225-226 were prepared using analogues methods to those Intermediates described above and are exemplified below in Table 8.

TABLE 8

| Intermediate | Structure | LC-MS (ESI) m/z [MH+] | Intermediate (starting material) |
|---|---|---|---|
| 226 | | 538.2 | 158 |
| 227 | | 538.2 | 171 |
| | | | |

Example 1

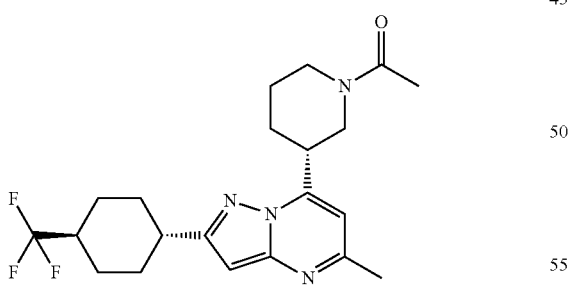

1-(3-{5-methyl-2-[trans-4-(trifluoromethyl)cyclohexyl]pyrazolo[1,5-a]pyrimidin-7-yl}piperidin-1-yl)ethan-1-one To a solution of 0.18 g (0.47 mmol) 3-{5-methyl-2-[trans-4-(trifluoromethyl)cyclohexyl]pyrazolo[1,5-a]pyrimidin-7-yl}piperidine (Intermediate 156) in 15 ml dichloromethane was added 0.1 ml (0.7 mmol) triethylamine and 0.04 ml (0.56 mmol) acetyl chloride. The reaction mixture was stirred for 2 hours at RT and washed with distilled water, dried over anhydrous sodium sulfate, filtered and concentrated in vacuo. The crude product was purified by silica gel chromatography eluting with 0-10% methanol in dichloromethane to yield 0.17 g (85%) of the title compound. LC-MS (ESI) m/z 409.2 [MH+]

Example 2 and Example 3

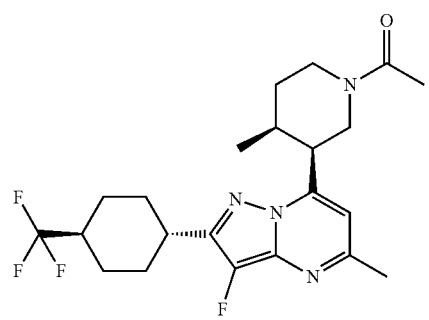

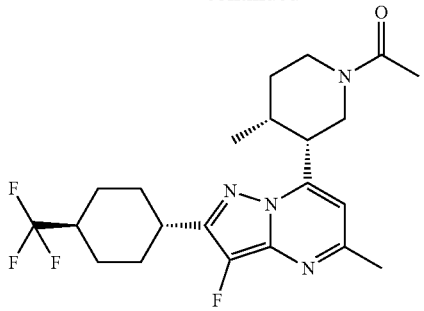

1-[(3S,4S)-3-{3-fluoro-5-methyl-2-[(trans-4-(trifluoromethyl)cyclohexyl]pyrazolo[1,5-a]pyrimidin-7-yl}-4-methylpiperidin-1-yl]ethan-1-one and 1-[(3R,4R)-3-{3-fluoro-5-methyl-2-[trans-4-(trifluoromethyl)cyclohexyl]pyrazolo[1,5-a]pyrimidin-7-yl}-4-methylpiperidin-1-yl]ethan-1-one The racemic form of the title compounds (Example 158) were prepared from cis-3-{3-fluoro-5-methyl-2-[trans-4-(trifluoromethyl)cyclohexyl]pyrazolo[1,5-a]pyrimidin-7-yl}-4-methylpiperidine (Intermediate 159) according to the method described in Example 1. LC-MS (ESI) m/z 441.2 [MH+]. The A and B enantiomers were separated using chiral preparative HPLC (Lux i-Amylose-1 5 μm 250×21.2 mm; F=21.34 ml/min; eluents: A: n-heptane B: 2-propanol; isocratic 5% B t=25° C.) obtaining enantiomer A (T$_r$ 13.625, Example 2), and enantiomer B (T$_r$ 20.089, Example 3). Their absolute configuration is not determined.

Example 4 and Example 5

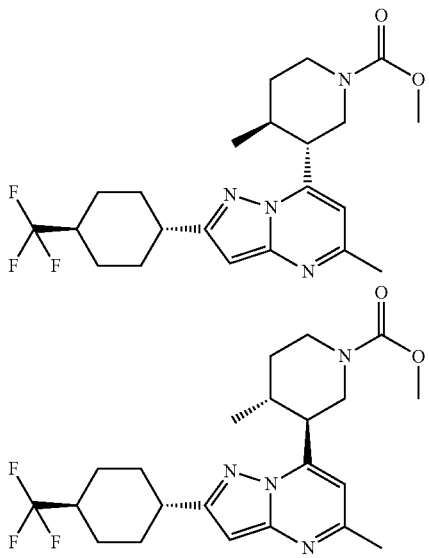

methyl (3R,4S)-4-methyl-3-{5-methyl-2-[trans-4-(trifluoromethyl)cyclohexyl]pyrazolo[1,5-a]pyrimidin-7-yl}piperidine-1-carboxylate and methyl (3S,4R)-4-methyl-3-{5-methyl-2-[trans-4-(trifluoromethyl)cyclohexyl]pyrazolo[1,5-a]pyrimidin-7-yl}piperidine-1-carboxylate The racemic form of the title compounds (Example 159) were prepared from trans-4-methyl-3-{5-methyl-2-[trans-4-(trifluoromethyl)cyclohexyl]pyrazolo[1,5-a]pyrimidin-7-yl}piperidine (Intermediate 171) and methyl chloroformate according to the method described in Example 1. LC-MS (ESI) m/z 439.2 [MH+]. The A and B enantiomers were separated using chiral preparative HPLC (Lux i-Amylose-1 5 μm 150×21.1 mm; F=10 ml/min; eluents: A: water B: 2-propanol; isocratic 55% B t=40° C.) obtaining enantiomer A (T$_r$ 18.886, Example 4), and enantiomer B (T$_r$ 24.444, Example 5). Their absolute configuration was determined with VCD spectroscopy. Example 4 is (3R,4S) and Example 5 is (3S,4R).

Example 6 and Example 7

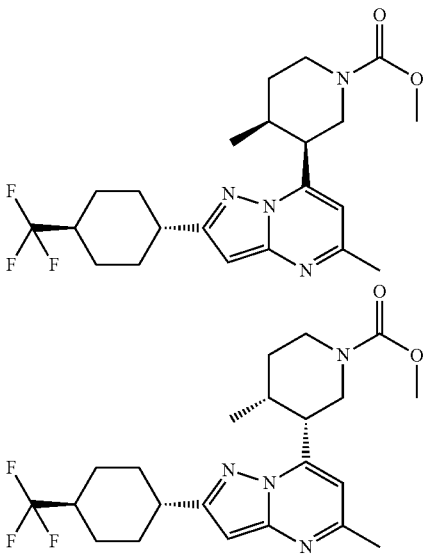

methyl (3S,4S)-4-methyl-3-{5-methyl-2-[trans-4-(trifluoromethyl)cyclohexyl]pyrazolo[1,5-a]pyrimidin-7-yl}piperidine-1-carboxylate and methyl (3R,4R)-4-methyl-3-{5-methyl-2-[trans-4-(trifluoromethyl)cyclohexyl]pyrazolo[1,5-a]pyrimidin-7-yl}piperidine-1-carboxylate The racemic form of the title compounds (Example 76) were prepared from cis-4-methyl-3-{5-methyl-2-[trans-4-(trifluoromethyl)cyclohexyl]pyrazolo[1,5-a]pyrimidin-7-yl}piperidine (Intermediate 180) and methyl chloroformate according to the method described in Example 1. LC-MS (ESI) m/z 439.2 [MH+]. The A and B enantiomers were separated using chiral preparative HPLC (Lux i-Amylose-1 5 μm 150×21.1 mm; F=10 ml/min; eluents: A: water B: 2-propanol; isocratic 55% B t=40° C.) obtaining enantiomer A (T$_r$ 18.886, Example 6), and enantiomer B (T$_r$ 29.748, Example 7). Their absolute configuration is not determined.

Example 8 and Example 9

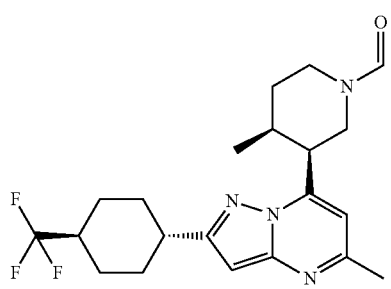

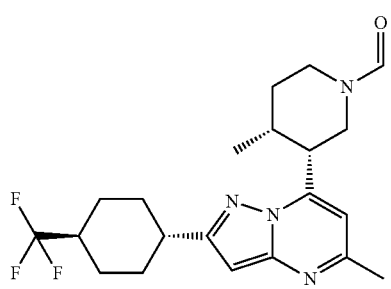

(3S,4S)-4-methyl-3-{5-methyl-2-[trans-4-(trifluoromethyl)cyclohexyl]pyrazolo[1,5-a]pyrimidin-7-yl}piperidine-1-carbaldehyde and (3R,4R)-4-methyl-3-{5-methyl-2-[trans-4-(trifluoromethyl)cyclohexyl]pyrazolo[1,5-a]pyrimidin-7-yl}piperidine-1-carbaldehyde The racemic form of the title compounds (Example 160) were prepared from cis-4-methyl-3-{5-methyl-2-[trans-4-(trifluoromethyl)cyclohexyl]pyrazolo[1,5-a]pyrimidin-7-yl}piperidine (Intermediate 180) and formic acid according to the method described in Example 22. LC-MS (ESI) m/z 409.2 [MH$^+$]. The A and B enantiomers were separated using chiral preparative HPLC (Chiral Pak IG 20 μm 200× 50 mm; F=50 ml/min; eluents: A: n-heptane B: dichloromethane; isocratic 50% B t=25° C.) obtaining enantiomer A (T$_r$ 27, Example 8), and enantiomer B (T$_r$ 51, Example 9). Their absolute configuration is not determined.

Example 10 and Example 11

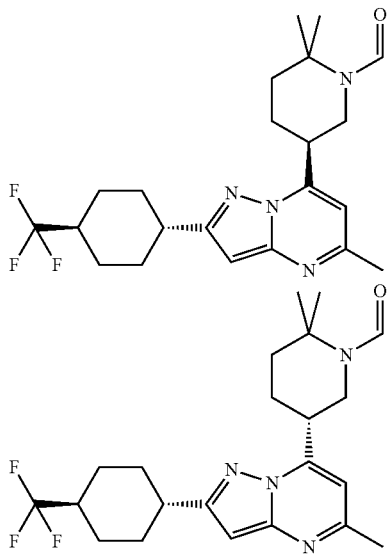

(2S)-5,5-dimethyl-2-{5-methyl-2-[trans-4-(trifluoromethyl)cyclohexyl]pyrazolo[1,5-a]pyrimidin-7-yl}morpholine-4-carbaldehyde and (2R)-5,5-dimethyl-2-{5-methyl-2-[trans-4-(trifluoromethyl)cyclohexyl]pyrazolo[1,5-a]pyrimidin-7-yl}morpholine-4-carbaldehyde The enantiomerically enriched form of the title compounds were prepared from (2S)-5,5-dimethyl-2-{5-methyl-2-[trans-4-(trifluoromethyl)cyclohexyl]pyrazolo[1,5-a]pyrimidin-7-yl}morpholine or (2R)-5,5-dimethyl-2-{5-methyl-2-[trans-4-(trifluoromethyl)cyclohexyl]pyrazolo[1,5-a]pyrimidin-7-yl}morpholine (Intermediate 200 or Intermediate 201) and formic acid according to the method described in Example 22. LC-MS (ESI) m/z 425.2 [MH$^+$]. The A and B enantiomers were separated using chiral preparative HPLC (Reprosil Chiral MIX 5 μm 150×20 mm; F=20 ml/min; eluents: A: water B: acetonitrile; isocratic 50% B t=40° C.) obtaining enantiomer A (T$_r$ 12.783, Example 10), and enantiomer B (T$_r$ 15.088, Example 11).

Example 12

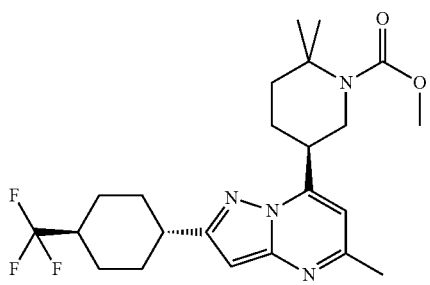

methyl (2S)-5,5-dimethyl-2-{5-methyl-2-[trans-4-(trifluoromethyl)cyclohexyl]pyrazolo[1,5-a]pyrimidin-7-yl}morpholine-4-carboxylate The enantiomerically enriched form of the title compound were prepared from (2S)-5,5-dimethyl-2-{5-methyl-2-[trans-4-(trifluoromethyl)cyclohexyl]pyrazolo[1,5-a]pyrimidin-7-yl}morpholine (Intermediate 200) and methyl chloroformate according to the method described in Example 1. LC-MS (ESI) m/z 455.2 [MH⁺]. The A and B enantiomers were separated using chiral preparative HPLC (Lux Cellulose-3 5 µm 250×21.1 mm; F=20 ml/min; eluents: A: n-heptane B: 2-propanol; isocratic 10% B t=40° C.) obtaining enantiomer A ($T_r$ 4.788, Example 12).

Example 13 and Example 14

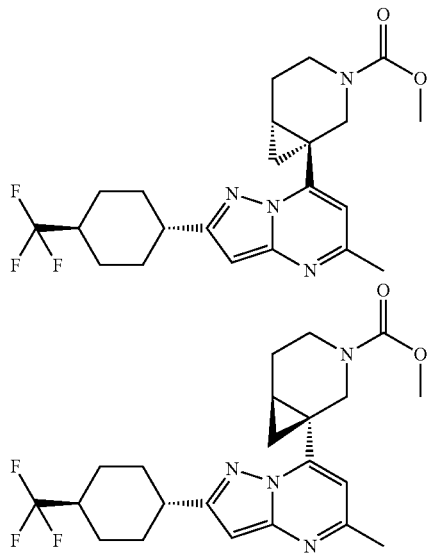

methyl (1S,6R)-1-{5-methyl-2-[trans-4-(trifluoromethyl)cyclohexyl]pyrazolo[1,5-a]pyrimidin-7-yl}-3-azabicyclo[4.1.0]heptane-3-carboxylate and methyl (1R,6S)-1-{5-methyl-2-[trans-4-(trifluoromethyl)cyclohexyl]pyrazolo[1,5-a]pyrimidin-7-yl}-3-azabicyclo[4.1.0]heptane-3-carboxylate The racemic form of the title compounds were prepared from 1-{5-methyl-2-[trans-4-(trifluoromethyl)cyclohexyl]pyrazolo[1,5-a]pyrimidin-7-yl}-3-azabicyclo[4.1.0]heptane (Intermediate 206) and methyl chloroformate according to the method described in Example 1. LC-MS (ESI) m/z 437.2 [MH⁺]. The A and B enantiomers were separated using chiral preparative HPLC (Lux Cellulose-3 5 µm 250×21.2 mm; F=25 ml/min; eluents: A: water B: acetonitrile; isocratic 50% B t=40° C.) obtaining enantiomer A ($T_r$ 6.811, Example 13), and enantiomer B ($T_r$ 7.479, Example 14). Their absolute configuration is not determined.

Example 15 and Example 16

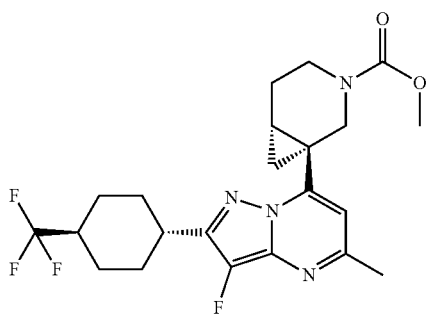

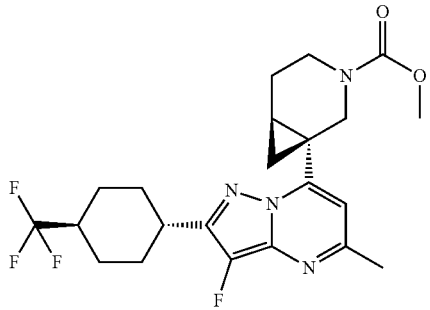

methyl (1S,6R)-1-{3-fluoro-5-methyl-2-[trans-4-(trifluoromethyl)cyclohexyl]pyrazolo[1,5-a]pyrimidin-7-yl}-3-azabicyclo[4.1.0]heptane-3-carboxylate and methyl (1R,6S)-1-{3-fluoro-5-methyl-2-[trans-4-(trifluoromethyl)cyclohexyl]pyrazolo[1,5-a]pyrimidin-7-yl}-3-azabicyclo[4.1.0]heptane-3-carboxylate The racemic form of the title compounds were prepared from 1-{3-fluoro-5-methyl-2-[trans-4-(trifluoromethyl)cyclohexyl]pyrazolo[1,5-a]pyrimidin-7-yl}-3-azabicyclo[4.1.0]heptane (Intermediate 207) and methyl chloroformate according to the method described in Example 1. LC-MS (ESI) m/z 455.2 [MH⁺]. The A and B enantiomers were separated using chiral preparative HPLC (Lux Cellulose-3 5 µm 250×21.2 mm; F=25 ml/min; eluents: A: water B: acetonitrile; isocratic 50% B t=40° C.) obtaining enantiomer A ($T_r$ 8.811, Example 15), and enantiomer B ($T_r$ 10.414, Example 16). Their absolute configuration is not determined.

Example 17

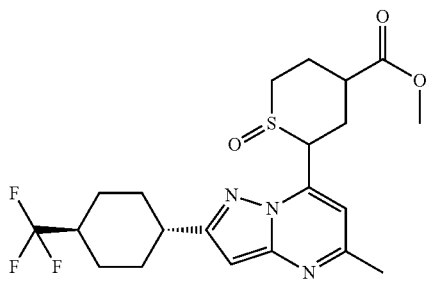 [SMILES: COC(=O)C1CCS(=O)C(c2cc(C)nc3cc([C@H]4CC[C@H](C(F)(F)F)CC4)nn23)C1]

methyl 2-{5-methyl-2-[(trans-4-(trifluoromethyl)
cyclohexyl]pyrazolo[1,5-a]pyrimidin-7-yl}-1-oxo-
1λ⁴-thiomorpholine-4-carboxylate To a solution of 0.16 g (0.73 mmol) Sodium periodate in 10 ml distilled water was added 0.1 g (0.23 mmol) methyl 2-{5-methyl-2-[trans-4-(trifluoromethyl)cyclohexyl]pyrazolo[1,5-a]pyrimidin-7-yl}thiomorpholine-4-carboxylate (Example 126), 10 ml methanol and 10 ml dioxane at 0° C. The reaction mixture was allowed to warm to RT and stirred for 16 hours. The organic solvents were evaporated, and the mixture was filtered to yield 0.07 g (66%) of the title compound. LC-MS (ESI) m/z 459.2 [MH⁺].

Example 18

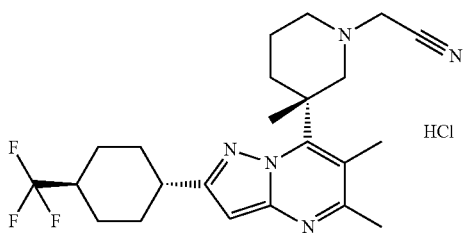 [SMILES: Cc1nc2cc([C@H]3CC[C@H](C(F)(F)F)CC3)nn2c([C@]2(C)CCCN(CC#N)C2)c1C ; Cl]

2-[(3R)-3-{5,6-dimethyl-2-[trans-4-(trifluoromethyl)
cyclohexyl]pyrazolo[1,5-a]pyrimidin-7-yl}-3-methylpiperidin-1-yl]acetonitrile hydrochloride a) 2-[(3R)-3-{5,6-dimethyl-2-[trans-4-(trifluoromethyl)cyclohexyl]pyrazolo[1,5-a]pyrimidin-7-yl}-3-methylpiperidin-1-yl]acetonitrile The title compound is prepared from (3R)-3-{5,6-dimethyl-2-[trans-4-(trifluoromethyl)cyclohexyl]pyrazolo[1,5-a]pyrimidin-7-yl}-3-methylpiperidine (Intermediate 170) and bromoacetonitrile according to the method described in Intermediate 224.

b) 2-[(3R)-3-{5,6-dimethyl-2-[trans-4-(trifluoromethyl)cyclohexyl]pyrazolo[1,5-a]pyrimidin-7-yl}-3-methylpiperidin-1-yl]acetonitrile hydrochloride To a solution of 0.05 g (0.12 mmol) 2-[(3R)-3-{5,6-dimethyl-2-[trans-4-(trifluoromethyl)cyclohexyl]pyrazolo[1,5-a]pyrimidin-7-yl}-3-methylpiperidin-1-yl]acetonitrile in 5 ml diethyl ether was added 1 ml hydrochloric acid in ethyl acetate was added. The precipitate was filtered to yield 0.04 g (67%) of the title compound. LC-MS (ESI) m/z 434.3 [MH⁺].

Example 19

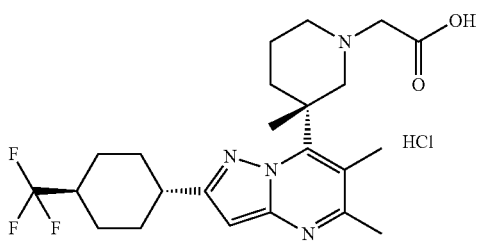 [SMILES: Cc1nc2cc([C@H]3CC[C@H](C(F)(F)F)CC3)nn2c([C@]2(C)CCCN(CC(=O)O)C2)c1C ; Cl]

2-[(3R)-3-{5,6-dimethyl-2-[trans-4-(trifluoromethyl)
cyclohexyl]pyrazolo[1,5-a]pyrimidin-7-yl}-3-methylpiperidin-1-yl]acetic acid hydrochloride To a suspension of 0.06 g methyl 2-[(3R)-3-methyl-3-{5-methyl-2-[trans-4-(trifluoromethyl)cyclohexyl]pyrazolo[1,5-a]pyrimidin-7-yl}piperidin-1-yl]acetate (Intermediate 224) in 0.5 ml distilled water was added 0.5 ml 37% hydrochloric acid. The mixture was refluxed for 16 hours. The reaction mixture was concentrated in vacuo, and triturated with diethyl ether. The mixture was filtered to yield 0.04 g (73%) of the title compound. LC-MS (ESI) m/z 439.2 [MH⁺].

Example 20

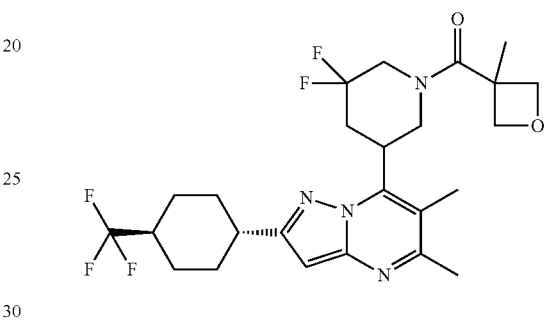

5-{5,6-dimethyl-2-[trans-4-(trifluoromethyl)cyclohexyl]pyrazolo[1,5-a]pyrimidin-7-yl}-3,3-difluoro-1-(3-methyloxetane-3-carbonyl)piperidine Under nitrogen to a solution of 0.08 g (0.19 mmol) 5-{5,6-dimethyl-2-[-4-(trifluoromethyl)cyclohexyl]pyrazolo[1,5-a]pyrimidin-7-yl}-3,3-difluoropiperidine (Intermediate 179) in 1 ml dimethylformamide was added 0.03 g (0.23 mmol) 3-Methyloxetane-3-carboxylic acid, 0.07 g (0.19 mmol) HBTU and 0.11 ml (0.634 mmol) N,N-Diisopropylethylamine. The reaction mixture was stirred for 16 hours. The reaction mixture was diluted with distilled water. The resulting mixture was extracted with ethyl acetate. The combined organic layer was washed with distilled water, dried over anhydrous sodium sulfate, filtered and concentrated in vacuo. The residue was purified by silica gel chromatography eluting with 5% methanol in dichloromethane to yield 0.05 g (50%) of the title compound. LC-MS (ESI) m/z 515.2 [MH⁺]

Example 21

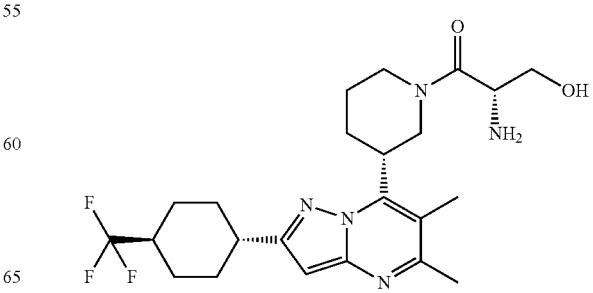

(2S)-2-amino-1-[(3R)-3-{5,6-dimethyl-2-[trans-4-(trifluoromethyl)cyclohexyl]pyrazolo[1,5-a]pyrimidin-7-yl}piperidin-1-yl]-3-hydroxypropan-1-one To a solution of 0.12 g (0.21 mmol) tert-butyl N-[(2S)-1-[(3R)-3-{5,6-dimethyl-2-[trans-4-(trifluoromethyl)cyclohexyl]pyrazolo[1,5-a]pyrimidin-7-yl}piperidin-1-yl]-3-hydroxy-1-oxopropan-2-yl]carbamate (Intermediate 225) in 5 ml dichloromethane was added 1 ml (10 mmol) trifluoroacetic acid. The reaction mixture was stirred at RT for 16 hours and the pH was adjusted to 8 by the addition of saturated NaHCO₃ solution. The mixture was extracted with dichloromethane. The combined organic layer was washed with distilled water, brine, dried over anhydrous sodium sulfate, filtered and concentrated in vacuo. The residue was purified by silica gel chromatography eluting with 10% methanol in dichloromethane to yield 0.04 g (43%) of the title compound. LC-MS (ESI) m/z 468.2 [MH⁺]

Example 22

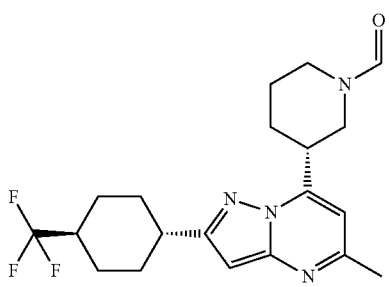

(3R)-3-{5-methyl-2-[trans-4-(trifluoromethyl)cyclohexyl]pyrazolo[1,5-a]pyrimidin-7-yl}piperidine-1-carbaldehyde To a solution of 0.16 g (0.45 mmol) (3R)-3-{5-methyl-2-[trans-4-(trifluoromethyl)cyclohexyl]pyrazolo[1,5-a]pyrimidin-7-yl}piperidine (Intermediate 157) in 10 ml toluene was added 0.2 ml (53.4 mmol) formic acid. The reaction mixture was refluxed for 3 hours and evaporated. The crude product was purified by silica gel chromatography eluting with 0-100% ethyl acetate in cyclohexane to yield 0.14 g (78%) of the title compound. LC-MS (ESI) m/z 395.2 [MH⁺]

Example 23

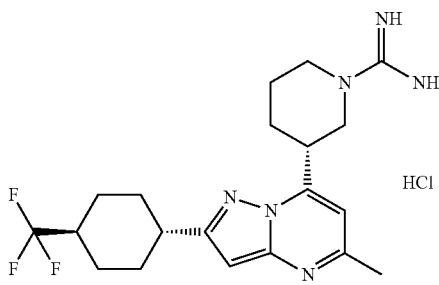

(3R)-3-{5-methyl-2-[trans-4-(trifluoromethyl)cyclohexyl]pyrazolo[1,5-a]pyrimidin-7-yl}piperidine-1-carboximidamide hydrochloride To a solution of 0.08 g (0.2 mmol) (3R)-3-{5-methyl-2-[trans-4-(trifluoromethyl)cyclohexyl]pyrazolo[1,5-a]pyrimidin-7-yl}piperidine (Intermediate 157) in 1 ml dimethylformamide was added 0.06 g (0.4 mmol) 1-Amidinopyrazole Hydrochloride and 0.07 ml (0.4 mmol) N,N-Diisopropylethylamine. The reaction mixture was stirred for 16 hours at RT and filtered to yield 0.09 g (97%) of the title compound. LC-MS (ESI) m/z 409.3 [MH⁺]

Example 24

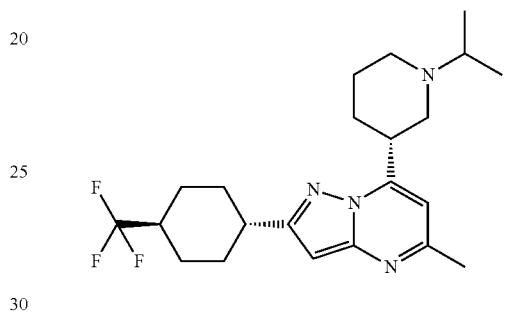

(3R)-3-{5-methyl-2-[trans-4-(trifluoromethyl)cyclohexyl]pyrazolo[1,5-a]pyrimidin-7-yl}-1-(propan-2-yl)piperidine To a solution of 0.13 g (0.34 mmol) (3R)-3-{5-methyl-2-[trans-4-(trifluoromethyl)cyclohexyl]pyrazolo[1,5-a]pyrimidin-7-yl}piperidine (Intermediate 157) in 5 ml 1,2-dichloroethane was added 0.03 ml (0.34 mmol) acetone, 0.1 g (0.48 mmol) Sodium triacetoxyborohydride and 0.02 ml (0.34 mmol) acetic acid. The reaction mixture was stirred for 16 hours at RT and washed with 1M NaOH solution. The organic layer was washed with distilled water, brine, dried over anhydrous sodium sulfate, filtered and concentrated in vacuo. The crude product was purified by silica gel chromatography eluting with 0-10% methanol in dichloromethane to yield 0.05 g (38%) of the title compound. LC-MS (ESI) m/z 409.3 [MH⁺]

Example 25

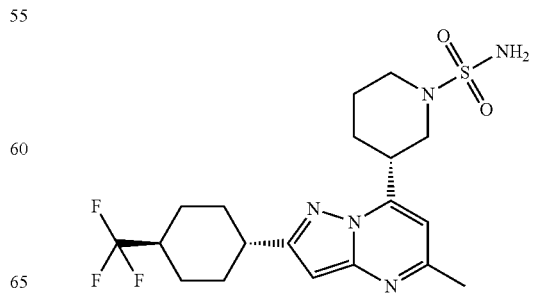

(2R)-2-{5-methyl-2-[trans-4-(trifluoromethyl)cyclohexyl]pyrazolo[1,5-a]pyrimidin-7-yl}morpholine-4-sulfonamide To a solution of 0.12 g (0.33 mmol) (2R)-2-{5-methyl-2-[trans-4-(trifluoromethyl)cyclohexyl]pyrazolo[1,5-a]pyrimidin-7-yl}morpholine (Intermediate 222) in 15 ml dioxane was added 0.31 g (3.23 mmol) sulfamide. The reaction mixture was refluxed for 1 hour and evaporated. The crude product was purified by silica gel chromatography eluting with 0-100% ethyl acetate in cyclohexane to yield 0.03 g (21%) of the title compound. LC-MS (ESI) m/z 448.2 [MH$^+$]

Example 26

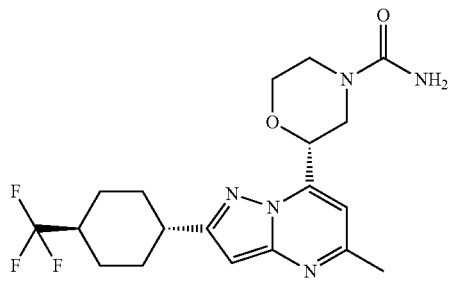 [SMILES: Cc1cc([C@H]2CN(C(N)=O)CCO2)n2nc([C@H]3CC[C@H](C(F)(F)F)CC3)cc2n1]

(2R)-2-{5-methyl-2-[trans-4-(trifluoromethyl)cyclohexyl]pyrazolo[1,5-a]pyrimidin-7-yl}morpholine-4-carboxamide To a solution of 0.12 g (0.33 mmol) (2R)-2-{5-methyl-2-[trans-4-(trifluoromethyl)cyclohexyl]pyrazolo[1,5-a]pyrimidin-7-yl}morpholine (Intermediate 222) in 10 ml dichloromethane was added 0.1 ml (0.72 mmol) (Trimethylsilyl)isocyanate. The reaction mixture was stirred for 3 hours at RT. The reaction mixture was washed with distilled water, brine, dried over anhydrous sodium sulfate, filtered and concentrated in vacuo. The crude product was purified by silica gel chromatography eluting with 0-10% methanol in dichloromethane to yield 0.06 g (48%) of the title compound. LC-MS (ESI) m/z 412.2 [MH$^+$]

Example 27

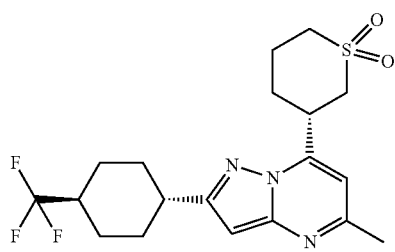 [SMILES: Cc1cc([C@@H]2CCCS(=O)(=O)C2)n2nc([C@H]3CC[C@H](C(F)(F)F)CC3)cc2n1]

3-{5-methyl-2-[trans-4-(trifluoromethyl)cyclohexyl]pyrazolo[1,5-a]pyrimidin-7-yl}-1λ$^6$-thiane-1,1-dione The title compound is prepared from 3-[trans-4-(trifluoromethyl)cyclohexyl]-1H-pyrazol-5-amine (Intermediate 82) and 3-(but-2-ynoyl)-1λ$^6$-thiane-1,1-dione (Intermediate 73) according to the method described in Intermediate 89. LC-MS (ESI) m/z 416.2 [MH$^+$]

Example 28 and Example 29

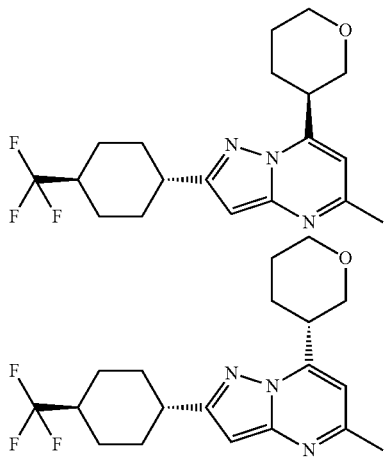

5-methyl-7-[(3R)-oxan-3-yl]-2-[trans-4-(trifluoromethyl)cyclohexyl]pyrazolo[1,5-a]pyrimidine and 5-methyl-7-[(3S)-oxan-3-yl]-2-[trans-4-(trifluoromethyl)cyclohexyl]pyrazolo[1,5-a]pyrimidine The racemic form of the title compounds (Example 161) were prepared from 3-[trans-4-(trifluoromethyl)cyclohexyl]-1H-pyrazol-5-amine (Intermediate 82) and 1-(oxan-3-yl)butane-1,3-dione (Intermediate 45) according to the method described in Intermediate 88. LC-MS (ESI) m/z 368.2 [MH$^+$]. The A and B enantiomers were separated using chiral preparative HPLC (Lux i-Amylose-1 5 μm 150×21.1 mm; F=20 ml/min; eluents: A: water B: acetonitrile; isocratic 50% B t=40° C.) obtaining enantiomer A (T$_r$ 26.148, Example 28), and enantiomer B (T$_r$ 30.798, Example 29).

Example 30

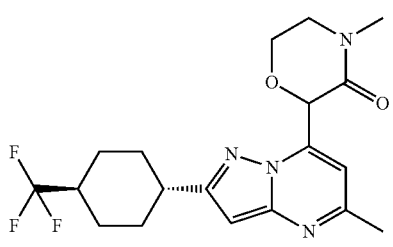

4-methyl-2-{5-methyl-2-[trans-4-(trifluoromethyl)cyclohexyl]pyrazolo[1,5-a]pyrimidin-7-yl}morpholin-3-one The title compound is prepared from 7-chloro-5-methyl-2-[trans-4-(trifluoromethyl)cyclohexyl]pyrazolo[1,5-a]pyrimidine (Intermediate 87) and 4-methylmorpholin-3-one according to the method described in Intermediate 90. LC-MS (ESI) m/z 397.2 [MH+]

Example 31

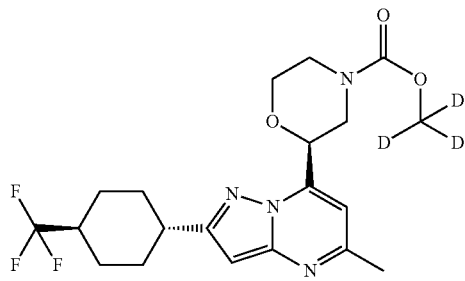 [SMILES: [2H]C([2H])([2H])OC(=O)N1CCO[C@H](c2cc(C)nc3cc([C@H]4CC[C@H](C(F)(F)F)CC4)nn23)C1]

($^2$H$_3$)methyl (2S)-2-{5-methyl-2-[(trans-4-(trifluoromethyl)cyclohexyl]pyrazolo[1,5-a]pyrimidin-7-yl}morpholine-4-carboxylate To a solution of 0.39 g (2.42 mmol) Carbonyldiimidazole in 20 ml dichloromethane was added 0.1 ml (2.42 mmol) CD$_3$OD at 0° C. The reaction mixture was stirred for 1 hours at RT. To this mixture, 0.89 g (2.42 mmol) (2S)-2-{5-methyl-2-[trans-4-(trifluoromethyl)cyclohexyl]pyrazolo[1,5-a]pyrimidin-7-yl}morpholine (Intermediate 187) dissolved in 10 ml dichloromethane was added. The reaction mixture was stirred at RT for 16 hours. The reaction mixture was washed with distilled water, brine, dried over anhydrous sodium sulfate, filtered and concentrated in vacuo. The crude product was purified by silica gel chromatography eluting with 0-10% methanol in dichloromethane to yield 0.09 g (8%) of the title compound. LC-MS (ESI) m/z 430.4 [MH+]

Examples 32-161 were prepared using analogues methods to those Examples described above and are exemplified below in Table 9.

TABLE 9

| Example | Structure | LC-MS (ESI) m/z [MH+] | Intermediate |
|---|---|---|---|
| 32 | | 409.2 | 157 |
| 33 | | 423.2 | 158 |
| 34 | | 451.2 | 160 |

TABLE 9-continued

| Example | Structure | LC-MS (ESI) m/z [MH+] | Intermediate |
|---|---|---|---|
| 35 | | 451.2 | 161 |
| 36 | | 423.2 | 162 |
| 37 | | 437.2 | 163 |
| 38 | | 423.2 | 164 |
| 39 | | 437.2 | 165 |

TABLE 9-continued

| Example | Structure | LC-MS (ESI) m/z [MH+] | Intermediate |
|---|---|---|---|
| 40 | | 451.2 | 166 |
| 41 | | 423.2 | 167 |
| 42 | | 437.2 | 168 |
| 43 | | 423.2 | 169 |
| 44 | | 487.2 | 160 |

TABLE 9-continued

| Example | Structure | LC-MS (ESI) m/z [MH+] | Intermediate |
|---|---|---|---|
| 45 | | 437.2 | 170 |
| 46 | | 470.2 | 159 |
| | | | |
| 47 | | 439.2 | 158 |
| 48 | | 477.2 HCl | 170 |

TABLE 9-continued

| Example | Structure | LC-MS (ESI) m/z [MH+] | Intermediate |
|---------|-----------|----------------------|--------------|
| 49 | | 452.2 | 170 |
| 50 | | 420.2 | 167 |
| 51 | | 453.2 | 165 |
| 52 | | 438.2 | 225 |

TABLE 9-continued

| Example | Structure | LC-MS (ESI) m/z [MH+] | Intermediate |
|---|---|---|---|
| 53 | | 438.2 | 171 |
| 54 | | 435.2 | 157 |
| 55 | | 437.2 | 172 |

TABLE 9-continued

| Example | Structure | LC-MS (ESI) m/z [MH+] | Intermediate |
|---------|-----------|------------------------|--------------|
| 56 | | 409.2 | 172 |
| 57 | | 437.2 | 172 |

TABLE 9-continued

| Example | Structure | LC-MS (ESI) m/z [MH+] | Intermediate |
|---|---|---|---|
| 58 | | 423.2 | 172 |
| 59 | | 423.2 | 173 |
| 60 | | 451.2 | 173 |
| 61 | | 409.2 | 173 |

TABLE 9-continued

| Example | Structure | LC-MS (ESI) m/z [MH+] | Intermediate |
|---|---|---|---|
| 62 | | 441.2 | 174 |
| 63 | | 437.2 | 157 |
| 64 | | 423.2 | 167 |
| 65 | | 480.2 | 157 |

TABLE 9-continued

| Example | Structure | LC-MS (ESI) m/z [MH+] | Intermediate |
|---|---|---|---|
| 66 | | 451.2 | 175 |
| 67 | | 453.2 | 176 |
| 68 | | 409.2 | 171 |

TABLE 9-continued

| Example | Structure | LC-MS (ESI) m/z [MH+] | Intermediate |
|---|---|---|---|
| 69 | | 409.2 | 167 |
| 70 | | 425.3 | 177 |
| 71 | | 460.2 | 167 |
| 72 | | 423.3 | 176 |
| 73 | | 441.2 | 178 |

TABLE 9-continued

| Example | Structure | LC-MS (ESI) m/z [MH+] | Intermediate |
|---------|-----------|----------------------|--------------|
| 74 | | 475.2 | 179 |
| 75 | | 445.2 | 179 |
| 76 | | 439.3 | 180 |

TABLE 9-continued

| Example | Structure | LC-MS (ESI) m/z [MH⁺] | Intermediate |
|---|---|---|---|
| 77 | | 453.2 | 172 |
| 78 | | 445.3 | 181 |
| 79 | | 515.2 | 75 |
| 80 | | 411.2 | 177 |

TABLE 9-continued
| Example | Structure | LC-MS (ESI) m/z [MH+] | Intermediate |
|---|---|---|---|
| 81 | 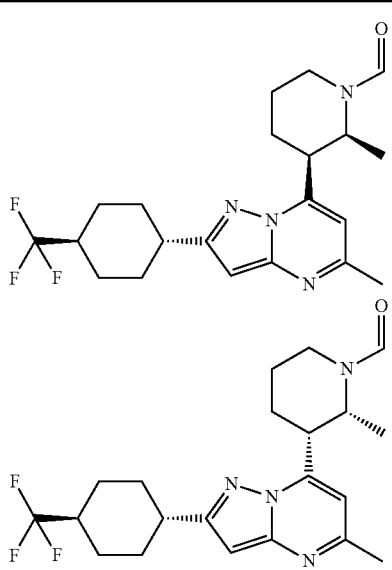 | 409.2 | 182 |
| 82 | 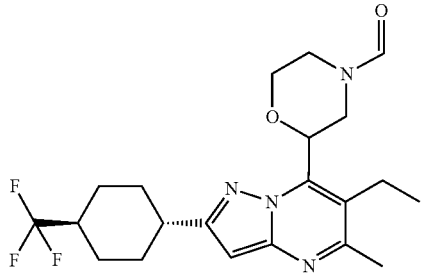 [SMILES: CCc1c(C)nc2cc([C@H]3CC[C@H](C(F)(F)F)CC3)nn2c1C1CN(C=O)CCO1] | 425.2 | 183 |
| 83 | 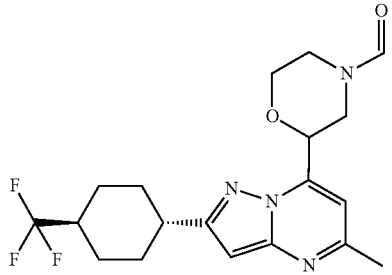 [SMILES: Cc1cc([C@H]2CN(C=O)CCO2)n2nc([C@H]3CC[C@H](C(F)(F)F)CC3)cc2n1] | 397.2 | 184 |
| 84 | 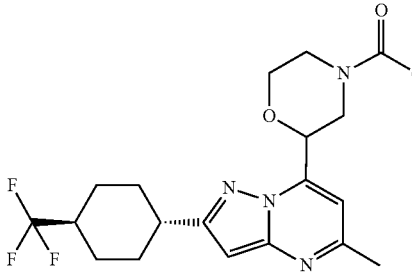 | 427.2 | 184 |

TABLE 9-continued

| Example | Structure | LC-MS (ESI) m/z [MH+] | Intermediate |
|---|---|---|---|
| 85 | | 459.2 | 180 |
| 86 | | 397.2 | 222 |
| 87 | | 445.3 | 223 |
| 88 | | 425.2 | 185 |

TABLE 9-continued
| Example | Structure | LC-MS (ESI) m/z [MH+] | Intermediate |
|---|---|---|---|
| 89 | 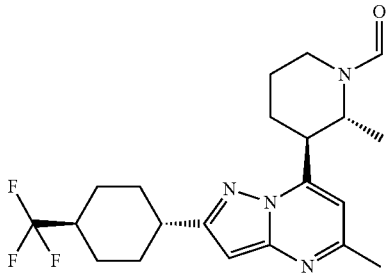 [SMILES: Cc1cc([C@@H]2CN(C=O)CCO2)n2nc([C@H]3CC[C@H](C(F)(F)F)CC3)cc2n1] | 409.3 | 186 |
| 90 | 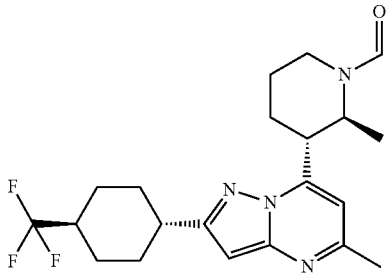 | 475.3 | 223 |
| 91 | 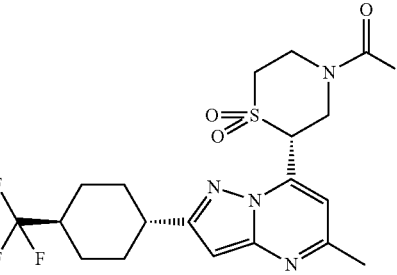 | 427.2 | 222 |
| | 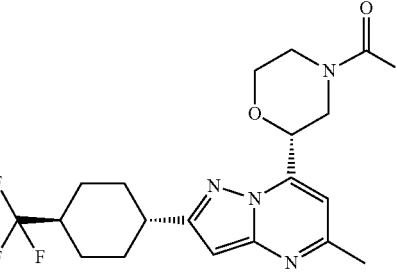 | | |

TABLE 9-continued

| Example | Structure | LC-MS (ESI) m/z [MH+] | Intermediate |
|---|---|---|---|
| 92 | | 439.3 | 186 |
| 93 | | 427.3 | 187 |
| 94 | | 397.3 | 187 |
| 95 | | 441.2 | 187 |

TABLE 9-continued
| Example | Structure | LC-MS (ESI) m/z [MH+] | Intermediate |
|---|---|---|---|
| 96 | 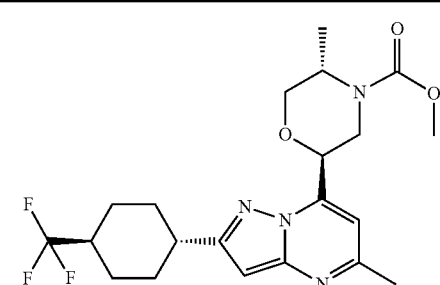 | 441.2 | 188 |
| 97 | 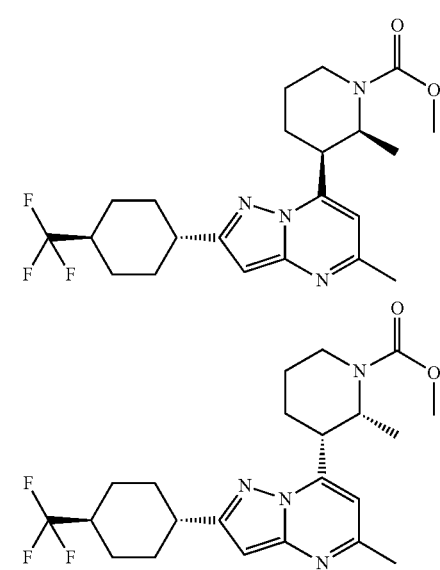 | 439.3 | 182 |
| 98 | 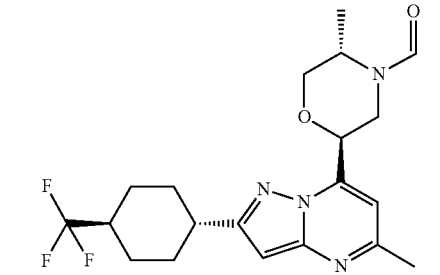 [SMILES: Cc1cc([C@@H]2CN(C=O)[C@@H](C)CO2)n2nc([C@H]3CC[C@H](C(F)(F)F)CC3)cc2n1] | 411.3 | 188 |
| 99 | 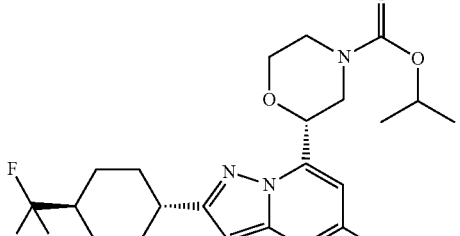 | 455.2 | 222 |

TABLE 9-continued

| Example | Structure | LC-MS (ESI) m/z [MH+] | Intermediate |
|---|---|---|---|
| 100 | | 471.2 | 222 |
| 101 | | 503.3 | 188 |
| 102 | | 441.2 | 189 |
| 103 | | 411.2 | 189 |

TABLE 9-continued

| Example | Structure | LC-MS (ESI) m/z [MH+] | Intermediate |
|---|---|---|---|
| 104 | | 409.3 | 190 |
| 105 | | 395.2 | 87 |
| 106 | | 441.2 | 191 |

TABLE 9-continued
| Example | Structure | LC-MS (ESI) m/z [MH+] | Intermediate |
|---|---|---|---|
| 107 | 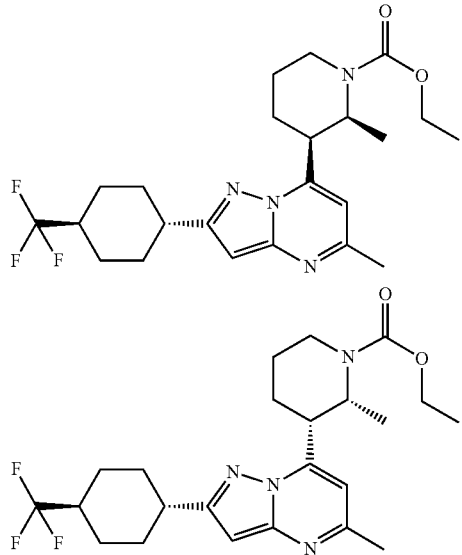 | 453.2 | 182 |
|  | 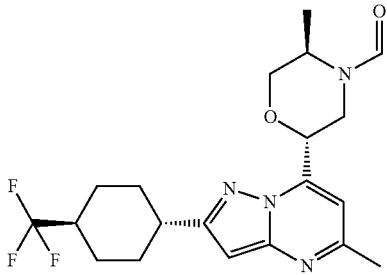 [SMILES: Cc1cc([C@H]2CN(C=O)[C@H](C)CO2)n2nc([C@H]3CC[C@H](C(F)(F)F)CC3)cc2n1] |  |  |
| 108 | 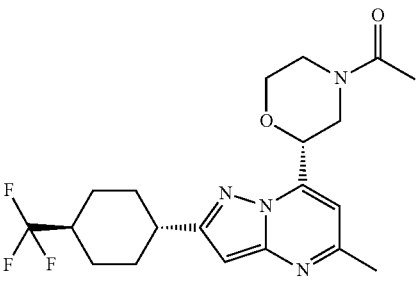 | 411.2 | 191 |
| 109 | | 411.2 | 222 |
| 110 | 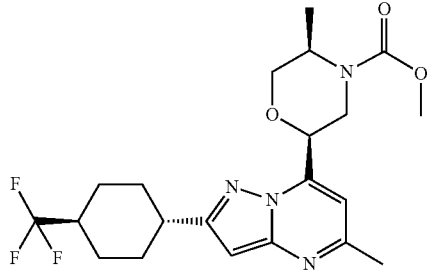 [SMILES: COC(=O)N1C[C@@H](c2cc(C)nc3cc([C@H]4CC[C@H](C(F)(F)F)CC4)nn23)OC[C@H]1C] | 441.2 | 192 |

TABLE 9-continued
| Example | Structure | LC-MS (ESI) m/z [MH+] | Intermediate |
|---|---|---|---|
| 111 | 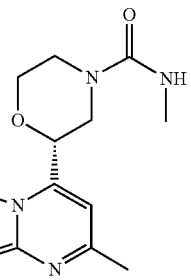 | 426.2 | 222 |
| 112 | 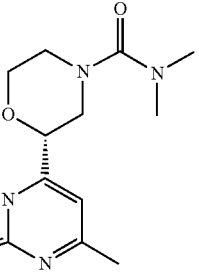 | 440.1 | 222 |
| 113 | 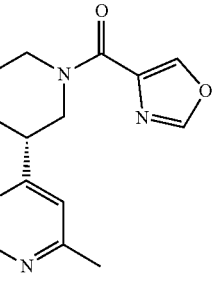 | 464.3 | 222 |
| 114 | 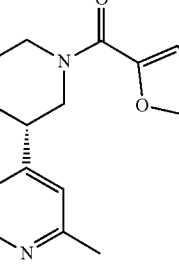 | 464.3 | 222 |
| 115 | 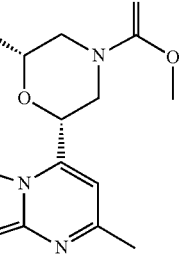 | 441.3 | 193 |

TABLE 9-continued

| Example | Structure | LC-MS (ESI) m/z [MH+] | Intermediate |
|---|---|---|---|
| 116 | | 441.2 | 222 |
| 117 | | 445.3 | 194 |
| 118 | | 480.3 | 222 |
| 119 | | 447.2 | 222 |
| 120 | | 476.2 | 222 |

TABLE 9-continued
| Example | Structure | LC-MS (ESI) m/z [MH+] | Intermediate |
|---|---|---|---|
| 121 | 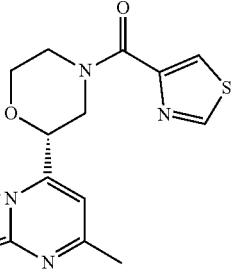 | 480.3 | 222 |
| 122 | 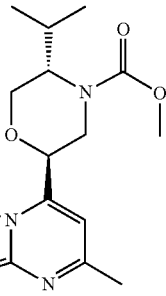 | 469.2 | 195 |
| 123 | 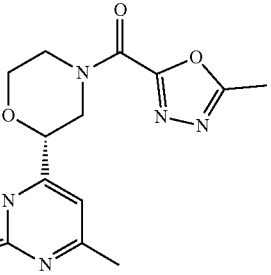 | 479.2 | 222 |
| 124 | 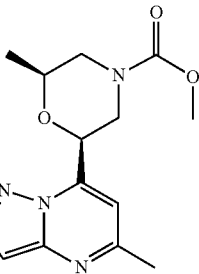 | 441.3 | 196 |
| 125 | 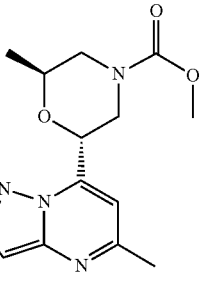 | 441.2 | 197 |

TABLE 9-continued
| Example | Structure | LC-MS (ESI) m/z [MH+] | Intermediate |
|---|---|---|---|
| 126 | 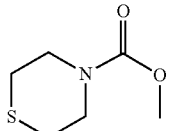 | 443.2 | 198 |
| 127 | 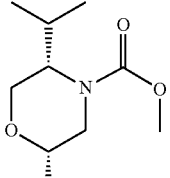 | 469.2 | 219 |
| 128 | 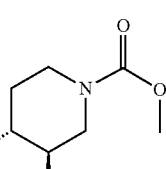 | 457.2 | 202 |
| 129 | 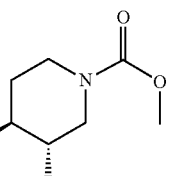 | 457.2 | 203 |
| 130 | 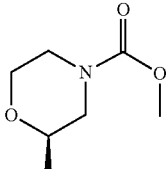 | 445.2 | 204 |

TABLE 9-continued

| Example | Structure | LC-MS (ESI) m/z [MH+] | Intermediate |
|---|---|---|---|
| 131 | | 415.4 | 208 |
| 132 | | 415.4 | 209 |
| 133 | | 457.3 | 210 |
| 134 | | 421.4 | 212 |
| 135 | | 467.4 | 213 |

TABLE 9-continued

| Example | Structure | LC-MS (ESI) m/z [MH+] | Intermediate |
|---|---|---|---|
| 136 | | 459.2 | 213 |
| 137 | | 438.5 | 213 |
| 138 | | 452.5 | 213 |
| 139 | | 425.2 | 157 |
| 140 | | 483.4 | 213 |

TABLE 9-continued
| Example | Structure | LC-MS (ESI) m/z [MH+] | Intermediate |
|---|---|---|---|
| 141 | 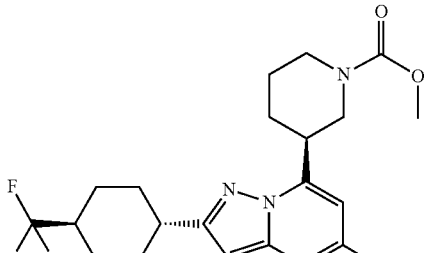 | 425.2 | 164 |
| 142 | 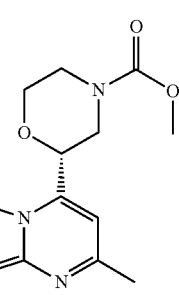 | 421.4 | 215 |
| 143 | 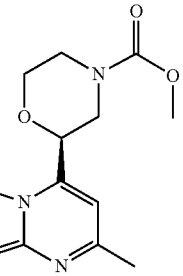 | 421.4 | 216 |
| 144 | 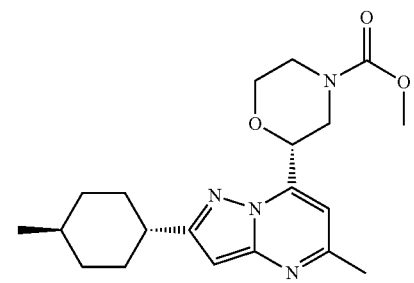 | 373.6 | 217 |
| 145 | 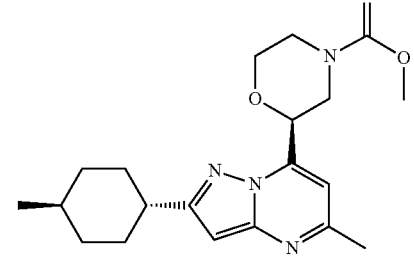 | 373.6 | 218 |

TABLE 9-continued

| Example | Structure | LC-MS (ESI) m/z [MH+] | Intermediate |
|---|---|---|---|
| 146 | | 373.6 | 211 |
| 147 | | 467.4 | 214 |
| 148 | | 452.5 | 214 |
| 149 | | 443.3 | 220 |
| 150 | | 443.3 | 221 |

TABLE 9-continued

| Example | Structure | LC-MS (ESI) m/z [MH+] | Intermediate |
|---------|-----------|----------------------|--------------|
| 151 | | 491.5 | 214 |
| 152 | | 492.6 | 214 |
| 153 | | 488.8 | 214 |
| 154 | | 476.6 | 214 |
| 155 | | 493.5 | 214 |

TABLE 9-continued

| Example | Structure | LC-MS (ESI) m/z [MH+] | Intermediate |
|---------|-----------|------------------------|--------------|
| 156 | | 438.2 | 214 |
| 157 | | 483.5 | 214 |
| 158 | | 441.2 | 159 |

TABLE 9-continued

| Example | Structure | LC-MS (ESI) m/z [MH+] | Intermediate |
|---------|-----------|------------------------|--------------|
| 159 | | 439.2 | 171 |
| | | | |
| 160 | | 409.2 | 180 |
| | | | |
| 161 | | 368.2 | 82 + 45 |

Preparation of Pharmaceutical Compositions

The following formulation examples illustrate representative pharmaceutical compositions of this invention. The present invention however is not limited to the following pharmaceutical compositions.

A) Solid Oral Dosage Forms
I. Tablets

| Active ingredient(s) | 0.01-90% |
|---|---|
| Filler | 1-99.9% |
| Binder | 0-20% |
| Disintegrant | 0-20% |
| Lubricant | 0-10% |
| Other specific excipient(s) | 0-50% |

II. Orodispersible Films

| Active ingredient(s) | 0.01-90% |
|---|---|
| Film forming agent | 1-99.9% |
| Plasticizer | 0-40% |
| Other specific excipient(s) | 0-50% |

B) Liquid Oral Dosage Forms
III. Oral Suspensions

| Active ingredient(s) | 0.01-50% |
|---|---|
| Liquid vehicle | 10-99.9% |
| Wetting agent | 0-50% |
| Thickener | 0-50% |
| Buffering agent | q.s. |
| Osmotic agent | 0-50% |
| Preservatives | q.s. |

IV. Syrups

| Active ingredient(s) | 0.01-50% |
|---|---|
| Solvent | 10-99.9% |
| Sugar component | 1-20% |
| Flavouring agents | 0-10% |

C) Parenteral Dosage Forms
V. Intravenous Injections

| Active ingredient(s) | 0.01-50% |
|---|---|
| Solvent | 10-99.9% |
| Co-solvent | 0-99.9% |
| Osmotic agent | 0-50% |
| Buffering agent | q.s. |

D) Other Dosage Forms
VI. Suppositories

| Active ingredient(s) | 0.01-50% |
|---|---|
| Suppository base | 1-99.9% |
| Surface-active agents | 0-20% |
| Lubricants | 0-20% |
| Preservatives | q.s. |

VII. Eye Drops

| Active ingredient(s) | 0.01-50% |
|---|---|
| Water | 0-99.9% |
| Solvent | 0-99.9% |
| Osmotic agent | 0-20% |
| Viscosity enhancer | 0-20% |
| Buffering agent | q.s. |
| Preservatives | q.s. |

The invention claimed is:

1. A compound of formula (I)

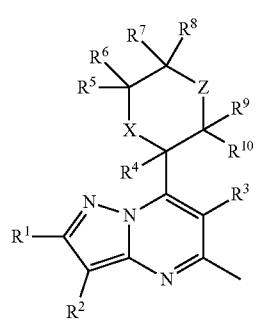

wherein
$R^1$ represents phenyl- or cyclohexyl group substituted by $C_1$-$C_6$alkyl or halo-$C_1$-$C_6$alkyl;
$R^2$ represents H or halogen;
$R^3$ represents H or $C_1$-$C_6$alkyl;
$R^4$ represents H; $C_1$-$C_6$alkyl or halo-$C_1$-$C_6$alkyl;
$R^5$ and $R^6$ may be each, independently H; $C_1$-$C_6$alkyl or halogen;
$R^7$ and $R^8$ may be each, independently H or $C_1$-$C_6$alkyl;
$R^9$ and $R^{10}$ may be each, independently H or $C_1$-$C_6$alkyl or $R^9$ and $R^{10}$ together may form oxo group;
X represents —$CR^xR^y$ or —O— or —S(O)$_n$— group, wherein $R^x$ and $R^y$ may be each, independently H or $C_1$-$C_6$alkyl group and wherein n is 0 or 1 or 2;
Z represents —NR—; or —O—; or —S(O)$_2$— group wherein
R may be H or —C(O)$R^{11}$ or —S(O)$_2R^{12}$ group; aminocarbonyl-$C_1$-$C_3$alkyl; carboxy-$C_1$-$C_3$alkyl; cyano-$C_1$-$C_3$alkyl; $C_1$-$C_5$(cyclo)alkyl; saturated 4-6 membered heterocyclic ring with one O, or —C(NH)(NH$_2$) group;
wherein $R^{11}$ may be H; $C_1$-$C_3$alkyl; $C_1$-$C_3$alkoxy; deutero-$C_1$-$C_3$alkoxy; $C_1$-$C_3$alkoxy-$C_1$-$C_3$alkyl; $C_1$-$C_3$alkoxy-$C_1$-$C_3$alkoxy; methanesulphonyl-$C_1$-$C_3$alkyl; or $R^{11}$ may be a saturated 3-6 membered carbocyclic ring, or a 4-6 membered saturated or unsaturated heterocyclic ring with one to three hetero atoms selected from N, O or S; or amino, mono- or dialkylamino group; amino-$C_1$-$C_3$alkyl; hydroxy-$C_1$-$C_3$alkyl substituted by NH$_2$-group;
wherein $R^{12}$ may be $C_1$-$C_3$alkyl; amino or dialkylamino group;
$R^4$ and $CR^x$ may form a cycloalkyl ring;
or pharmaceutically acceptable salts, biologically active metabolites, pro-drugs, racemates, enantiomers, diastereomers, solvates and hydrates thereof.

2. The compound according to claim 1, wherein
if X represents —$CR^xR^y$ then Z represents —NR— group; or
if X represents —O—; or —S(O)n- group then Z represents —NR— group; or if X represents —CR$^x$R$^y$ group then Z represents —O—; or —S(O)$_2$— group.

3. The compound according to claim 2, wherein X represents —CR$^x$R$^y$ and Z represents —NR—group, wherein R may be —C(O)R$^{11}$.

4. The compound according to claim 2, wherein X represents —O— or —S(O)$_2$— group and Z represents —NR— group, where R may be —C(O)R$^{11}$ or —S(O)$_2$R$^{12}$ group.

5. The compound according to claim 1, selected from the group consisting of:
- 1-[(3R)-3-{6-ethyl-5-methyl-2-[trans-4-(trifluoromethyl)cyclohexyl]pyrazolo[1,5-a]pyrimidin-7-yl}-3-methylpiperidin-1-yl]ethan-1-one,
- 1-[(3S)-3-{6-ethyl-5-methyl-2-[trans-4-(trifluoromethyl)cyclohexyl]pyrazolo[1,5-a]pyrimidin-7-yl}-3-methylpiperidin-1-yl]ethan-1-one,
- 1-{3-[5-methyl-6-(propan-2-yl)-2-[trans-4-(trifluoromethyl)cyclohexyl]pyrazolo[1,5-a]pyrimidin-7-yl]piperidin-1-yl}ethan-1-one,
- 1-[(3R)-3-methyl-3-{5-methyl-2-[trans-4-(trifluoromethyl)cyclohexyl]pyrazolo[1,5-a]pyrimidin-7-yl}piperidin-1-yl]ethan-1-one,
- 1-[(3S)-3-{6-ethyl-5-methyl-2-[trans-4-(trifluoromethyl)cyclohexyl]pyrazolo[1,5-a]pyrimidin-7-yl}piperidin-1-yl]ethan-1-one,
- (3R)-3-{6-ethyl-5-methyl-2-[trans-4-(trifluoromethyl)cyclohexyl]pyrazolo[1,5-a]pyrimidin-7-yl}-1-methanesulfonyl-3-methylpiperidine,
- methyl (3R,4S)-4-methyl-3-{5-methyl-2-[trans-4-(trifluoromethyl)cyclohexyl]pyrazolo[1,5-a]pyrimidin-7-yl}piperidine-1-carboxylate,
- methyl (3S,4R)-4-methyl-3-{5-methyl-2-[trans-4-(trifluoromethyl)cyclohexyl]pyrazolo[1,5-a]pyrimidin-7-yl}piperidine-1-carboxylate,
- trans-3-{5,6-dimethyl-2-[trans-4-(trifluoromethyl)cyclohexyl]pyrazolo[1,5-a]pyrimidin-7-yl}-4-methylpiperidine-1-carbaldehyde,
- 1-[trans-3-{6-ethyl-5-methyl-2-[trans-4-(trifluoromethyl)cyclohexyl]pyrazolo[1,5-a]pyrimidin-7-yl}-4-methylpiperidin-1-yl]ethan-1-one,
- trans-4-methyl-3-{5-methyl-2-[trans-4-(trifluoromethyl)cyclohexyl]pyrazolo[1,5-a]pyrimidin-7-yl}piperidine-1-carbaldehyde,
- methyl trans-3-{5,6-dimethyl-2-[trans-4-(trifluoromethyl)cyclohexyl]pyrazolo[1,5-a]pyrimidin-7-yl}-4-methylpiperidine-1-carboxylate,
- 5-{5,6-dimethyl-2-[trans-4-(trifluoromethyl)cyclohexyl]pyrazolo[1,5-a]pyrimidin-7-yl}-3,3-difluoropiperidine-1-carbaldehyde,
- 2-{6-ethyl-5-methyl-2-[trans-4-(trifluoromethyl)cyclohexyl]pyrazolo[1,5-a]pyrimidin-7-yl}morpholine-4-carbaldehyde,
- methyl (2R)-2-{5-methyl-2-[trans-4-(trifluoromethyl)cyclohexyl]pyrazolo[1,5-a]pyrimidin-7-yl}morpholine-4-carboxylate,
- methyl trans-2-methyl-3-{5-methyl-2-[trans-4-(trifluoromethyl)cyclohexyl]pyrazolo[1,5-a]pyrimidin-7-yl}piperidine-1-carboxylate,
- (2R)-2-{5-methyl-2-[trans-4-(trifluoromethyl)cyclohexyl]pyrazolo[1,5-a]pyrimidin-7-yl}morpholine-4-sulfonamide,
- methyl (2R,5S)-5-methyl-2-{5-methyl-2-[trans-4-(trifluoromethyl)cyclohexyl]pyrazolo[1,5-a]pyrimidin-7-yl}morpholine-4-carboxylate,
- methyl (2R)-2-{3-fluoro-5-methyl-2-[trans-4-(trifluoromethyl)cyclohexyl]pyrazolo[1,5-a]pyrimidin-7-yl}morpholine-4-carboxylate,
- 5-methyl-7-[(3R)-oxan-3-yl]-2-[trans-4-(trifluoromethyl)cyclohexyl]pyrazolo[1,5-a]pyrimidine, and
- 5-methyl-7-[(3S)-oxan-3-yl]-2-[trans-4-(trifluoromethyl)cyclohexyl]pyrazolo[1,5-a]pyrimidine;

or pharmaceutically acceptable salts, biologically active metabolites, pro-drugs, racemates, enantiomers, diastereomers, solvates and hydrates thereof.

6. A pharmaceutical composition comprising a therapeutically effective amount of a compound of formula (I) or pharmaceutically acceptable salts, biologically active metabolites, pro-drugs, racemates, enantiomers, diastereomers, solvates and hydrates thereof according to claim 1 and a pharmaceutically acceptable carrier.

7. A combination comprising a therapeutically effective amount of a compound of formula (I) or pharmaceutically acceptable salts, biologically active metabolites, pro-drugs, racemates, enantiomers, diastereomers, solvates and hydrates thereof according to claim 1 and one or more therapeutically active co-agents.

8. A process for manufacturing a pharmaceutical composition having GABA$_B$ receptor positive allosteric modulator effect comprising mixing a therapeutically effective amount of a compound of formula (I) or pharmaceutically acceptable salts, biologically active metabolites, pro-drugs, racemates, enantiomers, diastereomers, solvates and hydrates thereof according to claim 1 and optical antipodes or racemates and/or salts thereof and pharmaceutically acceptable excipients.

9. A method for positive allosteric modulation of a GABA$_B$ receptor comprising administering a compound of formula (I) or pharmaceutically acceptable salts, biologically active metabolites, pro-drugs, racemates, enantiomers, diastereomers, solvates and hydrates thereof according to claim 1 to a mammal in need thereof.

10. A method of treatment of a disorder which requires positive allosteric modulation of a GABA$_B$ receptor comprising administering an effective amount of a compound of formula (I) according to claim 1 and optical antipodes or racemates and/or salts thereof to the a mammal in need thereof, wherein the disorder which requires positive allosteric modulation of the GABA$_B$ receptor is selected from the group consisting of psychiatric disorders, neurodevelopmental disorders, cognitive disorders, epilepsy, spasticity, skeletal muscle rigidity, spinal cord injury, multiple sclerosis, amyotrophic lateral sclerosis, cerebral palsy, essential tremor, pain, substance abuse, obesity, binge eating, asthma, cough, urinary incontinence, gastroesophageal reflux disease, transient lower esophageal sphincter relaxation, and irritable bowel syndrome.

11. A compound selected from the group consisting of:
- (3S,4R)-4-methyl-3-{5-methyl-2-[trans-4-(trifluoromethyl)cyclohexyl]pyrazolo[1,5-a]pyrimidin-7-yl}piperidine (Intermediate 213),
- (3S)-3-{5-methyl-2-[trans-4-(trifluoromethyl)cyclohexyl]pyrazolo[1,5-a]pyrimidin-7-yl}morpholine (Intermediate 222),
- (3R)-3-{6-ethyl-5-methyl-2-[trans-4-(trifluoromethyl)cyclohexyl]pyrazolo[1,5-a]pyrimidin-7-yl}-3-methylpiperidine (Intermediate 160),
- (3S)-3-{6-ethyl-5-methyl-2-[trans-4-(trifluoromethyl)cyclohexyl]pyrazolo[1,5-a]pyrimidin-7-yl}piperidine (Intermediate 168), and (2R,5S)-5-methyl-2-{5-methyl-2-[trans-4-(trifluoromethyl)cyclohexyl]pyrazolo[1,5-a]pyrimidin-7-yl}morpholine (Intermediate 189).

12. The compound according to claim 1, selected from the group consisting of:

(Example 5)

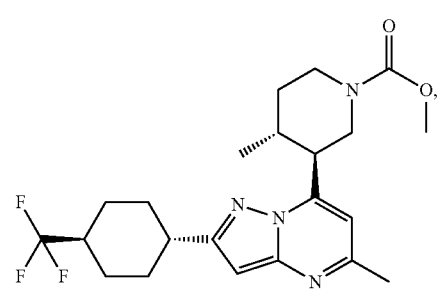

(Example 9)

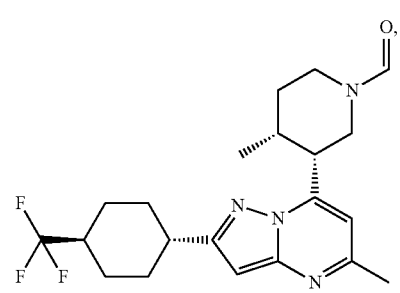

(Example 25)

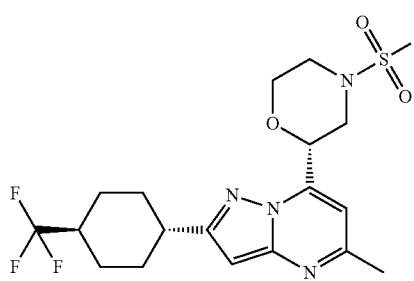

(Example 28)

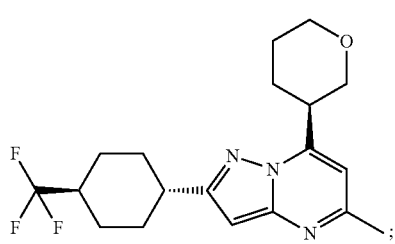

or pharmaceutically acceptable salts, biologically active metabolites, pro-drugs, racemates, enantiomers, diastereomers, solvates and hydrates thereof.

13. The compound according to claim 1, selected from the group consisting of:

(Example 32)

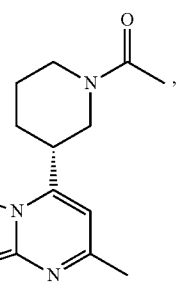
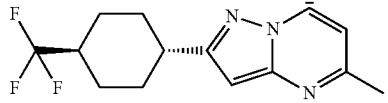

(Example 34)

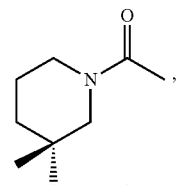
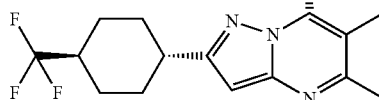

(Example 35)

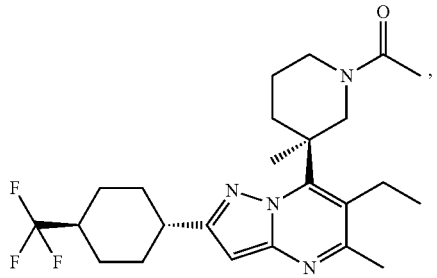

(Example 39)

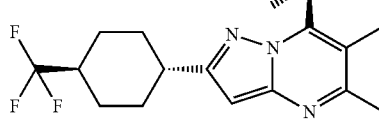
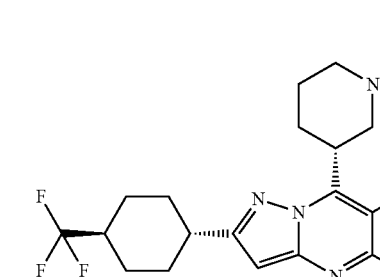

(Example 40)

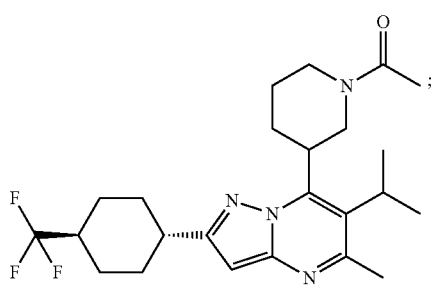

or pharmaceutically acceptable salts, biologically active metabolites, pro-drugs, racemates, enantiomers, diastereomers, solvates and hydrates thereof.

14. The compound according to claim 1, selected from the group consisting of:

(Example 41)
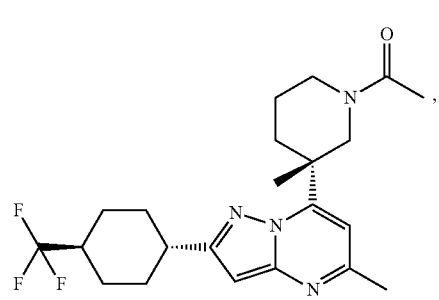

(Example 42)
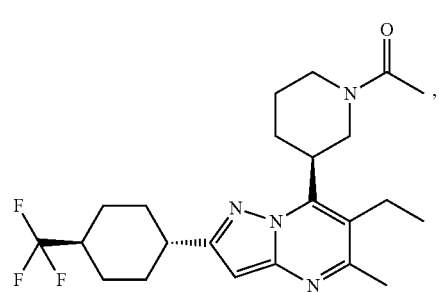

(Example 43)
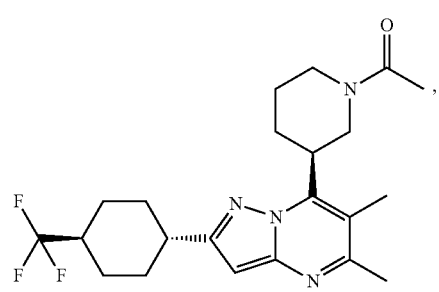

(Example 44)
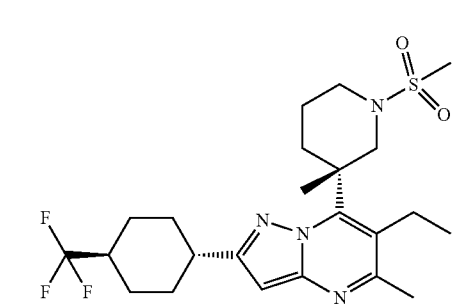

, and (Example 47)
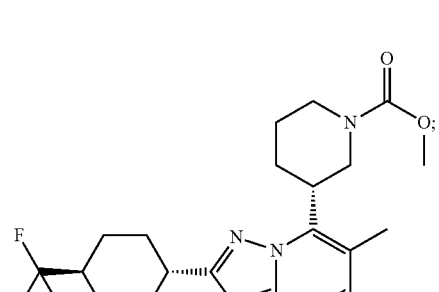

;

or pharmaceutically acceptable salts, biologically active metabolites, pro-drugs, racemates, enantiomers, diastereomers, solvates and hydrates thereof.

15. The compound according to claim 1, selected from the group consisting of:

(Example 58)
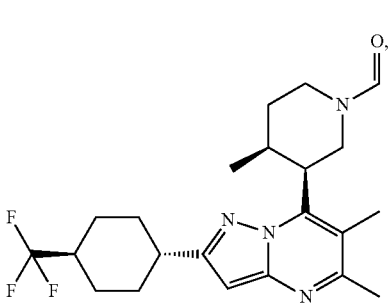

(Example 58)
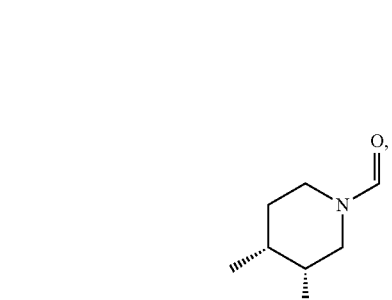

(Example 66)
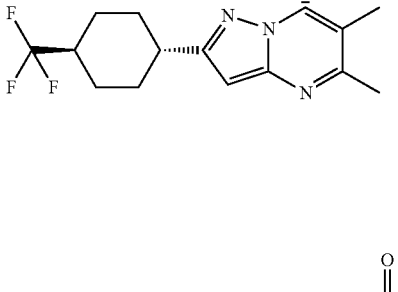

, and (Example 66)
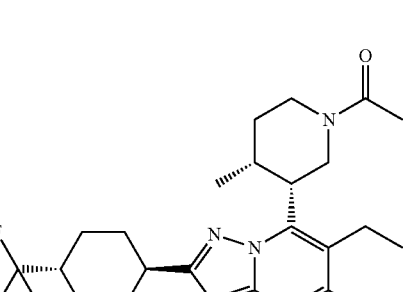

;

or pharmaceutically acceptable salts, biologically active metabolites, pro-drugs, racemates, enantiomers, diastereomers, solvates and hydrates thereof.

16. The compound according to claim 1, selected from the group consisting of:

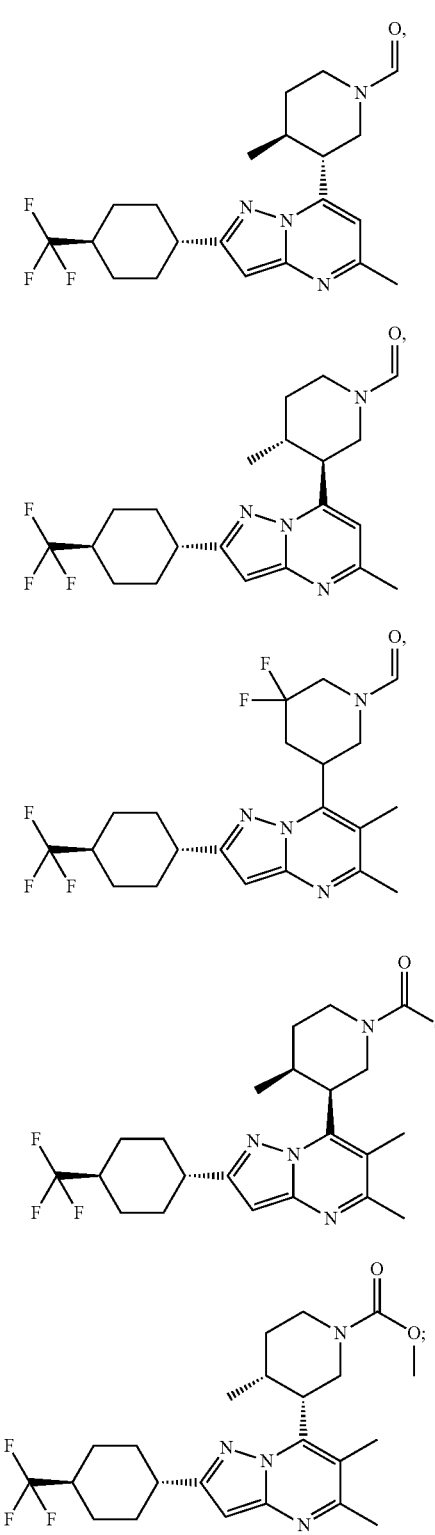

(Example 68)

(Example 68)

(Example 75)

(Example 77)

(Example 77)

or pharmaceutically acceptable salts, biologically active metabolites, pro-drugs, racemates, enantiomers, diastereomers, solvates and hydrates thereof.

17. The compound according to claim 1, selected from the group consisting of:

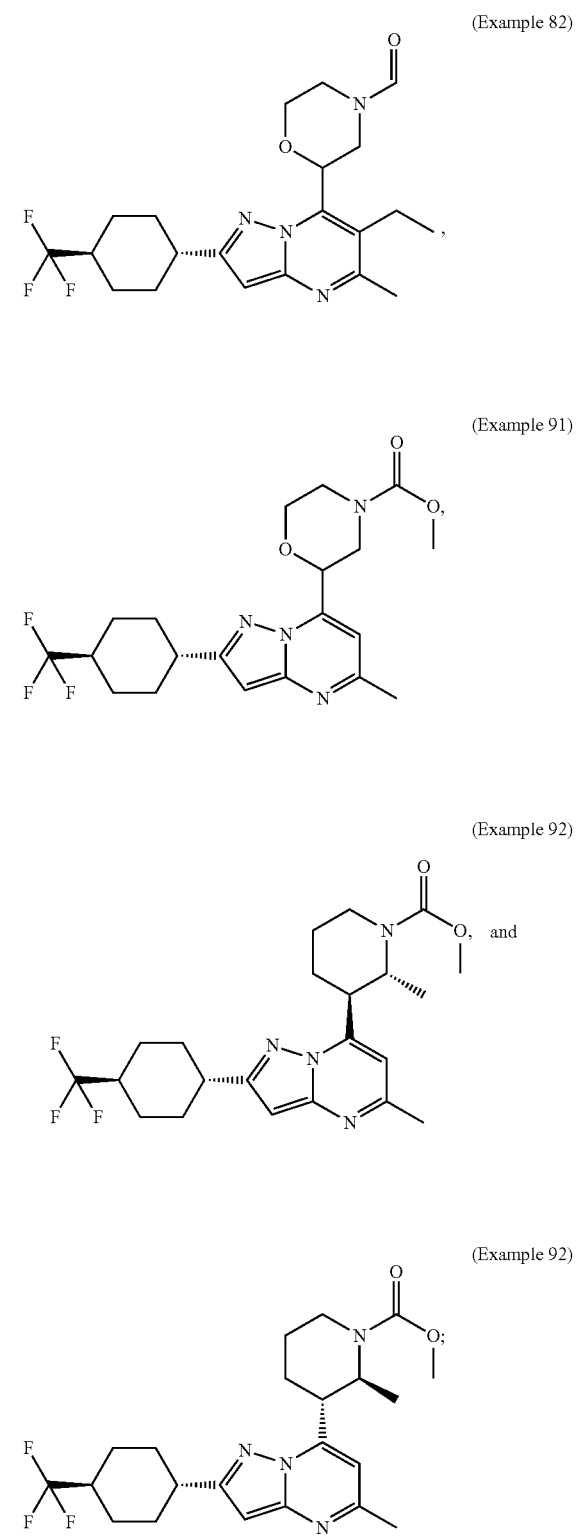

(Example 82)

(Example 91)

(Example 92)

(Example 92)

or pharmaceutically acceptable salts, biologically active metabolites, pro-drugs, racemates, enantiomers, diastereomers, solvates and hydrates thereof.

18. The compound according to claim 1, selected from the group consisting of:

(Example 102)
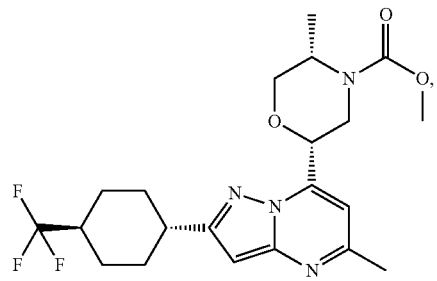

(Example 111)
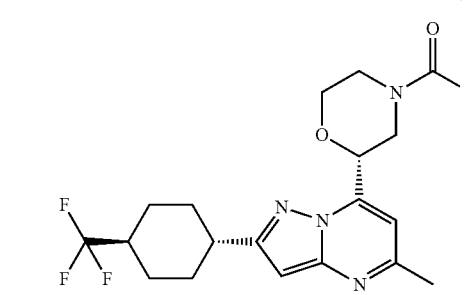

(Example 112)
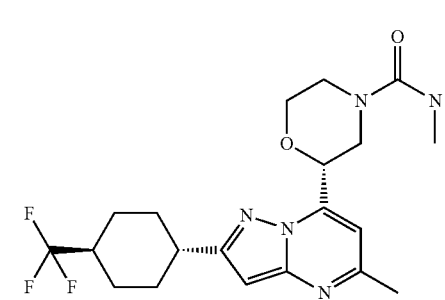

(Example 113)
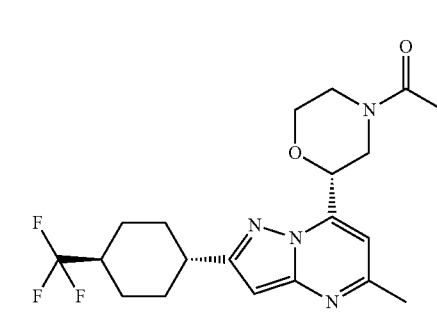

or pharmaceutically acceptable salts, biologically active metabolites, pro-drugs, racemates, enantiomers, diastereomers, solvates and hydrates thereof.

19. The compound according to claim 1, selected from the group consisting of:

(Example 117)
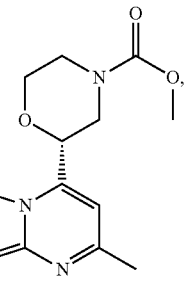

(Example 132)
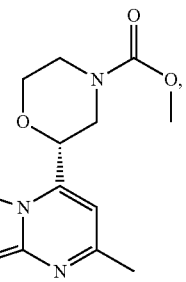

(Example 158)
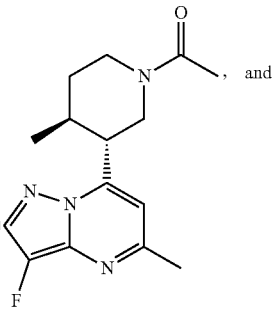

(Example 158)
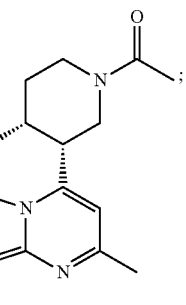

or pharmaceutically acceptable salts, biologically active metabolites, pro-drugs, racemates, enantiomers, diastereomers, solvates and hydrates thereof.

\* \* \* \* \*